United States Patent
McGovern et al.

(10) Patent No.: US 7,870,079 B2
(45) Date of Patent: Jan. 11, 2011

(54) METHOD AND APPARATUS FOR EMPLOYMENT SYSTEM DISTRIBUTED HIRING AND CO-OPERATIVE POOLING

(75) Inventors: Robert McGovern, Potomac, MD (US); Erik Anderson, Olney, MD (US); Richard Ellinger, Great Falls, VA (US); Todd Forest, Arlington, VA (US); Matthew Hagopian, Arlington, VA (US)

(73) Assignee: Jobfox, Inc., McLean, VA (US)

( * ) Notice: Subject to any disclaimer, the term of this patent is extended or adjusted under 35 U.S.C. 154(b) by 201 days.

(21) Appl. No.: 11/835,758

(22) Filed: Aug. 8, 2007

(65) Prior Publication Data

US 2008/0027747 A1    Jan. 31, 2008

Related U.S. Application Data

(63) Continuation-in-part of application No. 11/331,672, filed on Jan. 13, 2006, which is a continuation-in-part of application No. 11/104,142, filed on Apr. 11, 2005, now Pat. No. 7,805,382.

(60) Provisional application No. 60/884,806, filed on Jan. 12, 2007.

(51) Int. Cl.
*G06Q 10/00* (2006.01)

(52) U.S. Cl. ...................... 705/321; 705/320

(58) Field of Classification Search ............ None
See application file for complete search history.

(56) References Cited

U.S. PATENT DOCUMENTS

| | | | |
|---|---|---|---|
| 5,164,897 A * | 11/1992 | Clark et al. | 705/1 |
| 5,416,694 A * | 5/1995 | Parrish et al. | 705/8 |
| 5,592,375 A * | 1/1997 | Salmon et al. | 705/7 |
| 5,832,497 A | 11/1998 | Taylor | |
| 5,884,270 A * | 3/1999 | Walker et al. | 705/1 |
| 5,918,207 A * | 6/1999 | McGovern et al. | 705/1 |
| 6,049,776 A * | 4/2000 | Donnelly et al. | 705/8 |
| 6,052,122 A | 4/2000 | Sutcliffe et al. | |
| 6,115,709 A * | 9/2000 | Gilmour et al. | 707/9 |
| 6,126,448 A * | 10/2000 | Ho et al. | 434/219 |
| 6,154,753 A * | 11/2000 | McFarland | 715/221 |
| 6,213,780 B1 * | 4/2001 | Ho et al. | 434/219 |
| 6,272,467 B1 * | 8/2001 | Durand et al. | 705/1 |
| 6,275,812 B1 * | 8/2001 | Haq et al. | 705/11 |
| 6,370,510 B1 * | 4/2002 | McGovern et al. | 705/1 |
| 6,385,620 B1 | 5/2002 | Kurzius et al. | |
| 6,405,197 B2 * | 6/2002 | Gilmour | 707/5 |

(Continued)

*Primary Examiner*—Traci L Casler
(74) *Attorney, Agent, or Firm*—K&L Gates LLP

(57) ABSTRACT

A method of operating an employment system is provided. The method includes enabling a first user associated with an employee seeker to enter a shell for a position and enabling a second user associated with the employee seeker to enter additional information about the position. The second user is distinctly identifiable by the employment system from the first user. The method also includes associating an employment seeker with the position. Alternatively, the method includes categorizing a first set of one or more employment seekers as public and categorizing a second set of one or more employment seekers as participants in a co-operative. The method also includes enabling all employee seekers to access or view information about members of the first set and enabling all employee seekers that are members of the co-operative to access or view information about members of the second set.

10 Claims, 34 Drawing Sheets

U.S. PATENT DOCUMENTS

| | | |
|---|---|---|
| 6,606,480 B1 * | 8/2003 | L'Allier et al. .............. 434/362 |
| 6,662,194 B1 | 12/2003 | Joao |
| 6,735,570 B1 * | 5/2004 | Lacy et al. ..................... 705/7 |
| 6,785,679 B1 | 8/2004 | Dane et al. |
| 7,099,872 B2 * | 8/2006 | Carpenter et al. ............. 707/10 |
| 2002/0046074 A1 * | 4/2002 | Barton ........................... 705/8 |
| 2002/0059201 A1 * | 5/2002 | Work ............................. 707/3 |
| 2002/0133369 A1 * | 9/2002 | Johnson ......................... 705/1 |
| 2003/0037032 A1 * | 2/2003 | Neece et al. ................... 707/1 |
| 2003/0182171 A1 * | 9/2003 | Vianello ........................ 705/9 |
| 2004/0186852 A1 * | 9/2004 | Rosen ..................... 707/104.1 |

* cited by examiner

CANDIDATE MATCHES

Account Manager II - ID #9992121

(up to 3)
[ compare : ]

First | <Previous | Next> | Last

| Compare Score | Candidate Match | Status |
|---|---|---|
| ☐ 8.4 | Shirley Peterson | |
| ☐ 8.4 | John Henry | I added to Favorites |
| ☐ 8.2 | Stacy Kane | |
| ☐ 8.0 | Walter James (mkt10 candidate) | |
| ☐ 7.9 | Anonymous [alias] | |
| ☐ 7.4 | Melinda Uber | I added to Favorites |
| ☐ 7.4 | Linda Franks | |
| ☐ 7.3 | Anthony Wallace | |
| ☐ 7.0 | Chevy Nuys | |
| ☐ 6.8 | Jobe Mat-Chez | |
| ☐ 6.6 | Thomas Walker (mkt10 candidate) | |
| ☐ 6.1 | Seeker 21 [alias] | |
| ☐ 6.1 | Pete Beers | |
| ☐ 6.0 | Rowena Mack | |
| ☐ 5.8 | Beth Johnson | |

Match Summary
- Actively Interested: 0
- Made Job a Favorite: 0
- 7.0 Match or Better: 8
- Viewed Job Specification: 1

Favorite Candidates

| Name | Score |
|---|---|
| John Henry | 8.4 |
| Stacy Kane | 8.2 |
| Walter James | 8.0 |
| Anonymous | 7.9 |
| Melinda Uber | 7.4 |
| Linda Franks | 7.4 |
| Anthony Wallace | 7.3 |
| Chevy Nuys | 7.0 |
| Jobe Mat-Chez | 6.8 |
| Thomas Walker | 6.5 |

Manage Favorites

[ compare : ]
(up to 3)

First | <Previous | Next> | Last

FIG. 22

FIG. 24 market10

ANONYMOUS — r Account Manager II - ID # — 2404

7.9 overall score  8.5 skill level

REQUEST CONTACT INFORMATION

PRIVATE CANDIDATE | ADD TO FAVORITES
market10 LOGIN

HIRE 2410, 2402, 2406, 2408

Experience

| | |
|---|---|
| Company | ImagiNational Production |
| Tenure | Jan 2003 - Present  2.1 years |
| Title | Technical Manager |
| Industry | ISPs, Search Portals, and Data Processing |
| Profession | Software Engineering |
| Skills Used | • Requirements Gathering and Trade Studies |
| | • System Design/Technical Architecture/Design |
| Overview | Supervise 10 Software Engineers, developing User Interface for key areas of the service, including Registration, Parental Controls, Billing, Member Directory, and Voice products. |

| | |
|---|---|
| Company | America Online |
| Tenure | April 1999 - Jan 2003  4.3 years |
| Title | Program Manager |
| Industry | ISPs, Search Portals, and Data Processing |
| Profession | Software Engineering |
| Skills Used | • Requirements Gathering and Trade Studies |
| | • Project Planning |

| | |
|---|---|
| Company | Wang Government Services |
| Tenure | Jan 1997 - Mar 1999  2.1 years |
| Title | Program Manager |
| Industry | ISPs, Search Portals, and Data Processing |
| Profession | Software Engineering |
| Skills Used | • Product Management |
| | • Requirements Gathering and Trade Studies |
| | • Project Planning |

| | |
|---|---|
| Company | eVentive LLC |
| Tenure | Jul 1993 - Dec 1996  3.1 years |
| Title | Technical Project Lead |
| Industry | ISPs, Search Portals, and Data Processing |
| Profession | Software Engineering |
| Skills Used | • Product Management |
| | • Requirements Gathering and Trade Studies |
| | • Project Planning |
| Overview | Responsible for managing several software iniatives. Drove projects through the lifecycle, following SDLC, by developing and managing to project plans, as well as coordinating issue resolutions and project status, as they relate to Technology Services. |

Total Experience  12 years

Education
Delaware Technical and Community College-Stanton-Wilmington
Bachelor of Arts - Computer Science

Location
Lives within 10 miles of job location

Desires - General
Seeking Full-time position
Will accept 25% travel time
Salary Within range
Prefers workplaces within 15 miles of McLean, Va

Authorization
U.S. Citizen
Top Secret Clearance

Certifications
Unknown

Languages
Unknown market10 — This candidate selected by market10 and additional ???? apply — www.market10.com

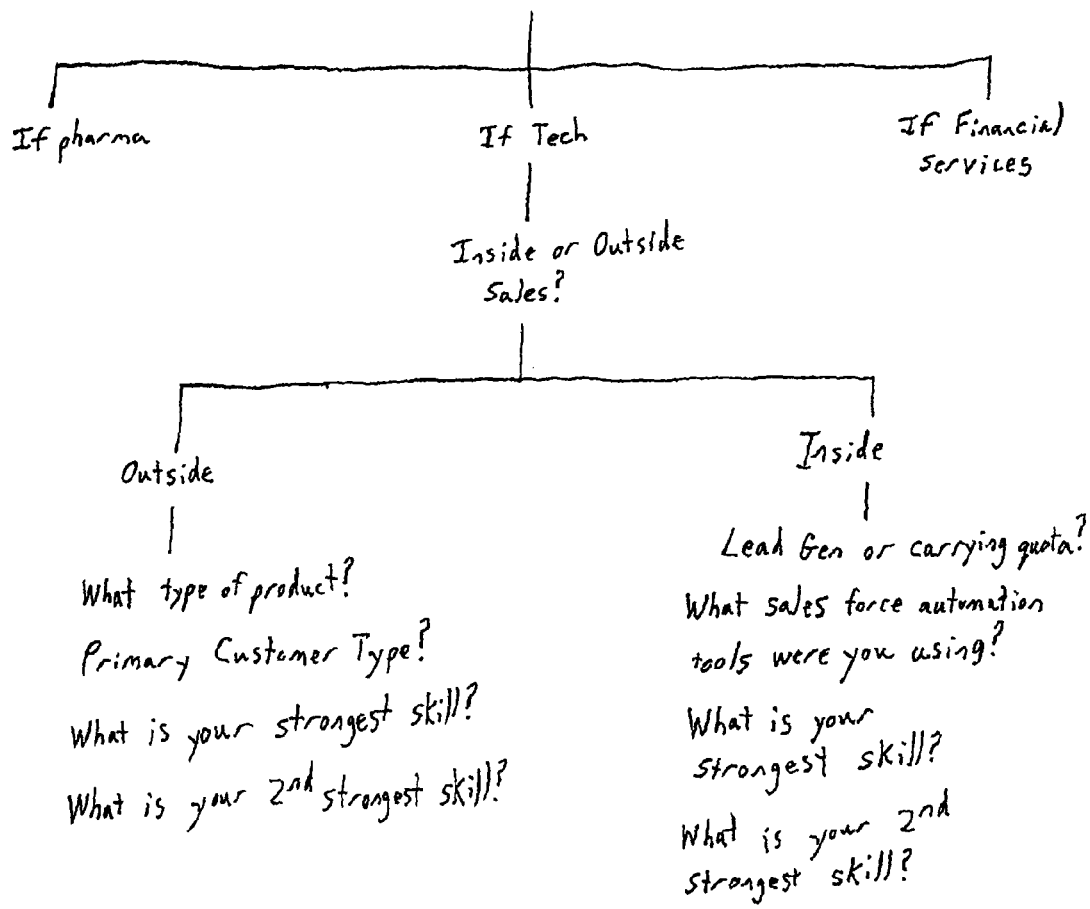

![market10 logo]

To create your match profile, complete our 3 step interview 2700

Step 1: We'll need your contact info

First Name: [ ]
Last Name: [ ]
Primary Phone: [ ]
Secondary Phone: [ ]
Home ZIP Code: [ ]
Email Address: seeker@yahoo.com

Privacy Information
○ Private - Provide us with an Alias: [ ] display to employers. We will provide the information to the left only on your approval
○ Public - Your contact information is immediately available to employers.
Password: [ ] (enter) [ ] (re-enter)

Step 2: Tell us what you've been doing lately

/ MOST RECENT / CURRENT JOB / — 2702

Company:
[ABC Company]
Start Date: End Date:
[06/2001] [Present]
(mm/yyyy) (mm/yyyy or Present)
Title:
[Job Title]
Area of Expertise:
[Medical ▼]
Not sure what to select? Click Here
[ok]

What is your profession? ← 2704 — 2706
[Select your profession ▼]
What is your target patient population? — 2706
[Select your target patient population ▼]
In what settings have you worked?
[Corporate / Educational / Home health care / Hospitals ▼]
(Ctrl click to select multiple)
In what medical techniques are you trained? — 2706
[Administer Injections / Administer medication/document prescriptions / Blood Sampling/Phlebotomy / Blood/Blood Products Administration ▼]
(Ctrl click to select multiple)
Have you ever led a nursing team?
○ Yes ○ No
Do you have scheduling responsibilities? — 2706
○ Yes ○ No
What administrative tasks have you handled?
[Housekeeping tasks / Implement physician orders / Maintain assignment board / Prepare and maintain sterile equipment/materials ▼]
(Ctrl click to select multiple)

[save]

FROM FIG. 27A

Step 3: Let us know about yourself     2708

How much will it take? [Select your desired salary ∨]
What is in the frame? [Select your highest level of education ∨]
How far will you commute? [  ] miles from [20165]
Are you authorized? [Select your U.S. citizenship status ∨]
Are you willing to hit the road? [Select your willingness to travel ∨]
How many years have you been working? [  ]

Medical – Run Script

Reset Answers

Q164 : Which title best describes this position? A:980 Administrator

Q165 : Which type of environment best describes this position? [A:987 Corporate ▼] [Answer Me!]

Q166 : Are you involved with medical management in this position?
- ○ Yes
- ○ No

[Answer Me!]

Q167 : What are the top 3 management skills required for this position?
- ☐ A:994 Establish Strategic Plans and Objectives
- ☐ A:995 Manage budgets and expenses
- ☐ A:996 Eliminate inappropriate inpatient admissions
- ☐ A:997 Promote alternative levels of care
- ☐ A:998 Reduce length of stay
- ☐ A:999 Perform pre-certification / concurrent reviews
- ☐ A:1000 Staff management

[Answer Me!]

Q168 : Are you involved with regulatory compliance issues in this position?
- ○ Yes
- ○ No

[Answer Me!]

Q171 : What are the top 3 administrative skills required in this position?
- ☐ A:1001 Data management and analysis
- ☐ A:1002 Direct activities in clinical areas
- ☐ A:1003 Establish/Implement policies and procedures
- ☐ A:1004 Formulate business strategies
- ☐ A:1005 Front office management
- ☐ A:1006 Handle business affairs
- ☐ A:1007 Oversee continuing education programs
- ☐ A:1008 Promote recruitment and retention of staff
- ☐ A:1009 Schedule and coordinate meetings
- ☐ A:1010 Systems-based care

[Answer Me!]

FIG. 28

METHOD AND APPARATUS FOR EMPLOYMENT SYSTEM DISTRIBUTED HIRING AND CO-OPERATIVE POOLING

This patent application claims priority to U.S. Provisional Application No. 60/884,806, filed on Jan. 12, 2007 and is a continuation-in-part of U.S. Non-Provisional application Ser. No. 11/331,672, filed on Jan. 12, 2006, which is a continuation-in-part of U.S. Non-Provisional application Ser. No. 11/104,142, filed on Apr. 11, 2005, the entire contents of all three of which are incorporated herein by reference.

BACKGROUND

An employment system is any electronic system which facilitates those looking for a position (i.e., employment seekers, or job seekers) in finding a position and/or which facilitates those seeking to fill a position (i.e., employee seekers, or employers) in finding someone to fill the position. Typical employment systems enable employers to post available positions, and further enable job seekers to search available positions for positions that meet some search criteria. Some employment systems enable job seekers to post a resume, and further enable employers to search for resumes that contain certain keywords. However, traditional employment systems are inefficient for many reasons.

Typically, employment systems associate an open position with only one employer account. It is frequently assumed that the same person (e.g., a human resources recruiter) uses the account to provide the system with details about the open position and to review applicants. However, in the corporate recruiting space, frequently more than one person is involved in the hiring process. For example, a human resources recruiter may be in charge of facilitating the hiring process (e.g., working with a hiring manager to generate a job description, posting the job to various online and media resources, scheduling interviews and making official offers), while a hiring manager with greater expertise in the job's requirements is focused on reviewing and interviewing candidates, evaluating trade-offs between a candidate's skill set and the job's requirements. As a result, typical employment systems are inefficient for many corporate employee seekers.

Further, typical employment systems are either employer-specific (i.e., the system is devoted to a single employer) or are public (i.e., employment seekers are visible to and accessible by all employers and vice versa). Employer-specific systems provide exclusive access by the employer to participating candidates; however, the pool of candidates may be smaller than would be present in a public employment system. A public employment system provides a larger pool of candidates; however, an employer may lose out on good candidates because of the larger employer pool.

SUMMARY

In one embodiment, a method of operating an employment system is provided. The method includes enabling a first user associated with an employee seeker to enter a shell for a position and enabling a second user associated with the employee seeker to enter additional information about the position. The second user is distinctly identifiable by the employment system from the first user. The method also includes associating an employment seeker with the position.

In another embodiment, associating the employment seeker with the position includes determining a matching score between the employment seeker and the position. In one embodiment, determining the matching score includes performing a bi-directional match. In another embodiment, the first user is a human resources recruiter and the second user is a hiring manger.

In one embodiment, the method includes categorizing a first set of one or more employment seekers as public and categorizing a second set of one or more employment seekers as participants in a co-operative. The method also includes enabling all employee seekers to access or view information about members of the first set and enabling all employee seekers that are members of the co-operative to access or view information about members of the second set.

In another embodiment, the method also includes categorizing a third set of one or more employment seekers as specific to a first employee seeker and enabling the first employee seeker to access or view information about members of the third set. In one embodiment, categorizing the second set includes identifying a first employment seeker, the first employment seeker interacting with the employment system through a component, the component being specific to a first employee seeker and, if the first employee seeker is associated with the co-operative, enabling the first employment seeker to associate with the co-operative.

In another embodiment, the employment system bi-directionally matches employment seekers and posted positions. In still another embodiment, the employment seeker submits a resume to the component. In yet another embodiment, enabling the first employment seeker to associate with the co-operative includes creating a match profile for the first employment seeker.

In one embodiment, an employment system is provided. The system includes a first interface configured to enable a first user associated with an employee seeker to enter a shell for a position and a second interface configured to enable a second user associated with the employee seeker to enter additional information about the position, the second user being distinctly identifiable by the employment system from the first user. The system also includes an association unit configured to associate an employment seeker with the position.

In another embodiment, the association unit is further configured to determine a matching score between the employment seeker and the position. In still another embodiment, the association unit is further configured to perform a bi-directional match. In yet another embodiment, the first user is a human resources recruiter and the second user is a hiring manger.

In another embodiment, the system includes a first categorization unit configured to categorize a first set of one or more employment seekers as public and a second categorization unit configured to categorize a second set of one or more employment seekers as participants in a co-operative. The system also includes an access unit configured to enable all employee seekers to access or view information about members of the first set and to enable all employee seekers that are members of the co-operative to access or view information about members of the second set.

In another embodiment, the system also includes a third categorization unit configured to categorize a third set of one or more employment seekers as specific to a first employee seeker, wherein the access unit is further configured to enable the first employee seeker to access or view information about members of the third set.

In one embodiment, the second categorization unit is further configured to identify a first employment seeker, the first employment seeker interacting with the employment system through a component, the component being specific to a first employee seeker, and to, if the first employee seeker is associated with the co-operative, enable the first employment seeker to associate with the co-operative.

In another embodiment, the system includes a bi-directional matching unit configured to bi-directionally match employment seekers and posted positions. In another embodiment, the component accepts a resume from the employment seeker. In still another embodiment, the second categorization unit is further configured to create a match profile for the first employment seeker, if the employment seeker associates with the co-operative.

Additional features and advantages are described in, and will be apparent from, the following Detailed Description and the figures.

BRIEF DESCRIPTION OF THE FIGURES

FIG. 22 is a diagram of a first page match list in accordance with one embodiment.

FIG. 24 is a diagram of a file containing a candidate's more detailed information in accordance with one embodiment.

FIG. 26 is a diagram of a portion of a question tree in accordance with one embodiment.

FIGS. 27A and 27B are diagrams of portions of one design of a webpage used to enter seeker information using questions and answers in accordance with one embodiment.

FIG. 28 is a diagram of a similar series of questions to those presented in FIG. 27.

DETAILED DESCRIPTION

Match-Based Employment System Overview

Figure 1:
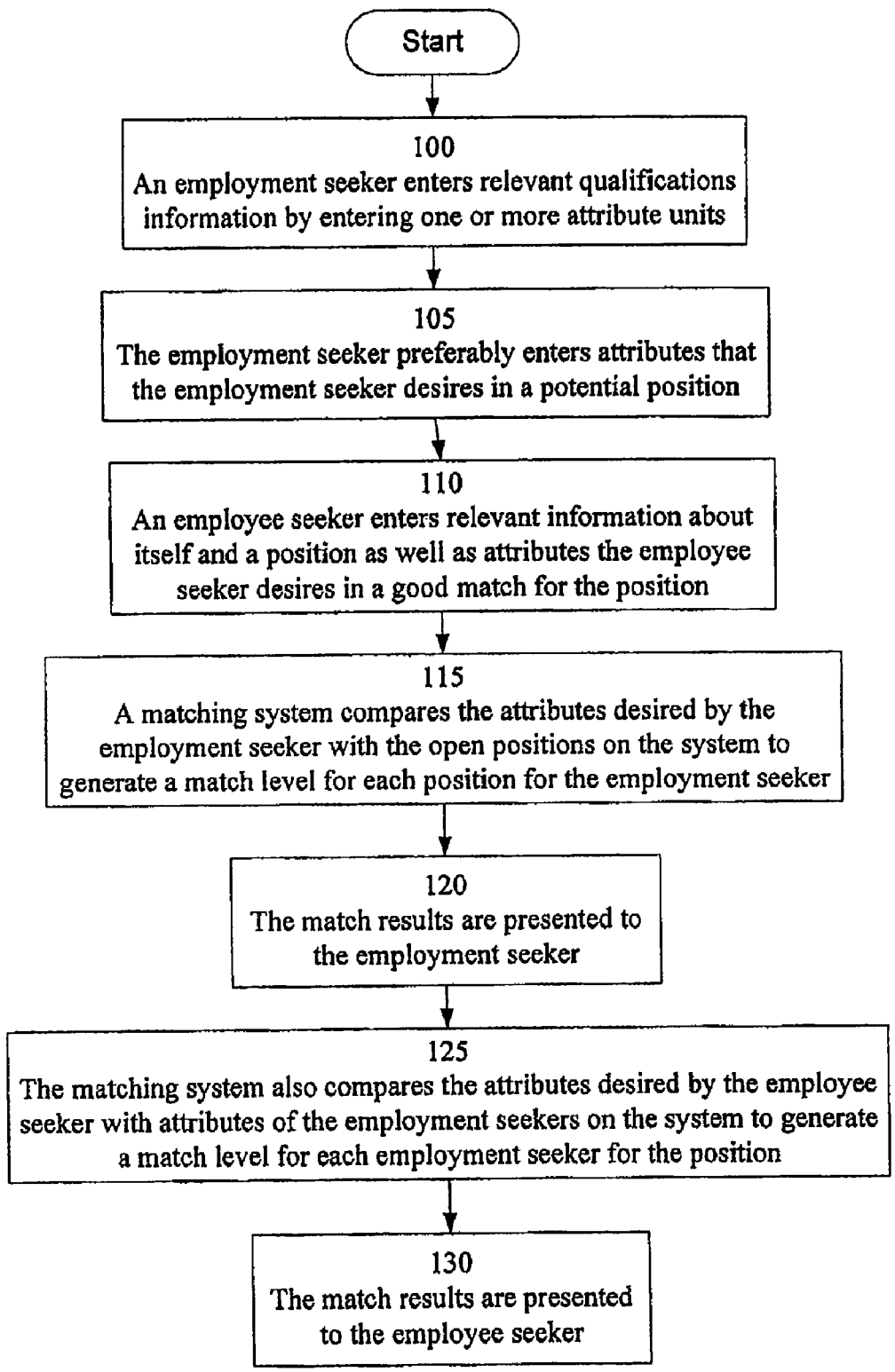
FIG. 1 is a flow diagram of a preferred process for matching employment seekers with positions in accordance with one embodiment.

Referring now to FIGS. 1-18, in one embodiment, a match-based employment system is provided. FIG. 1 shows a preferred process for matching employment seekers with positions. Preferably, at step 100, an employment seeker (i.e., a system user searching for a full or part time job, independent contractor position, volunteer position, etc.) enters relevant qualifications information (e.g., skills, experience, education, etc.) by entering one or more attribute units; however relevant qualifications information can be entered into fields in any suitable manner. Similarly, at step 105, the employment seeker preferably enters attributes that the employment seeker desires in a potential position. It should be noted that steps 100 and 105 can be performed in any order, including simultaneously.

At step 110, an employee seeker (i.e., a system user searching for an employment seeker to fill a job/position) enters relevant information about itself and a position as well as attributes the employee seeker desires in a good match for the position. Then, at step 115, a matching system compares the attributes desired by the employment seeker with the open positions on the system to generate a match level for each position for the employment seeker.

Next, at step 120, the match results are presented to the employment seeker. Preferably, only positions with a match level that satisfies a threshold condition are presented to the employment seeker. Alternatively, a specified number of positions are presented to the employment seeker at one time, ranked by match level and with the highest ranking positions being presented first. It should be noted that matching results can be presented to the employment seeker in any suitable manner.

At step 125, the matching system also compares the attributes desired by the employee seeker with attributes of the employment seekers on the system to generate a match level for each employment seeker for the position. Preferably, the comparison of steps 115 and 125 are performed simultaneously and return the same value to both the employment seeker and the employee seeker for a pairing of employment seeker and job opening (i.e., two-way matching); however, the comparisons can be performed in any suitable order and the results from one comparison can be used to modify the results of the other comparison.

Then, at step 130, the match results are presented to the employee seeker. Preferably, only employment seekers with a match level that satisfies a threshold condition are presented to the employee seeker. Alternatively, a specified number of employment seekers are presented to the employee seeker at one time, ranked by match level and with the highest ranking employment seekers being presented first. It should be noted that matching results can be presented to the employee seeker in any suitable manner.

Figure 2:
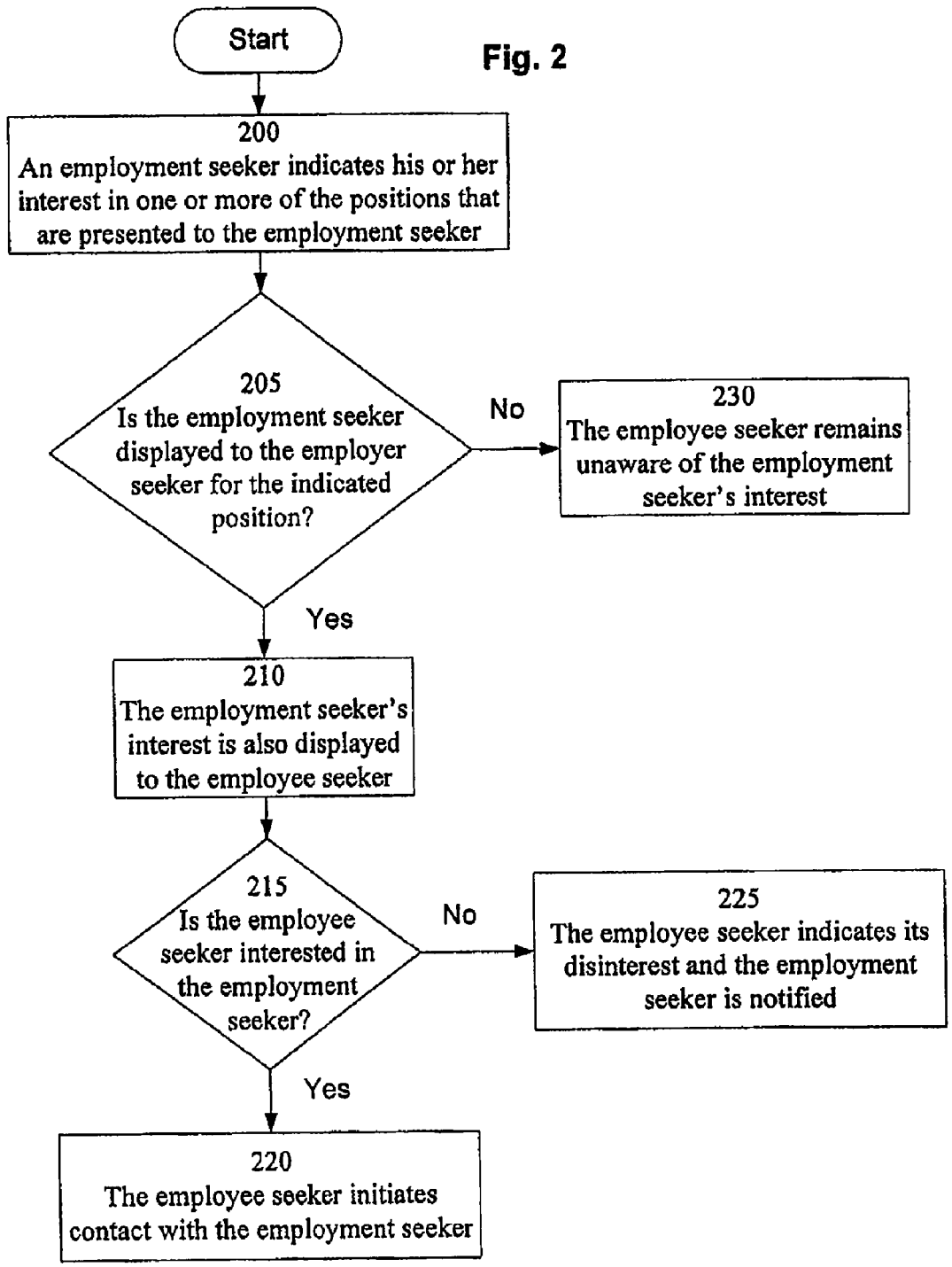
FIG. 2 is a flow diagram of a preferred process for an employment seeker to seek to fill a position in accordance with one embodiment.

FIG. 2 shows a preferred process for an employment seeker to seek to fill a position; however other suitable processes can be followed. Instead of submitting a resume when interested in a position as is common in traditional employment systems, employment seekers can indicate their interest in positions presented to them. After matching results are presented to an employment seeker, at step 200, an employment seeker indicates his or her interest in one or more of the positions that are presented to the employment seeker (e.g., the match results of step 120. At step 205, it is determined whether the employment seeker is displayed to the employer seeker for the indicated position. Preferably, the employment seeker is displayed to the employee seeker if the employment seeker is one of the top matches for a position and the match is strong enough to satisfy the threshold condition; however the employment seeker can be displayed to the employee seeker under any other suitable conditions. Similarly, the employment seeker is preferably not displayed to the employee seeker if the employment seeker is not one of the top matches, the match is not strong enough to satisfy a threshold condition, or any other suitable reason for the employment seeker to not be displayed.

If the employment seeker is displayed, at step 210, the employment seeker's interest is also displayed to the employee seeker. Then, the employee seeker determines whether it is interested in the employment seeker at step 215. It should be noted that the employment seeker's interest is not necessarily displayed to the employee seeker before step 215 or at any other time. If the employee seeker is interested in the employment seeker, preferably the employee seeker initiates contact with the employment seeker at step 220; however any suitable process for initiating contact (e.g., the employee seeker indicating interest, paying a fee and then being put into contact with the employment seeker or any other suitable process) can be followed. If the employee seeker is not interested in the employment system, preferably, at step 225, the employee seeker indicates its disinterest and the employment seeker is notified; however, it is not necessary for the employee seeker to indicate disinterest or for the employment seeker to be notified. The employee seeker can remove an employment seeker from its display, ignore the employment seeker, fill the position without reviewing the employment seeker, or take any other suitable action. Further, the employment seeker may be notified that a position is filled, notified when an amount of time following his or her indication of interest has passed, notified of changes in the position, provided with no notice at all, or provided any other suitable notice.

If the employment seeker is not displayed to the employer seeker, at step 230, the employee seeker remains unaware of the employment seeker's interest. Thus, unqualified employment seekers (e.g., those whose match scores rank low and/or do not match strongly enough to satisfy a threshold condition) are not displayed to employee seekers, and the employee seeker's time and effort is not spent weeding out interested, but unqualified, employment seekers.

Preferably, changes to an employment seeker's attributes and/or a position are not tracked; however, such changes can be tracked, if desired. In an example embodiment, changes to an employment seeker's attributes are recorded, and when an employment seeker is displayed to an employee seeker for a position, the employee seeker is also able to view changes the employment seeker made to his or her attributes. Since an employment seeker can be tempted to exaggerate attributes when few employee seekers are interested, the tracked changes can provide employee seekers with an indication that some attributes may be inaccurate or exaggerated. Similarly, in another example embodiment, changes to a position are recorded and presented to an employment seeker when the employment seeker views the position.

Preferably, the recency of attributes (e.g., work or skill experience) is taken into consideration during matching without the need for an employee seeker or employment seeker to specify a desired recency value; however, the recency of attributes can be taken into consideration during matching or excluded from consideration in any suitable manner. In one embodiment, matching calculations automatically account for recency by weighing more recent attributes differently than older attributes. For example, a year's experience of C++ programming may be weighted 100% if it was during the past year, 90% if it was a year old, 80% if two years old, 70% if three years old, and so on. The relationship between the weight of an attribute and the attribute's recency can be expressed by any suitable function and preferably will not result in any recency value being associated with a negative weight (e.g., in the progression described above, anything over nine years old would still be weighted 10% or 0% or any other suitable non-negative percentage); however the relationship between recency and weight can be any suitable continuous or discontinuous function.

Figure 3:
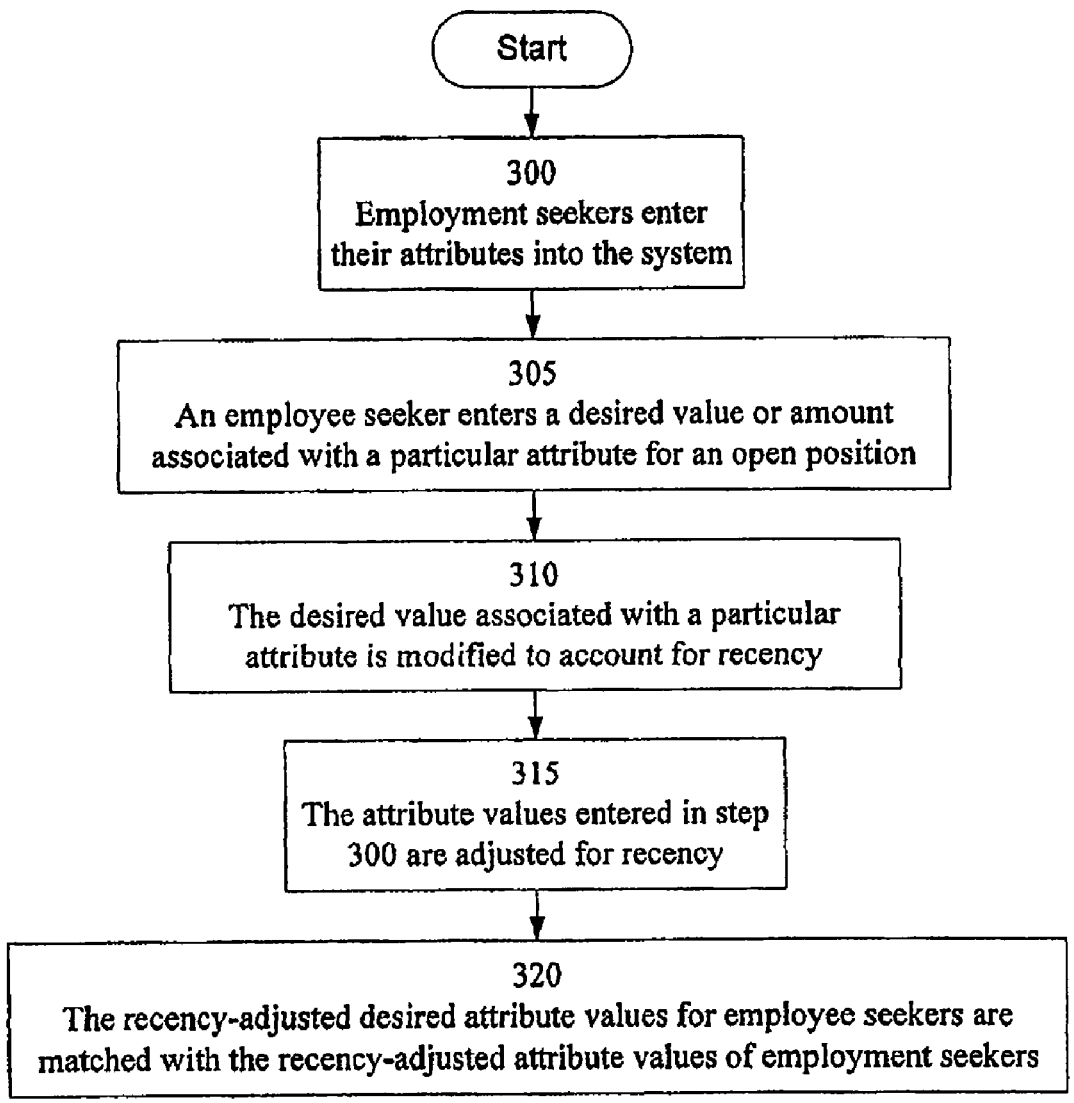
FIG. 3 is a flow diagram of a preferred process for factoring attribute recency when matching in an employment system in accordance with one embodiment.

FIG. 3 shows a preferred process for factoring attribute recency when matching in an employment system; however, any suitable process can be used. At step 300, employment seekers enter their attributes into the system. The attributes are associated with one or more fixed times or time periods. For example, some employment seeker may have experience programming in Perl from June of 1997 to December of 2003 and from November of 2004 to January of 2005. At step 305, an employee seeker enters a desired value or amount associated with a particular attribute for an open position. For example, the employee seeker can specify that 5 years of experience programming in Perl is desired for a Senior Perl Programmer position. It should be noted that steps 300 and 305 can occur in any order or simultaneously and can be repeated.

At step 310, the desired value associated with a particular attribute is modified to account for recency. Preferably, the resulting modified value is equal to the value derived by adjusting the attributes of a hypothetical employment seeker who has the desired amount of that attribute continuously up to the current date for recency; however, any suitable modification can be made. For example, a hypothetical employment seeker who has programmed Perl for the most recent five years would have the most recent year counted as 1 year of experience, the year before that as 0.9 years of experience, and 0.8, 0.7 and 0.6 years of experience for the three years before that, respectively. Thus, the total recency-adjusted value of the hypothetical employment seeker's Perl programming experience is 1+0.9+0.8+0.7+0.6, or 4.0 years of Perl programming experience. As a result, when the employee seeker's desire for 5 years of Perl programming experience is modified to account for recency, it becomes 4 years of Perl programming experience.

At step 315, the attribute values entered in step 300 are adjusted for recency. For example, in the case of the employment seeker discussed above who had experience programming in Perl from June of 1997 to December of 2003 and from November of 2004 to January of 2005, assuming it is now March of 2005, the November 2004 to January 2005 experience counts as 0.25 years. The March 2003 to December 2003 experience counts as 0.675 years (i.e., 90% of 0.75 years). Similarly, March 2002 to February 2003 counts as 0.8 years, March 2001 to February 2002 counts as 0.7 years, March 2000 to February 2001 counts as 0.6 years, March of 1999 to February 2000 counts as 0.5 years, March 1998 to February 1999 counts as 0.4 years and June 1997 to February 1998 counts as 0.225 years (i.e., 30% of 0.75 years). As a result, the employment seeker has 0.25+0.675+0.8+0.7+0.6+0.5+0.4+0.225=4.15 years of recency-adjusted Perl programming experience.

At step 320, the recency-adjusted desired attribute values for employee seekers are matched with the recency-adjusted attribute values of employment seekers. Continuing the examples above, the employee seeker's recency-adjusted desired Perl programming experience value of four years would be satisfied by the employment seeker's recency-adjusted Perl programming experience of 4.15 years. However, the effect of recency becomes clearer when observing that had the employment seeker not programmed in Perl from November 2004 to January 2005, the employment seeker's Perl programming experience would not be sufficient to satisfy the employee seeker's experience desires even though the employment seeker had over five years of Perl programming experience earlier in his or her career. The recency adjustments of the above examples are for illustrative purposes, and it should be noted that any other suitable adjustments can be made.

Preferably, an employee seeker and/or employment seeker does not need to specify any recency value or calculation and recency is automatically factored into matches; however, in various embodiments an employee seeker and/or employment seeker can specify a recency value or calculation or manually cause recency to be factored into matches in any suitable manner, or recency can not be factored into matches. In one embodiment, an employee seeker can specify a desired attribute and a desired recency for the attribute. For example, an employee seeker may specify that a good candidate for a position will have at least three years of C++ experience within the last 7 years. Similarly, in another embodiment, an employment seeker may specify a recency condition for a desired position. For example, an employment seeker may desire that the position be with a relatively new company and could specify that the company be one that started within the past three years. Alternatively, the employment seeker may desire a company with a mature casual dress code and could require that the initiation of the casual dress code be no more recent than the last 5 years.

Preferably, the match-based employment system does not make individually determined recommendations for changes to employee seeker, position and/or employment seeker attributes; however, an alternative match-based employment system can provide individually determined change recommendations to employee seeker, position and/or employment seeker attributes or any other suitable user-controlled data. For example, the alternative match-based employment system can periodically and/or occasionally prompt a seeker to provide additional and/or alternative information, thus improving the seeker's use of the system. Specifically, for an employee seeker that has failed to provide dress code information for a position and is offering $50,000 in compensation, the match-based employment system can prompt the employee seeker to enter dress code information to potentially improve match scores. The alternative match-based employment system can also determine that employment seekers (who possess the attributes desired by the employee seeker) specify an average desired compensation of $100,000 and/or that employment seekers with the specified skills have accepted positions offering an average of $80,000 in desired compensation. The information is provided to the employee seeker, and the employee seeker is given the opportunity to alter his or her match profile for the position.

Similarly, for an employment seeker who has entered several programming-related skills, but not some others that the system has determined are frequently associated with one or more of the entered skills and who is seeking $80,000 in compensation, the alternative match-based employment system can prompt the employment seeker to provide the missing associated skills to potentially improve match scores. The alternative match-based employment system can also determine that recently filled positions that possess the attributes desired by the employment seeker had a compensation level of only $65,000. The information is provided to the employment seeker, and the employment seeker is given the opportunity to alter his or her match profile.

Figure 4:
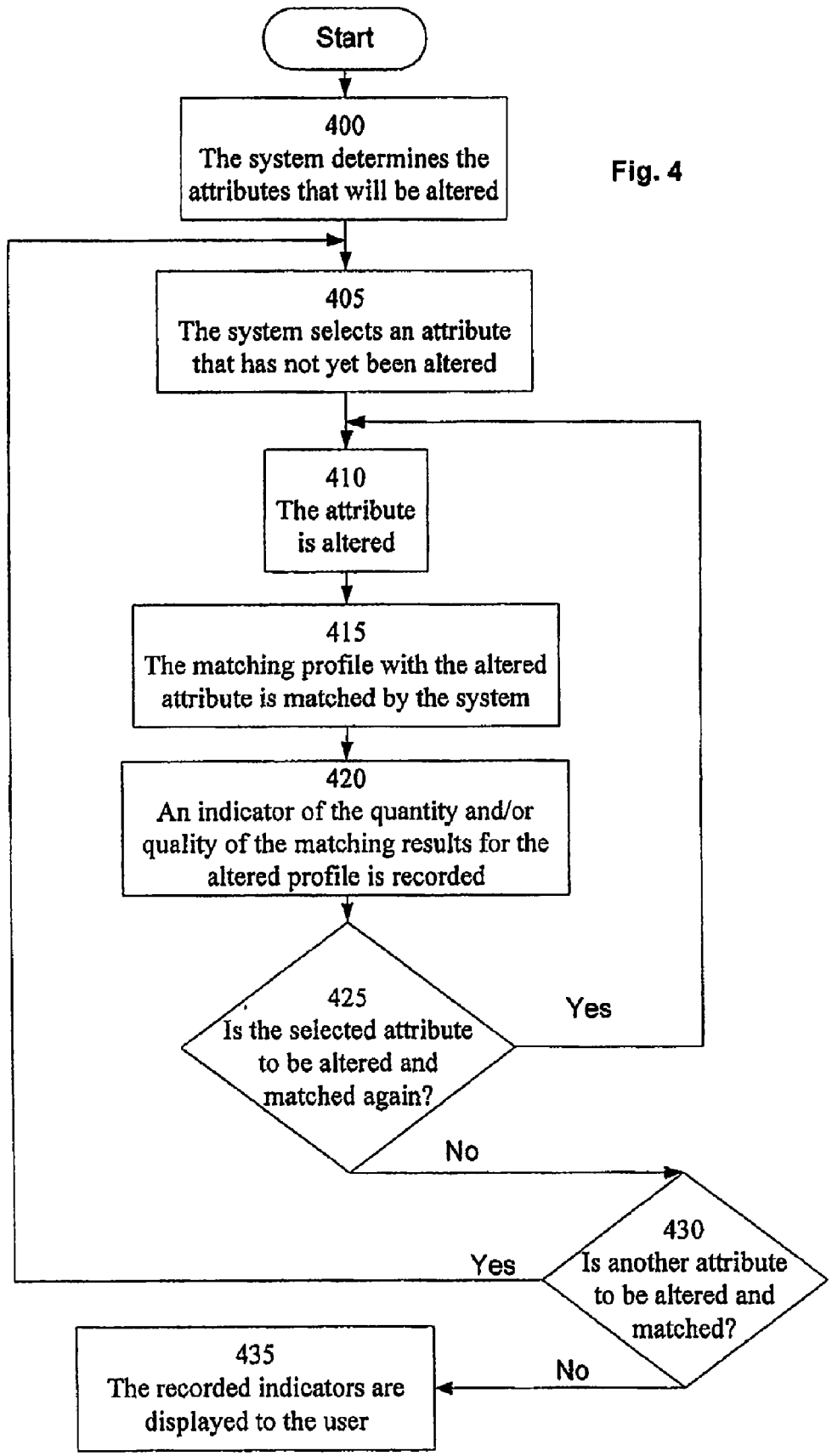
FIG. 4 is a flow diagram of a preferred process of providing feedback to system users in accordance with one embodiment.

Preferably, the match-based employment system supplies feedback to users to provide them with information on how their matching results would change if they changed their own attributes and/or their desired attributes; however, the match-based employment system can provide other suitable kinds of feedback or no feedback at all. FIG. 4 shows a preferred process of providing feedback to system users; however, feedback can be provided by any other suitable process. The system alters one or more attributes of the matching profile for a user and generates alternative matching results for the altered profile. At step 400, the system determines the attributes that will be altered. It is preferred that the system determine the attributes to be altered at one time; however, the system can determine the attributes individually and at any suitable time during the feedback process or in any other suitable manner.

At step 405, the system selects an attribute that has not yet been altered. At step 410, the attribute is altered. The attribute can be altered by adding or subtracting a value, multiplying or dividing by a value, applying a function, selecting fixed points on a scale of possible values for that attribute, entirely or partly randomly or pseudo-randomly, or in any other suitable manner. At step 415, the matching profile with the altered attribute is matched by the system. At step 420, an indicator of the quantity and/or quality of the matching results for the altered profile is recorded. Preferably, the indicator is the number of results that have a matching value greater than a threshold value; however, the indicator can be any suitable indication of match result quantity and/or quality.

At step 425, it is determined whether the selected attribute is to be altered and matched again. If the selected attribute is to be altered and matched again, the process repeats at step 410. If not, at step 430, it is determined whether another attribute is to be altered and matched. If another attribute is to be altered and matched, the process repeats at step 405. If not, at step 435, the recorded indicators are displayed to the user.

Figure 5:
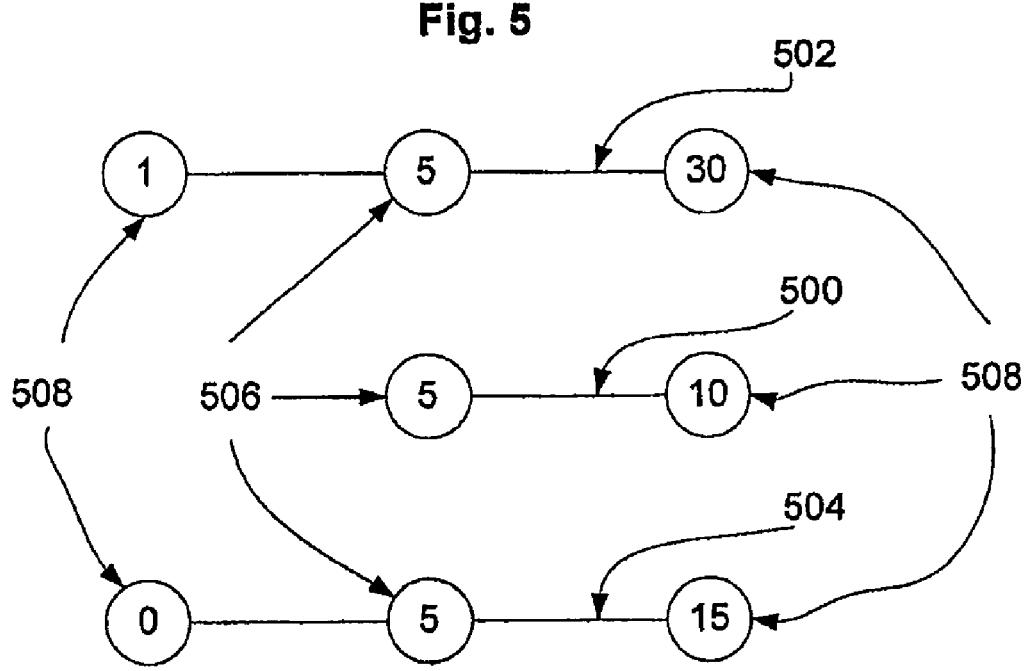
FIG. 5 is a diagram of different search results, such as the results generated by the process of FIG. 4, displayed in parallel lines in accordance with one embodiment.
Figure 6:
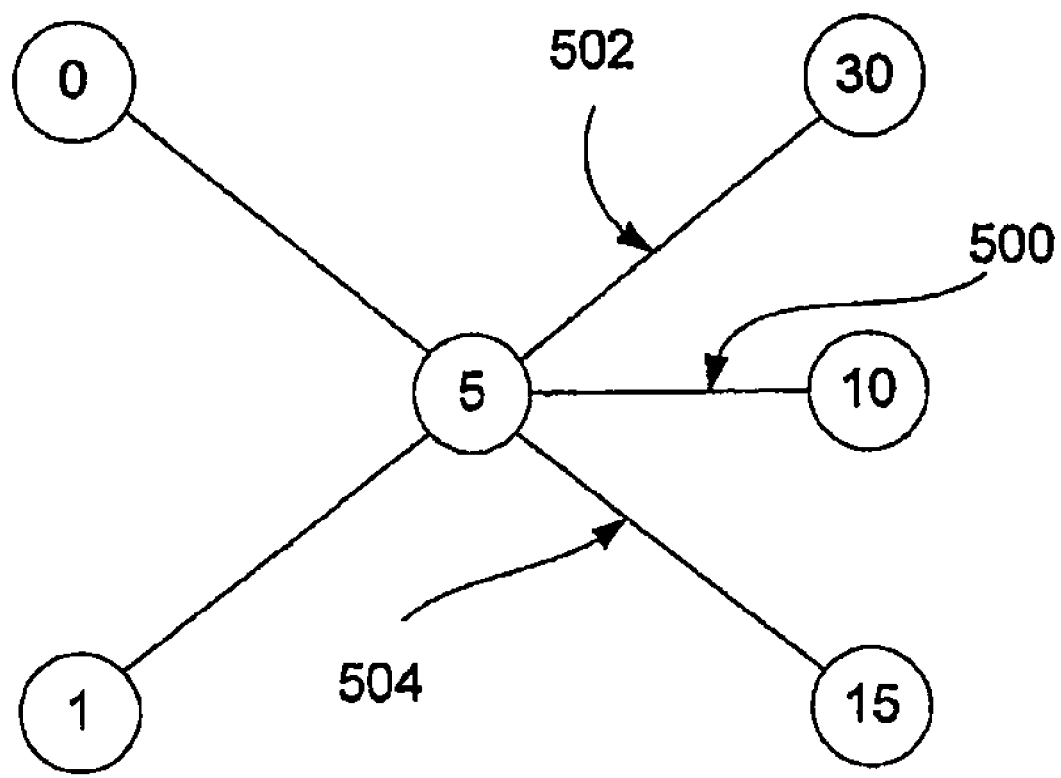
FIG. 6 is a diagram of different search results, such as the results generated by the process of FIG. 4, displayed in intersecting lines in accordance with one embodiment.

FIGS. 5 and 6 show preferred display configurations of feedback provided by the process of FIG. 4; however, the feedback can be displayed in any suitable configuration. The displays are based on a hypothetical employment seeker who, in addition to having other attributes, desires a casual work environment within twenty miles of his home that pays $100,000 a year. Based upon those attributes, the system in the hypothetical example generates five results that satisfy a threshold matching level. The system then generates an alternative matching profile in which all attributes are the same except that the work environment is casual only on Fridays. That alternative matching profile results in ten matches that satisfy the threshold. Similarly, a matching for which the desired distance is five miles yields one match, and when the desired distance is forty miles, the system yields thirty matches. Further, a desired compensation level of $75,000 yields fifteen matches, and a desired compensation level of $150,000 yields zero matches. As shown in FIGS. 5 and 6, Each of these alternative matching profile results are presented to the employment seeker by displaying the attribute alteration (i.e., the difference between the matching profile entered by the employment seeker and the alternative matching profile) and the number of matches the alternative matching profile would generate.

In FIG. 5, the user entered a matching profile and two alternative matching profiles generated by altering the same attribute are displayed co-linearly, and a separate, non-intersecting line is displayed for each altered attribute. Thus, line 500 displays the results of modifying the work attire attribute, line 502 displays the results of modifying the distance attribute and line 504 displays the results of modifying the desired contribution level attribute. The indication of results for the unaltered matching profile 506 is displayed on line 500, line 502 and line 504. Similarly, indications of results for altered matching profiles 508 are also displayed on line 500, line 502 and line 504.

As shown in FIG. 6, when multiple attributes are modified to produce multiple alternative matching profiles, alternative matching profiles based upon the same attribute being modified can be displayed co-linearly, such that the user entered matching profile is a common intersection point for the different co-linearly displayed matching profiles. Thus, line 500, line 502 and line 504 are arranged such that they intersect at the results indication for the unaltered matching profile 506, creating a star or asterisk shaped display. The display of FIG. 6 can have the advantage over the display of FIG. 5 of being more compact; however, the display of FIG. 5 may be easier to read when a large number of attributes are altered. It should be noted that feedback can also be displayed using a combination of the displays of FIGS. 5 and 6 or any other suitable display configuration.

In one alternative embodiment, human resources information is determined or mined from the employment system's activity and/or a database of transactions or other suitable data based on the employment system's activity (e.g., positions being filled by employment seekers, position and employment seeker match profiles, etc.) and made available to the employment system's users. For example, system users can determine which employee seekers, or which type of employee seekers (e.g., web-based programming consultant firms, Fortune 500 companies, Pharmaceutical companies, political consultants, etc.), are hiring, which regions (e.g., Southern States, Chicago-area, Alaska, etc.) or fields (e.g., JAVA programming, truck driving, security, toxic mold litigation, etc.) are hiring, what compensation rates are being offered, the common attributes of employment seekers that are being hired (e.g., education level, certificates held, age, experience level, desired compensation level, etc.), the common attributes of employee seekers and/or positions that are generating interest (e.g., benefits, work environment, compensation level, type of work, etc.), the compensation level being sought by employment seekers with particular skills, or any other suitable information. System users can use the human resources information when generating their own matching profiles, when deciding whether to modify their matching profile, when just investigating the marketplace, or for any other suitable reason. Users can mine or query the human resources information by constructing custom database queries (e.g., an SQL query), using standard, system-provided queries, using query wizards or in any other suitable manner. If desired, the queries can be read-only; thus, preventing a user from altering the information stored in the database.

Figure 7:
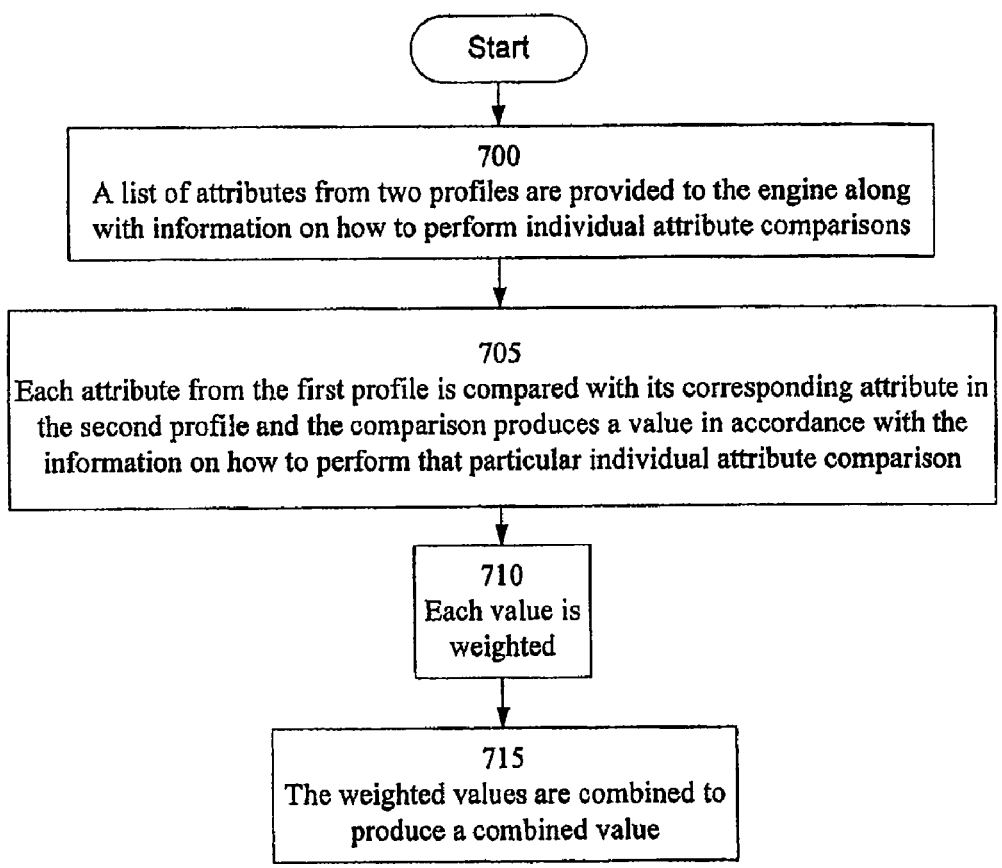
FIG. 7 is a flow diagram of a preferred matching process in accordance with one embodiment.

Preferably, matching is performed by a matching engine on one or more servers; however, matching can be performed by any suitable custom matching engine, suitable commercially available matching engine, or by any other suitable mechanism. As shown in FIG. 7, a matching engine compares matching profiles, attribute/field by attribute/field to determine a matching value for the profiles. Each attribute or field of a profile is compared with a corresponding attribute or field in another to determine how well the two match. Using compensation level as an example, the compensation level specified by an employment seeker could be $100,000 while the compensation level specified by the position is $50,000. When comparing the two, the match engine can assign a value of 0 to indicate it is not an exact match (returning 1 only when the values match exactly or within some threshold error). Alternatively, the matching engine can not assign values in an all-or-nothing manner and assign a value of 0.5 to indicate that the offered compensation is only half of the desired compensation. Similarly, if the position offered $135,000, the matching engine can assign a value of 1 to indicate the offer meets or exceeds the desire, 1.35 to indicate by how much the offer exceeds the desire, or any other suitable value assignment.

The determination process can be the same for each attribute pair; however the determination process can also vary from one pair of attributes to another pair. For example, the matching engine may assign values in an all-or-nothing manner for work attire preferences, but assign values in a percentage satisfaction manner for salary and distance from a location. In the matching process shown in FIG. 7, the matching engine is supplied with not just attribute values, but also information on how to perform comparisons. At step 700, a list of attributes from two profiles are provided to the engine along with information on how to perform individual attribute comparisons. It should be noted that the information on how to perform individual attribute comparisons could alternatively be programmed into the engine, provided at a different time than profile information, or provided in any other suitable manner. At step 705, each attribute from the first profile is compared with its corresponding attribute in the second profile and the comparison produces a value in accordance with the information on how to perform that particular individual attribute comparison. Preferably, if an attribute is not provided, the comparison produces a value of zero; however, the matching engine can produce any suitable value.

At step 710, each value is weighted. Preferably, each attribute is associated with a weight value that is multiplied by the value generated in step 705; however, weighting can be accomplished by any other suitable weighting process or formula. At step 715, the weighted values are combined to produce a combined value. Preferably, the weighted values are combined by summing all of the weighted values; however, the weighted values can be combined by multiplying the weighted values together or any other suitable process or formula. Preferably, the combined value is scaled to a range of 0 to 100% to produce a match score or value, with 100% being an ideal match on each attribute; however, the combined value can be scaled to any suitable range, including ranges with maxima in excess of 100%. Further, the combined value can be the match score or value without scaling, or any other suitable operation can be performed on the combined value to produce the matching score or value.

Employment Seeker Match Profile Collection and Management

In one embodiment, an employment seeker match profile comprises an employment seeker background profile and an employment seeker preference profile. Preferably, the match-based employment system enables the collection of background profile information and one preference profile; however, an alternative match-based employment system can enable collection of more than one preference profile, more than one background profile, or any other suitable information. In such an alternative match-based employment system, a template for generating additional profiles can be based upon an existing preference profile.

Preferably, the match-based employment system enables editing and/or deletion of existing preference profiles and/or background profiles; however, editing or deletion of preference profiles or background profiled can be disallowed, if desired. An audit trail (e.g., which element was changed, old value, date changed) is preferably not generated or stored; however, an audit trail for background data changes or preference data changes can be generated, stored and made available to employee seekers viewing the employment seeker's details. The audit trail can provide an indication to employee seekers when an employment seeker may be exaggerating about his or her background. If desired, no audit trail is maintained when missing data is supplied, under the assumption that such data is less likely to be exaggerated.

Preferably, the match-based employment system prompts a user to enter a majority or substantially all of the user's information before any matching results are presented to the user; however, an alternative match-based employment system can present initial matching results to a user after the user enters only a subset of the user's information or at any other suitable point in the information gathering process. The alternative system can prompt the user to enter missing criteria throughout the remainder of the user experience.

Figure 8:
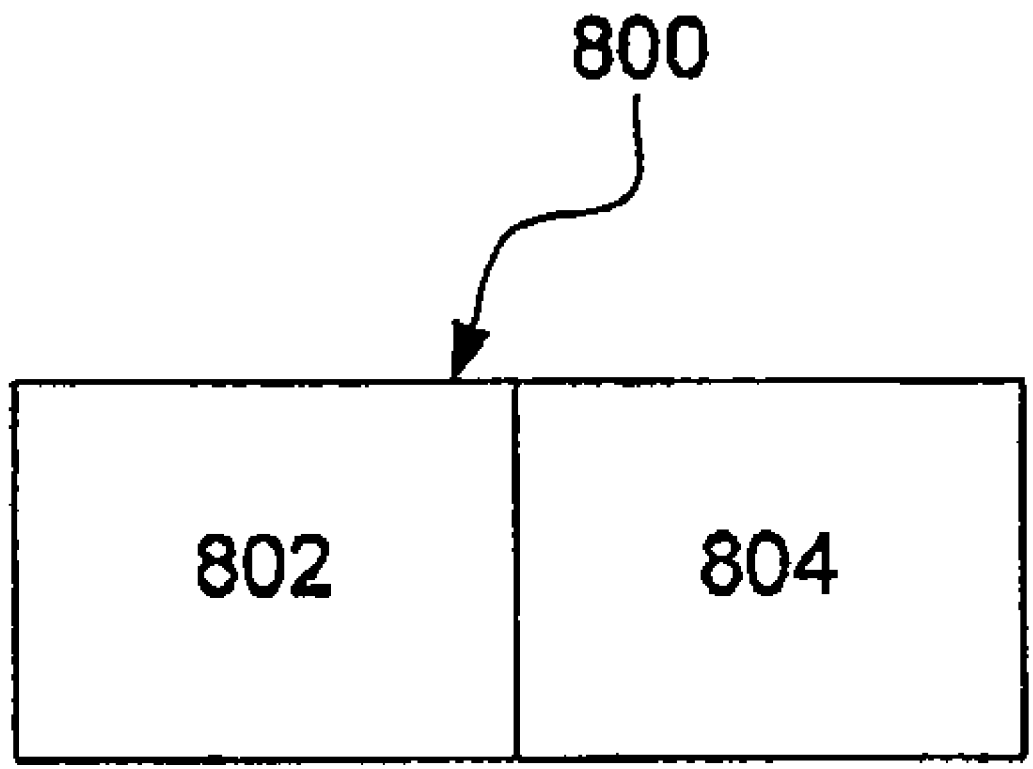
FIG. 8 is a block diagram of an attribute unit in accordance with one embodiment.

Preferably, one or more attributes included in the matching criteria are provided by entering an attribute unit; however, attributes can be provided in any suitable manner. As depicted in FIG. 8, an attribute unit 800 is comprised of a duration 802 and one or more attributes 804 associated with that duration 802. It should be noted that the graphical representation of an attribute unit 800 in FIG. 8 is intended only to illustrate the concept and that attribute unit 800 can be represented virtually using a table, a structure, an array, an object, a class, or any other suitable virtual representation. An attribute associated with a duration may be associated with a portion of the duration (e.g., 10%) or the entire duration.

Types of attribute unit include, but are not limited to, work units or employment attribute units (e.g., employment skill units and/or employment exposure skill units), educational background units and status units.

In one embodiment, employment seekers enter their work experience in work units (i.e., blocks of time that represent a particular job or assignment wherein the employment seeker applied a set of skills and held a particular title and had a particular set of responsibilities). For example, an employment seeker who worked as a sales representative for four years at IBM and then worked as a manager at IBM for four more years may enter two work units, one for the sales representative experience and one for the manager position experience. Within each work unit, employment seekers apportion how much of their time at the position represented by the work unit that they spent on each skill therein (i.e., C++90%, Java 10%, Internet applications 45%, game platforms 68%, operating systems 5%, PDA applications 15%, etc.).

Figure 9:
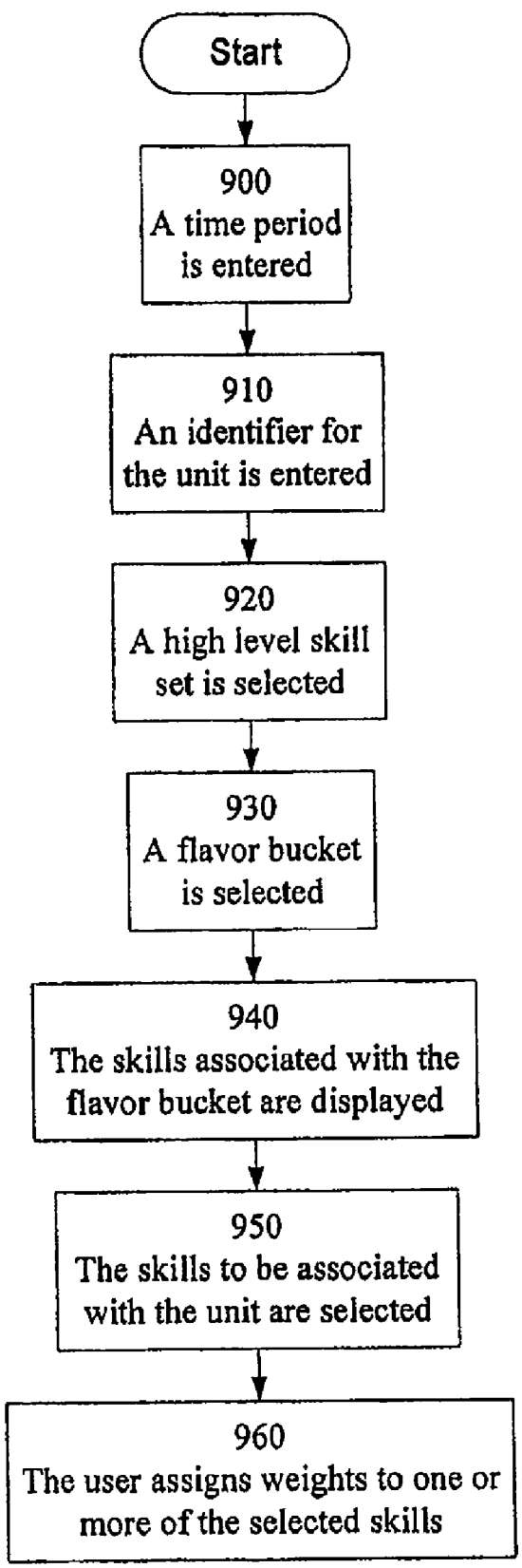
FIG. 9 is a preferred process for entering an attribute unit, in particular a work unit, in accordance with one embodiment.

A preferred process for entering an attribute unit, in particular a work unit, is shown in FIG. 9; however, an attribute unit can be entered in any suitable manner. At step 900, a time period is entered. The time period is preferably entered by specifying a beginning point (e.g., a specific date, a year and month, etc.) and an ending point (e.g., specific date, year and month, current/present, etc.); however, the time period can be entered in any suitable manner. At step 910, an identifier for the unit is entered. Preferably, the identifier is a combination of an organization (e.g., an employer) and a descriptor (e.g., a job title); however, the identifier can be any suitable identifier for distinguishing the unit from other units. Preferably, an indication of whether the unit involved management activities and, if so, an indication of the quantity, quality or character of the management activities are also entered; however, it is not necessary to enable entry of this information.

At step 920, a high level skill set is selected. Preferably, the high level skill sets are categorized by industry, wherein the skills in a high level skill set are the skills associated with that industry; however, the high level skill sets can be categorized in any other suitable manner. Preferably, the high level skill sets include one or more skills; however, the high level skill set can also, or instead, include a trait of the unit (e.g., the industry to which the unit relates). Also, when the high level skill sets include one or more skills, those skills are preferably organized hierarchically; however, the skills can be organized in non-hierarchically or in any other suitable manner.

At step 930, a flavor bucket is selected. Preferably, the flavor bucket is part of the top level of a hierarchy of skills in the high level skill set; however, the flavor bucket could be any suitable set of skills. Also, the flavor bucket is preferably associated with a profession, wherein the skills associated with that profession are included in the flavor bucket; however, the flavor bucket can be associated with any other suitable categorization of skills.

At step 940, the skills associated with the flavor bucket are displayed. Preferably, the skills are organized hierarchically; however, the skills can be organized non-hierarchically or in any other suitable manner. At step 950, the skills to be associated with the unit are selected. If the skills are organized hierarchically, it is beneficial for the user to enter as specific of skills (i.e., low on the hierarchy) as possible because when matching is performed, if the unit's skill is included in the hierarchy below the desired skill, preferably, the desired skill is met. However, if the unit's skill is above the desired skill in the hierarchy, the desired skill is preferably not met. However, the effect of the hierarchy on matching can follow any suitable protocol.

Preferably, a user can search for a skill to associate with the unit outside of the high level skill set and/or flavor bucket; however, employment systems can disable searching for skills outside of the high level skill set and/or flavor bucket. Thus, if a user misjudges the hierarchy, he or she can still find the appropriate skill for the unit if it is available.

At step 960, the user assigns weights to one or more of the selected skills. Preferably, the user has a limited number of points (e.g., 10) to apportion between the skills; however, the weights can be assigned in any other suitable manner. If the user does not apportion any points to a skill, that skill is preferably not considered in the matching calculations, but is still visible to potential matches viewing the user's profile. However, skills that are not apportioned any points can be included in the matching calculations in any suitable manner.

Preferably, the user can also associate other information (e.g., text) with the unit that is not used in the matching calculations; however, employment systems are not required to enable users to associate such information with the unit.

A work unit may be independent of any particular position. For example, an employment seeker who worked as a programmer for four years, but who spent two years of that time devoted to one project, one month in an intensive training program, and the remainder of the time working on various different projects may enter one work unit for the two year project, one work unit for the training month, and one or more work units for the remainder of the time.

Preferably, the recency of an attribute is figured into the match calculation in the manner described above; however, recency can be figured into the match calculation in any suitable manner. For example, a duration can be recorded for a attribute unit (e.g., a work unit) as part of the attribute unit's creation. A duration can be entered indirectly by specifying a beginning and ending date. Alternatively, a duration can be entered directly and may be accompanied by either a beginning or ending date. The recency of a skill can be determined by comparing the time period of an attribute unit with another duration that ends at the present time. For example, an attribute unit having a duration of two years beginning five years ago and ending three years ago would be counted as recent in its entirety if a recency requirement is "within five years." However, only the most recent one year of the same attribute unit would be counted as recent if the recency requirement is "within four years."

Preferably, employment seekers are not able to specify an importance level for their attributes; however, if desired, an employment system can enable employment seekers to specify an importance level for their attributes. Such an importance level can be used when associating employment seekers and employee seekers to enable an employment seeker to emphasis or de-emphasis any of their attributes. Thus, a programmer who has five years of Cobol experience but does not wish to use Cobol in any new position can specify a low importance level to the Cobol experience. As a result, that programmer will match better to open jobs that require some Cobol experience than if the programmer left that experience out of his profile. At the same time, that experience will be de-emphasized so that his match results are not dominated by his Cobol experience. Similarly, an attorney with experience in patent interference matters and who is more interested in positions that involve that area of the law than any other area can specify a high importance level to the patent interference experience.

Preferably, employment seekers are not able to enter and/or match upon exposure skills (i.e., skills seekers have picked up over time but have not applied seriously in a professional capacity); however, if desired, and employment system can enable employment seekers to enter exposure skills in employment exposure skills units. For matching purposes the duration of an employment exposure skill unit is a time period less than or equal to the smallest granularity for job-related work units. Thus, the weighing of employment exposure skills tend to be small when associating employment seekers and employee seekers. The recency of these exposure skills can vary or can be assigned a fixed value (e.g., now or current).

Preferably, employment seekers enter their education history in the form of a list of one or more degrees/diplomas received. For each entry, employment seekers can preferably specify the type of diploma, the issuing institution, the date received and/or a description of the educational experience; however, if desired the employment system can enable employment seekers to specify any other suitable information. Preferably, the description of the educational experience is not used to associate employment seekers with employee seekers; however, the educational experience can be part of the matching calculation in any suitable manner. Preferably, the description is displayed to employee seekers who match with the employment seeker. Preferably, educational degrees/diplomas/certificates are ordered, and the highest ordered educational entry for an employment seeker is used as the "highest degree attained" education attribute when associating employment seekers and employee seekers; however, education history information need not be ordered and can be figured into the match calculation in any suitable manner.

Alternatively, employment seekers can enter their education history using educational background units in a manner similar to entry of employment history in work units. Educational history units can correspond to the duration of a degree program, a semester or quarter of a degree program, individual courses, and/or units of courses. Attributes included in educational background units can include subjects or skills taught, project types, degrees or certificates earned, evaluation of performances, etc.

Preferably, a brokerage of user background details and preference profile is maintained (e.g., as part of one or more match-based employment systems or as a separate, dedicated system). As employment seekers or employee seekers move from one match-based employment system site to another, it is determined (e.g., via cookie, etc.) whether they have background data and/or matching profiles available in the brokerage. If such data is present in the brokerage, the seeker is able to transfer their information to the new site. Thus, seekers are spared the need to re-enter data. Preferably, the transfer is automatic; however, the transfer could require the user to acknowledge the transfer or be performed in any other suitable manner. Preferably, changes to background data and/or other seeker information on any site is propagated to all sites.

Figure 10:
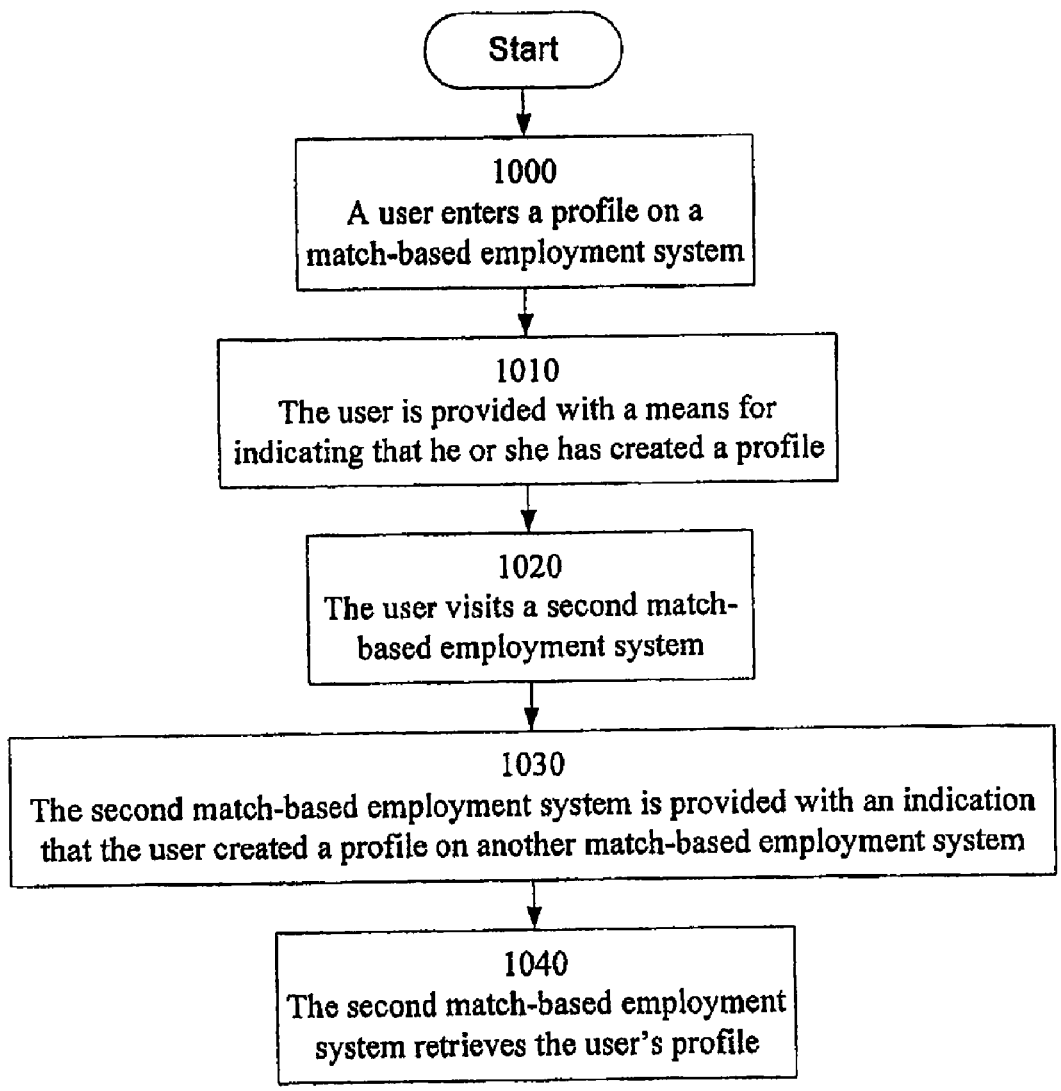
FIG. 10 is the process of brokering user profile in accordance with one embodiment.

FIG. 10 shows the process of brokering user profile in accordance with one embodiment. At step 1000, a user enters a profile (i.e., background/attribute information and preferences) on a match-based employment system. At step 1010, the user is provided with a means for indicating that he or she has created a profile. Preferably, the means is a cookie that includes information about upon which match-based employment system the profile was created; however, the means can be a user identifier, a match-based employment system identifier or any other suitable means. At step 1020, the user visits a second match-based employment system. At step 1030, the second match-based employment system is provided with an indication that the user created a profile on another match-based employment system. At step 1040, the second match-based employment system retrieves the user's profile.

Alternatively, match-based employment systems can interact to perform the function of the brokerage without the need for a separate, dedicated brokerage. For example, when a user visits a site for the first time, there may be an indication (e.g., a cookie or input from the user) that the user has a profile at another match-based site. The profile can then be retrieved from that site. Alternatively, after the site collects sufficient identifying information, it can query other match-based sites to determine whether any of them contain a profile for the user. Preferably, both background information (e.g., attribute units) and preference profiles (i.e., attributes of a desired position, employer or employee) are brokered; however, if desired, only one or the other can be brokered.

Preferably, a seeker is prompted to enter a substantial amount of information before any matching occurs; however, matching can be performed after the seeker enters a minimal amount of data or at any other suitable time. For example, a seeker's (either employment seeker or employee seeker) profile (i.e., background and preferences) can be entered and/or edited iteratively. After matching is performed, the seeker can be prompted to provide additional information or alter existing information in response to various conditions. For example, an employment seeker may not match well with any position displayed to him or her, causing the system to prompt the user to enter missing attributes that might improve the employment seeker's match level for the positions. Alternatively, an employment seeker may match well with a position, but the position is not displayed to the employment seeker because of his or her preferences, causing the system to prompt the employment seeker to augment or modify his or her preferences. Answering iterative data collection questions causes the search/match results to be quickly updated to reflect the new match criteria.

Preferably, seekers (employee seekers or employment seekers) can specify an importance level only for the preferences that they enter (i.e., what they desire in a match; not their own attributes); however, if desired, an employment system can enable seekers to specify an importance level to any match criteria that they enter. The importance level may default to a some value (e.g., a neutral value), thus making it unnecessary for a seeker to enter the importance level for every match criteria. However, if a seeker wishes to raise or lower the relative importance of any criterion in the match, he or she may do so. Preferably, seekers are able to specify importance levels using five levels of granularity for importance; however, any suitable granularity can be used. For example, the granularity of the importance scale can be limited only by the granularity to which the system can differentiate values.

Preferably, the importance weighting acts to adjust the relative importance of the criteria. As a result, marking each criteria as having the highest importance will have the same effect on the match scores as marking each criteria as having the lowest importance. However, if desired, the importance weighting can have an absolute effect on the matching scores (i.e., marking all criteria as having the highest importance will have a different effect on the match scores than marking each criteria as having the lowest importance).

Preferably, an employment seeker is not able to weigh positions by which company is offering the job; however, if desired, an employment system can enable an employment seeker to weigh positions by what company is offering the job. In such a system, if an employment seeker has a strong desire to work for a specific company, that company can be specified as part of the preference information with a high importance weighting. Alternatively, if an employment seeker has a strong desire to not work for a specific company, the company can be specified as part of the preference information with a "not" indication and/or a strongly negative/adverse/anchoring importance level. A hierarchy of company information can be maintained to track which companies are related by being subsidiaries, affiliates, divisions, parents, etc.

Seeker Match Execution and Results

Preferably, employment seeker can have only one preference profile and employee seekers can have only one preference profile for each position being offered; however, if desired, seekers (employee seekers or employment seekers) can have more than one preference profile (i.e., the set of attributes they are seeking). In such systems, when a seeker who has more than one profile views matches, the system displays the match results for the current profile. However, seekers may view match results for any of their preference profiles. Similarly, when an employee seeker views a matching employment seeker who has multiple preference profiles, the matching employment seeker is only displayed once in the result set (e.g., for the best matching score for that employment seeker's profiles).

For employment seekers, match results can contain the company name (perhaps being the most prominently displayed element), the position location, position title, the match element contributing the most to the overall score and/or any other suitable information. In embodiments in which the match-based employment system is controlled by or contains only one employee seeker, the results can emphasize an element other than the company name (e.g., department or job title).

In one embodiment, whenever search/match results are visible on the screen, the match criteria used to produce the results are also displayed; however, the match-based employment systems are not required to enable display of match criteria simultaneously with match results. The match criteria can be arranged to indicate whether they are background or preference profile information. Alternatively, the matching criteria can be arranged to indicate whether they are company or current position profile information.

Preferably, for each match result displayed, the match-based employment system displays a score that reflects the quality/strength of the bi-directional match between the employment seeker and the position; however, a score reflecting a uni-directional match or any other suitable score can be displayed or the system can display no score, as desired. Preferably, the bi-directional match score is calculated such that how well the employment seeker meets the job's desires accounts for 70% of the score and how well the job meets the employment seeker's desires accounts for 30% of the score; however, the score calculation can use any suitable weighting of uni-directional matches. Preferably, the score is expressed as a percentage; however, the score can be expressed in any suitable manner.

Preferably, the match score is computed on the basis of all employee seeker criteria, regardless of whether the employment seeker has supplied answers/attributes specified by the employee seeker's preference criteria. Similarly, the match score is preferably computed on the basis of all employment seeker criteria, regardless of whether the employee seeker has supplied answers/attributes specified by the employment seeker's preference criteria. Preferably, such missing elements/attributes are scored as 0; however, the missing elements can be accounted for or left out of the matching calculation in any suitable manner.

In an alternative embodiment, seekers are able to provide feed back for a matching score. For example, a mechanism (e.g., a link, a button, etc.) is provided in the user interface of the match results listing to enable seekers to indicate that they disagree with the match score for a given listing. If a seeker believes that a match score is out of place (e.g., above or below what the seeker believes is a better candidate, or 100% when the match is not what the seeker envisioned, etc.), then the seeker can enter a dialog with the match-based employment system about the perceived mismatch.

The seeker is presented with a number of common reasons for the perceived mismatch (e.g., signal strength, in which case the system begins iterative data collection; or importance/recency weighting, in which case the system queries the seeker about which skills/attributes seem out of proportion and then collects appropriate weighting; or inappropriate expectations, in which case the system automatically performs additional matches based on alterations of the current matching criteria and provide information about the results and/or suggestions based on the additional matches to the seeker). In this manner, seekers can be prompted to enter importance/recency weighting when the seeker was not forced to enter it initially and/or without presenting the seeker with a large matrix of settings, etc.

Further, signal strength can be used in determining the priority of iterative data collection questions. For example, missing criteria/attributes that would likely have the greatest impact on the results (e.g., the match element question whose weight has the biggest potential sway on the match) can be asked first. Weights can be based on the seeker's industry.

Preferably, the user interface indicates the general quality of the match result set with visual cues; however, the interface is not required to indicate the quality of match results or can indicate the general quality in any suitable manner. For example, results with scores including and over a certain threshold (e.g., 90%) are bolded and/or highlighted, scores including and over another threshold (e.g., 60%) but below the higher threshold are in a normal style, and scores below that are grayed out or otherwise visually deemphasized.

Seeker Match Feedback

In an alternative embodiment, a visual indication is provided (e.g., on the match results display where the profile summary is displayed) of the completeness (i.e., signal strength) of the profile criteria. A separate indicator can be provided for the background and preference portions of the match profile. Alternatively, a separate indicator can be provided for the company and position portions of the match profile. The indicator indicates to the seeker that the current state of the match profile may be inadequate to provide accurate matches. Thus, poor scores may indicate incomplete data rather than a lack of good matches in the database. The weights used in the signal strength calculation can be based on the seeker's industry.

As described above and shown in FIGS. 4-6, a seeker is preferably able to view indications of the quality and/or quantity of match results for modifications of the specified match criteria. However, feedback of the quality and/or quantity of match results can be provided in any suitable manner. For example, the match-based employment system can provide a visual indication (e.g., a histogram, etc.) of how much of the candidate pool (i.e., possible matches) falls within reasonable matching bounds (e.g., within the current match profile or within some acceptable error/alterations of the current match profile) given the current match profile data. Thus, a seeker receives an indication of whether the current matching criteria are effectively limiting (i.e., neither too limiting nor insufficiently limiting) the result set.

Preferably, the match-based employment system queues and delivers messages and alerts to seekers; however, employment systems are not required to deliver such feedback. The messages and alerts are preferably accessible from the initial screen the seeker is provided upon logging into the system (e.g., via a web interface); however, the messages and alerts can be accessible in any suitable manner. Alerts can inform seekers of changes that occurred since the seeker's last login (e.g., new matches available, status of employer/seeker contact attempts, etc.). Further, new incoming alerts delivered to a seeker during a session can be revealed to the seeker no matter what page he or she is currently viewing.

Figure 11:
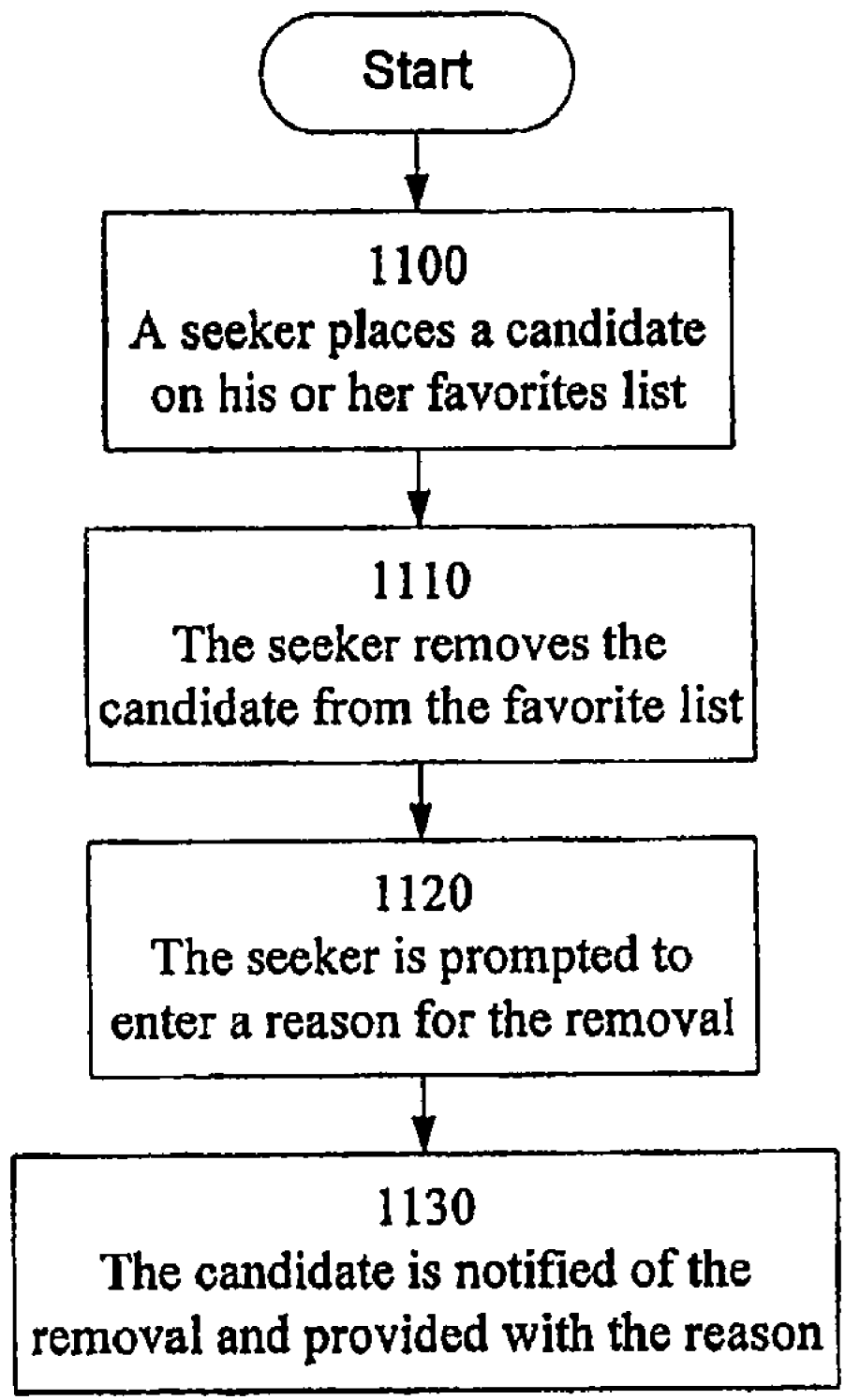
FIG. 11 is a preferred process for providing feedback about removal from a favorites list in accordance with one embodiment.

Preferably, as shown in FIG. 11, when a seeker removes a possible match from the seeker's favorites list, the seeker is prompted to enter a reason for the removal (e.g., need to make space on favorites list, salary demand too high, better candidate appeared, etc.). At step 1100, a seeker places a candidate on his or her favorites list. Preferably, the candidate is notified of being placed on the favorites list; however, the system is not required to notify the candidate of being placed on the favorites list. At step 1110, the seeker removes the candidate from the favorite list. At step 1120, the seeker is prompted to enter a reason for the removal. Preferably, the seeker is presented with a list of standard reasons; however, the seeker can be prompted to enter the reason in free text or in any other suitable manner. At step 1130, the candidate is notified of the removal and provided with the reason.

Preferably, a periodic (e.g., weekly) e-mail similar communication is sent to seekers, containing a summary of the current information for a given profile (e.g., preference criteria, matches, etc.); however, an employment system is not required to send such a communication. The e-mail preferably contains a link which enables seekers to jump directly to match-based employment system's user interface for the seeker for more details; however the e-mail can contain any suitable information and is not required to contain a link. Preferably, an alert (e.g., an e-mail, an instant message, a phone call, a notice on the user interface login screen for a seeker, etc.) is sent to a seeker when candidates with a match score above a threshold have indicated interest in the seeker (or a position offered by the seeker). Preferably, the threshold is seeker-specified and/or seeker-adjustable; however, the threshold can be a fixed value set by the system or any other suitable value. Further, the default for the match-based employment system can be to not contact the seeker, requiring the seeker to specifically request being alerted before alerts are sent.

Figure 12:
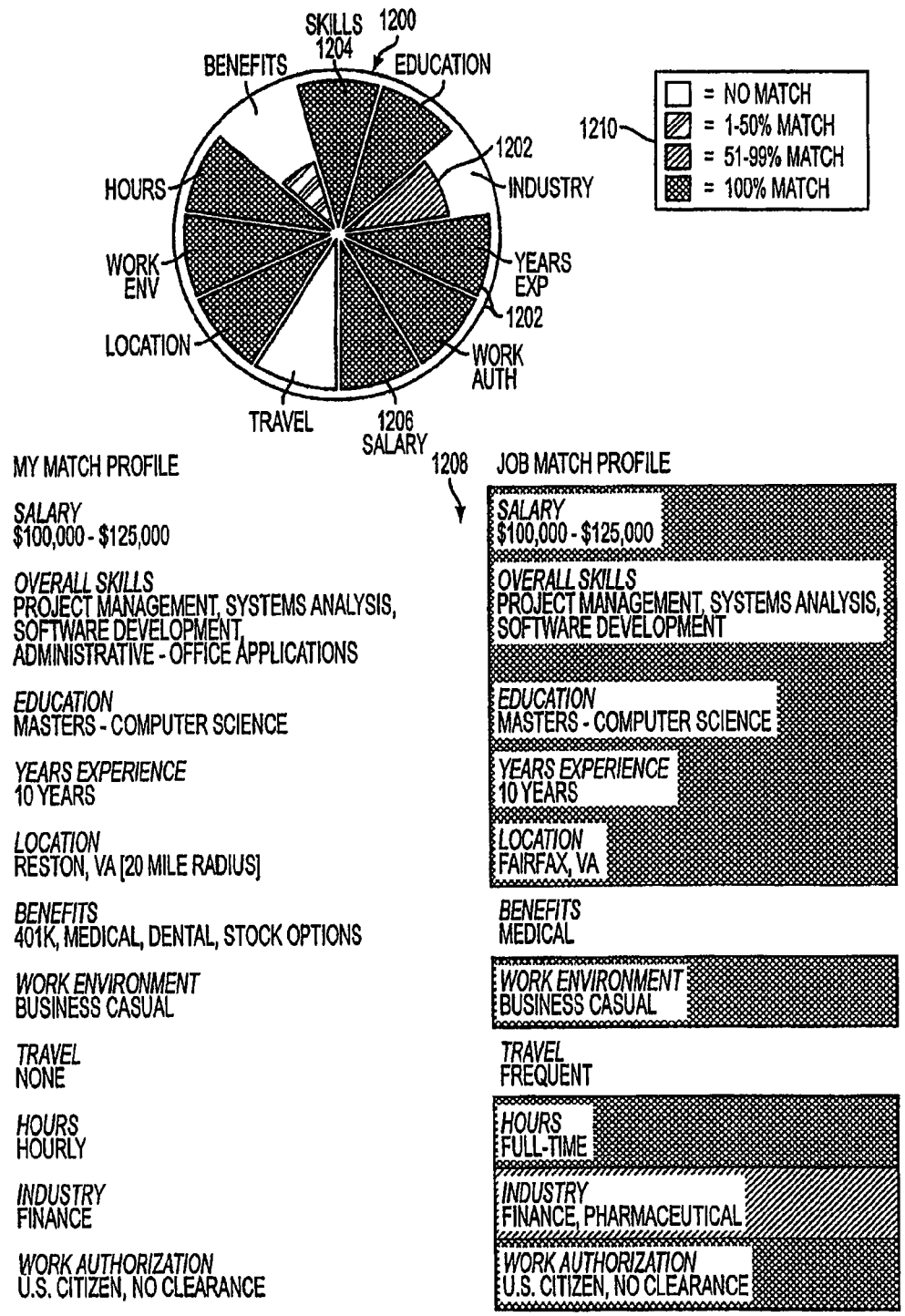
FIG. 12 is a diagram of a graphical depiction of the strength of components of a match score in accordance with one embodiment.

As shown in FIG. 12, a graphical depiction of the strength of components of the match score are preferably displayed when a user views a candidate; however, the graphical depiction can be displayed at any other suitable point or not at all, as desired. Components 1202 are displayed as wedges in a pie chart 1200, with component strength being indicated by both the size of the wedge (i.e., the length of the radius) and a color or pattern. Matching elements can be grouped together into one component (e.g., Skills 1204); however, components can also be individual match criteria (e.g., Salary 1206). The components 1202 can also be displayed textually in a list 1208, and preferably the text for each component appears over the color or pattern corresponding to that component's strength. Also, a legend 1210 is preferably provided to better quantify the strengths being indicated by wedge size and/or color or pattern.

Figure 13:
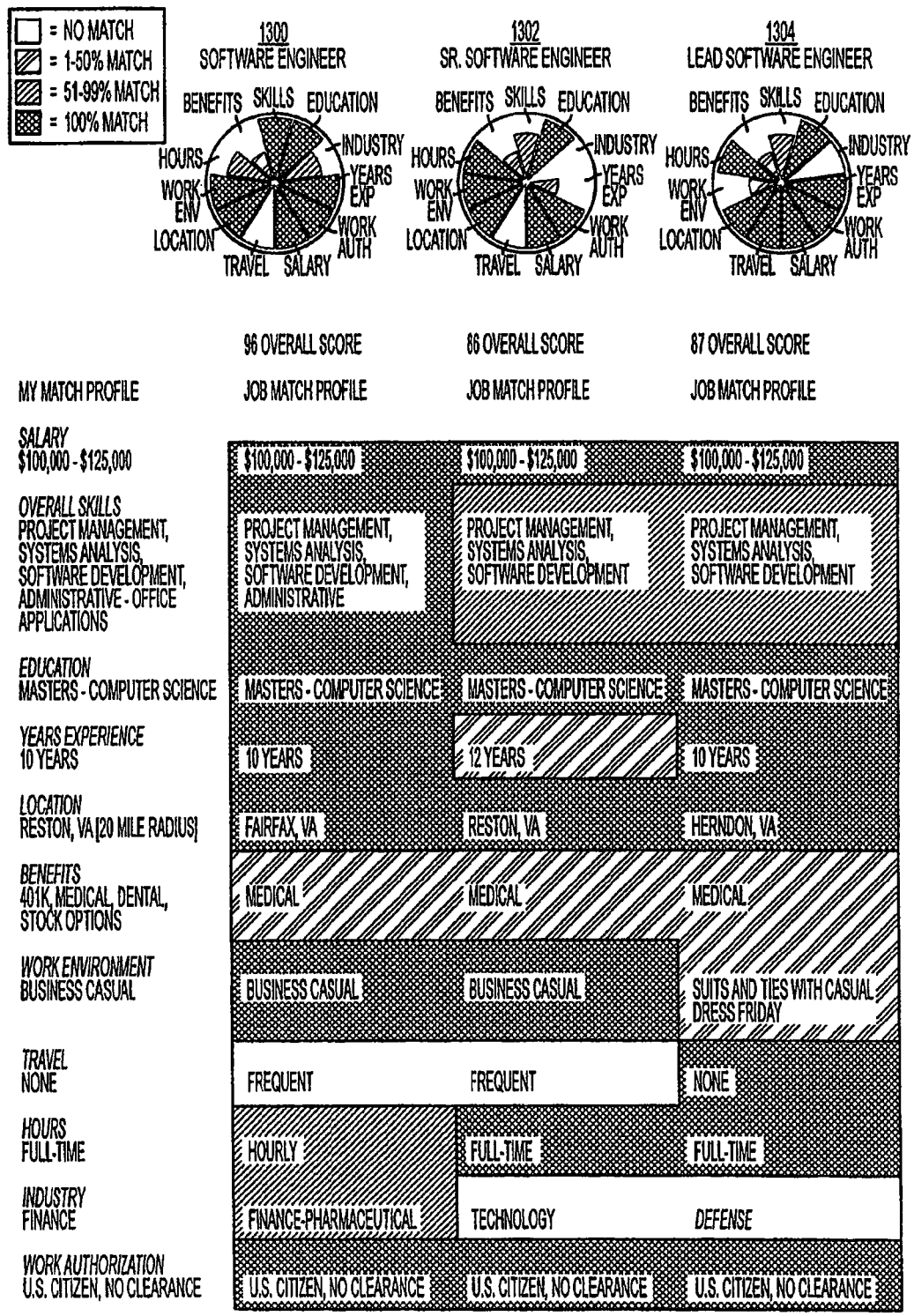
FIG. 13 is a diagram of multiple graphical depictions, such as the one in FIG. 12, being displayed concurrently in accordance with one embodiment.

Preferably, as shown in FIG. 13, seekers can compare candidates by displaying side-by-side information similar to the information displayed in FIG. 12 for two or more candidates. Preferably, information for a maximum of three candidates is displayed at one time; however, information for any suitable number of candidates can be displayed at one time. By presenting the information for the Software Engineer position 1300, the Sr. Software Engineer position 1302 and the Lead Software Engineer position 1304 in this manner, the seeker can quickly perceive differences, if any, between the positions.

Seeker Keeper Management

Preferably, seekers (both employee seekers and employment seekers) indicate up to a fixed number of matches (e.g., 20) as keepers or favorites, thus, forming a favorites list (or keepers list); however, employment systems are not required to enable seekers to indicate favorites. Preferably, employee seekers have a favorites list for each of the positions posted by the employee seeker. The indicators, or bookmarks, help the seeker to remember the matches for future reference. Further, the seeker may enter and record notes for matches on the favorites list. In one embodiment, if a match is removed from a favorites list, any notes recorded by the seeker are lost.

If the seeker wishes to bookmark an additional match once the limit on favorites is reached, the seeker must first remove another match (e.g., a less desirable match) from their existing favorites list. Preferably, the favorites list limit is configurable by the match-based employment system administrator; however, the favorites limit can be unconfigurable or configurable by any other suitable entity as desired.

In an alternative embodiment in which seekers can have multiple profiles, employment seekers are preferably limited to only one set of favorites, regardless of their number of profiles, to discourage/disable seekers from creating dummy profiles to get more favorites. Further, all favorites display the match score for each preference profile of the seeker. Thus, a seeker can easily compare a favorite's match score between various preference profiles.

Preferably, seekers can only indicate interest in matches that are first placed in their favorites list; however, if desired, the system can enable seekers to indicate interest in matches not on their favorites list. Thus, a seeker is limited in the number of matches for which it can show interest at any one time by the maximum number of favorites allowed on the favorites list.

When a match is removed from the favorites list, the seeker is preferably asked to provide feedback explaining the reason for removing the match (e.g., interest was not returned, space was needed for a better match, etc.) as discussed above. Similarly, if a match is removed from the system (e.g., the employee seeker unposts a position or indicates that job is now filled, the employment seeker accepts another job or ends his or her use of the system, etc.), all seekers who have the match in their favorites list are notified through the alert system. Further, the favorites slot occupied by the match is preferably automatically vacated.

Position Details and Application Process

Preferably, detailed information for a match is only one click (or enter or other input means) away from the displayed match results; however, detailed information can be any suitable number of clicks away from the displayed match results. For example, when an employment seeker is presented with matching positions, the employment seeker can click on a link for a position to retrieve additional details about the position such as the graphical information described above for FIG. 12.

Preferably, employee seekers are not e-mailed when an employment seeker indicates interest in a position posted by the employee seeker; however, if desired, employee seekers can be e-mailed when an employment seeker indicates interest in a position posted by the employee seeker. Preferably, the employment seeker shows up flagged as "interested" if they show up (i.e., are displayed) in the employee seeker's search/match results for that position. Thus, the system avoids the inefficiencies associated with sending notices and/or resumes to employee seekers when an employment seeker is interested. The employee seeker is no longer flooded with unqualified or lesser qualified applicant information. Further, wherever keepers are displayed for the employment seeker, keepers to which the seeker has indicated interest can be marked to so indicate.

Figure 14:
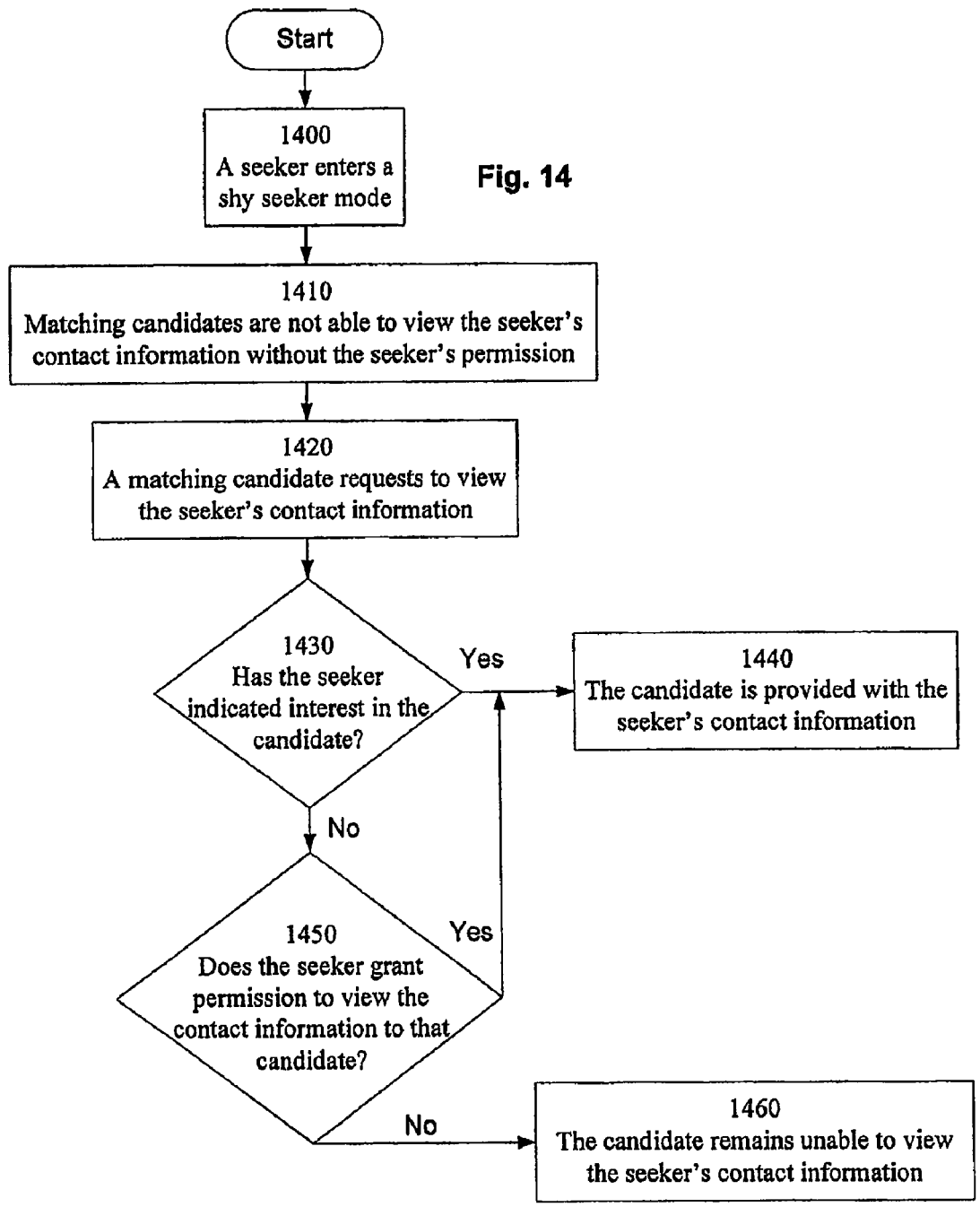
FIG. 14 is a flow diagram of a preferred process for obtaining contact information for a shy seeker in accordance with one embodiment.

Preferably, as shown in FIG. 14, the match-based employment system enables a seeker to enter a mode whereby a match (e.g., an employee seeker for a matching position or a matching employment seeker) must be authorized to view the seeker's contact information; however, employment systems are not required to provide a shy seeker option. At step 1400, a seeker enters a shy seeker mode. At step 1410, matching candidates are not able to view the seeker's contact information without the seeker's permission. At step 1420, a matching candidate requests to view the seeker's contact information. At step 1430, it is determined whether the seeker has indicated interest in the candidate. If the seeker has indicated interest in the candidate, at step 1440, the candidate is provided with the seeker's contact information. If not, at step 1450, the seeker is asked whether he or she grants permission to view the contact information to that candidate. If the seeker grants permission, the process continues at step 1440. If not, at step 1460, the candidate remains unable to view the seeker's contact information.

As a result, when an employment seeker (it is expected that shy seekers will typically be employment seekers rather than employee seekers) indicates interest in a position, preferably, this also authorizes the employee seeker that posted the position to view the employment seeker's contact information. If an employment seeker has not indicated interest in any open position posted by an employee seeker, that employee seeker must request authorization to view the employment seeker's contact info. The match-based employment system mediates the transaction, and contact information is only released to the employee seeker if the shy employment seeker (i.e., an employee seeker who does not want his identity and/or use of the system to be generally knowable) authorizes it. Thus, employment seekers can use the system with less fear of being discovered by their present employers.

Employee Seeker Match Profile Collection and Management

Employee seekers are able to create and edit a profile of their company and/or an available position. Preferably, there is only one company profile per employee seeker; however, an employment system can enable a company of have multiple profiles, if desired. The profile can include a breakdown of departments or divisions for which the human resources account (i.e., HR account) entering the profile has hiring oversight, and this information can be used in organizing position profiles.

Employee seekers are able to create, edit, and delete job match profiles. Each job match profile includes the matching criteria specific for the particular available position. Further, employee seekers can preferably create new job match profiles by duplicating existing profiles.

Preferably, an employee seeker enters a substantial amount of information before any matches are performed; however, an employment system can perform matches after an employee seeker enters an initial minimal set of information or any other suitable amount of information, if desired. The employee seeker can be iteratively prompted to provide additional and/or modifying information. Answering iterative data collection questions causes search/matching results to be immediately updated to reflect new match criteria.

Similar to employment seekers, employee seekers can preferably specify an importance level for only their desires and not their attributes; however, if desired the system can enable employee seekers to specify an importance level for any of the match criteria they enter. The importance level can have a default value (e.g., a neutral value), making it unnecessary for an employee seeker to enter an importance level for every match criterion. However, if an employer wishes to raise or lower the relative importance of a criterion in the match, he or she may do so by entering an appropriate importance level.

As described above, there are preferably five levels of granularity for importance choices available; however, the granularity can be limited only by the ability of the system to differentiate between values or to any suitable granularity. It is preferred that all importance levels have positive values; however, if desired, negative importance levels can be used to indicate the importance of a criterion not being matched. Preferably, certain match elements (e.g., "authorized to work in the US") may be associated with another level of importance (a deal-killer or anchor importance level), which may or may not be mutually-exclusive with the above mentioned importance level. When the deal-killer criterion importance level is selected the importance weight becomes an anchor which drags anything that fails the match to the bottom of the listings.

The following example helps differentiate between the importance level and the deal-killer importance level. If an employee seeker assigns a high importance level to "having a top secret security clearance level," an employment seeker who does not match that criteria (i.e., does not have a top secret security clearance level as one of his or her attributes) does not receive an increase in his or her match score for the position, but also does not receive a decrease. The lack of the criterion is essentially neutral. However, if the employee seeker assigns a high deal-killer importance level, the employment seeker's match score would be decreased. The match score can be decreased by subtracting a value or by multiplying by a factor that is equal to or near zero.

Preferably, employee seekers are presented with a user interface, similar to the user interface presented to employment seekers, that enables them to easily navigate and select skills required for their job posting; however, any suitable user interface can be presented. Further, employee seekers can preferably specify a duration of experience or attribute required and an importance of that experience to the job; however, in addition, in combination with or alternatively, the employee seeker can specify how recent the attribute (e.g., skill, education, training, experience, etc.) must be and an importance of recency or any other suitable desires or requirements. As discussed above, recency is preferably automatically figured into matches by adjusting both the employment seeker's experience and the employee seeker's desires for recency; however, recency can be figured into matches in any suitable manner.

Figure 15:
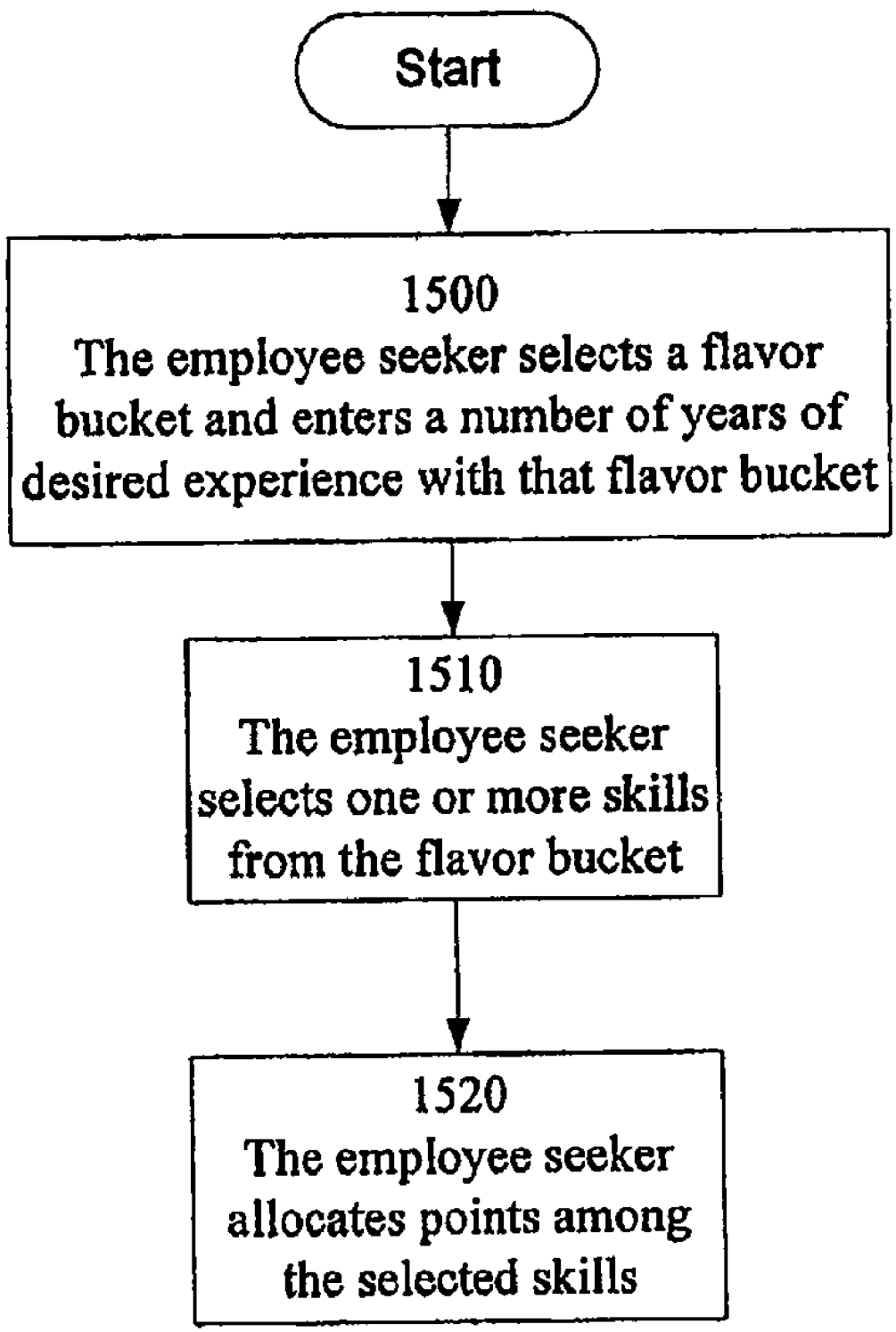
FIG. 15 is a flow diagram of a preferred process for entry of employee seeker desires in accordance with one embodiment.

Preferably, as shown in FIG. 15, an employee seeker specifies a number of years of experience desired and specific skills selected from the same hierarchy of skills used by the employment seekers to create their profiles. At step 1500, the employee seeker selects a flavor bucket (e.g., a profession) and enters a number of years of desired experience with that flavor bucket. At step 1510, the employee seeker selects one or more skills from the flavor bucket. At step 1520, the employee seeker allocates points among the selected skills. Preferably, the number of points available is equal to the number of years experience desired; however the number of points can be any suitable amount. Optionally, the employee seeker can make a skill mandatory (i.e., the anchor or deal-killer described above).

In an alternative embodiment, employers can specify skills/attributes as "nice to have" or "exposure a plus" rather than requiring extensive time on the job. For matching purposes, the recency for such attributes is optionally given no importance for the employee seeker's matching profile.

Preferably, employee seekers can specify a company from which they like to see candidates (e.g., marketing execs from a well-known company with a good marketing program, an innovative competitor, etc.); however, a system is not required to enable employee seekers to specify companies from which they like to see candidates. In an alternate embodiment, a company from which the employee seeker does not want to recruit (e.g., a company that the employee seeker believes trains its employees poorly, a competitor from which the employee seeker has already recruited a large portion of that competitor's employees, etc.) can also be specified. Candidates matching the criterion (i.e., candidates having experience with the specified company) are weighted accordingly and, thus, are differentiated from similar candidates from other companies. In one embodiment, only the most recent work unit is used when matching an employment seeker for former/current employer. In another embodiment, a recency criterion and/or recency importance are also associated with the former/current employer(s) matching criterion or recency is figured into the matching score.

Employer Candidate Details and Contact Process

Preferably, before employee seekers establish a financial trust relationship with the match-based employment system (e.g., by successfully paying some threshold amount for candidate placements, etc.), they are untrusted and they must pay a nominal fee, credited toward placement fees, for candidate contact information; however, payment can be made in any suitable manner. Trusted employers are preferably not required to pay for contact information, and instead are only charged for the placement fee. Further, private-company-board mode employer accounts (i.e., match-based employment systems having only one employee seeker) are preferably trusted initially.

Preferably, new employers may join the system in an untrusted mode with a valid credit card; however, the system can include new employers in any suitable manner. Thus, the employer may purchase contact details as they move towards becoming trusted by the match-based employment system.

Preferably, an employee seeker is able to access detailed candidate information for available candidates (e.g., an employment seeker who matches for a position posted by the employee seeker) within one click/selection of the search/match results list. Candidate details preferably display as much information as possible without revealing contact information for the candidate, and contact information is only available for candidates stored in the favorites list; however, a system can provide contact information for candidates not stored in the favorites list, if desired.

In one embodiment, the match-based employment system preferably provides the employer with a skill summary view of a candidate. If an employer selects a skill in the skill summary view, a list of instances of that skill for the candidate are displayed (e.g., the experience for that skill for each of the candidate's work units containing that skill are displayed). If an employer selects an instance, the associated work unit in the candidate resume is displayed. Thus, employers may quickly examine exactly how the candidate's attributes arose from the candidate's work experience.

Preferably, employers can view contact information for a given candidate under consideration from the favorites list either directly or indirectly. Doing so preferably initiates a purchase transaction for untrusted employers. Trusted employers preferably have free access, but the match-based employment system still records that the trusted employer requested contact info so the relationship can be tracked. If the candidate has indicated that he or she does not want his or her identification information (information typically included in contact information) revealed to unauthorized entities, and if the employer is not on the candidate's authorized list, the match-based employment system mediates the contact process as described above or in any other suitable manner. For example, the candidate may be informed of the employer's identity and that the employer desires their contact information. If the candidate approves the release of his or her contact information, the contact information is released to the employer.

Preferably, the employee seeker is provided an incentive to inform the match-based employment system when a job profile is filled (e.g., the employee seeker has hired one of the matching employment seekers); however, employer systems are not required to offer such an incentive. For example, if an employer informs the match-based employment system of a hire, the system creates an invoice and sends a message to the employee seeker (if they are on the system) and asks them to confirm that they were hired. If both sides confirm, the system rewards the employer by removing the employment seeker's profile from the market (e.g., making the profile inactive and unviewable/unmatchable). The system may also reward the employment seeker by making the position no longer available. Alternatively, the system may provide some financial compensation to the employment seeker.

Hiring Manager Interface

Preferably, employee seekers have an HR administrator that manages overall policies and account details for a company on the match-based employment system; however, if desired, employee seekers are not required to have a single HR administrator perform those tasks. The HR administrator can also approve transactions (e.g., hiring or viewing contact information for untrusted employee seekers). The HR administrator can also grant rights to hiring managers. Preferably, the hiring managers' authority is more limited than the authority of the HR administrator, and hiring managers manage individual job profiles.

The HR administrator can alter company/employee seeker settings, approve transactions, create temporary accounts and assign rights to hiring managers. The HR administrator can also create and delete job/position profiles. Additionally, the HR administrator can function as a hiring manager, enabling it to work with individual job profiles and candidates.

Preferably, a hiring manager is provided a limited user interface and can work only with job profiles assigned to it by the HR administrator; however, if desired, a hiring manager can be provided any suitable interface and responsibilities. A hiring manager can edit profile settings for a position and review candidates. In one embodiment, a hiring manager is not able to delete position profiles, but a hiring manager can perform all candidate/favorites management functions. In one embodiment, a hiring manager can not directly initiate a purchase transaction. For example, if the employee seeker is untrusted, to obtain candidate contact information, a hiring manager can flag the candidates he or she wants to contact and request that the HR administrator perform, or authorize, the purchase.

Human Resource Information Capture and Presentation

In an alternative embodiment, human resources information is determined from an employment system. The employment system can be a match-based employment system or another type of employment system. Human resources information includes, but is not limited to, data about the users of the system (e.g., user attributes and preferences) and/or transaction data (e.g., employers viewing matched employment seekers, employment seekers viewing matched employers, hires, positions being unposted without hires, etc.). The human resources information can be stored in a database which may be analyzed for human resources trends using various data mining/pattern discerning techniques.

Figure 16:
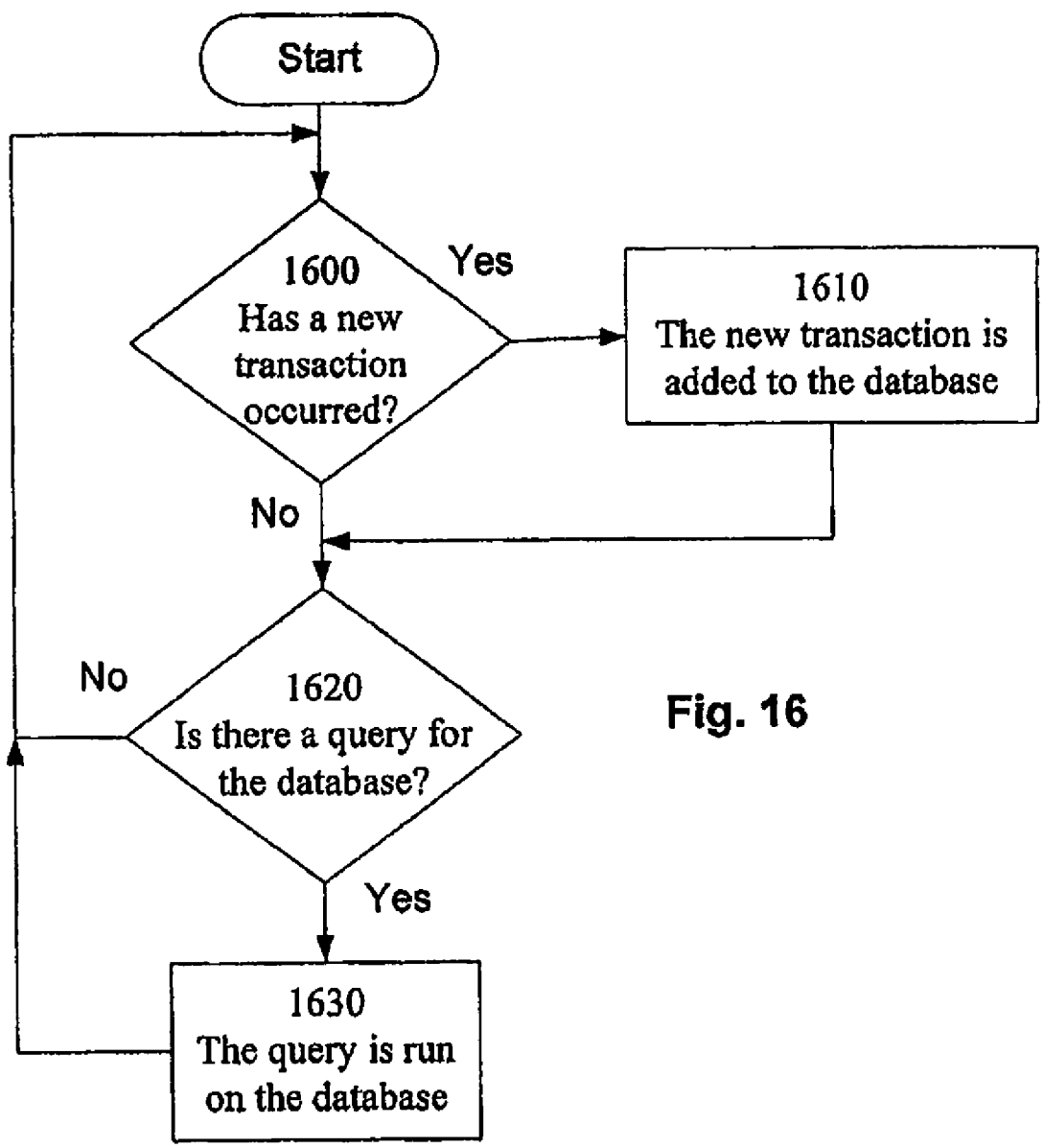
FIG. 16 is a flow diagram of a preferred process for managing an employment system human resources information database in accordance with one embodiment.

As shown in FIG. 16, preferably, each transaction (e.g., a profile creation or edit, interest indications, favorite list additions/subtractions, contact information requests, etc.) is stored in the database; however, the database can store any suitable subset of transactions, if desired. The database is preferably a relational database queriable by SQL queries; however, the database can be any suitable database type and can be queried with any suitable database query language.

At step 1600, it is determined whether a new transaction has occurred. A transaction can be, but is not limited to, the addition of a user, a change in the user's profile, the user adding or removing a candidate from a favorites list, the user indicating interest in a candidate and/or the user taking a job or filling a position. If a new transaction has occurred, at step 1610, the new transaction is added to the database and the process continues as step 1620. If not, the process continues at step 1620. At step 1620, it is determined whether there is a query for the database. If there is, at step 1630, the query is run on the database and the process repeats at step 1600. If not, the process repeats at step 1600. It should be noted that any suitable scheduling scheme can be used to handle database additions and queries and that additions are frequently treated as another type of query.

Human resources information (including any information mined or patterns discerned from the human resources information) can be presented to system users upon request. Preferably, users can query the database directly using a database query language; however, the users can also query by selecting a pre-defined query, by submitting a question and having an expert design an appropriate query or in any other suitable manner. Thus, employment seekers can determine which industries, fields and/or geographic location are hiring, what skills, experience and/or other attributes are desired and what level of compensation is typical. Similarly, employers can determine what competitors within their industry are doing with regard to hiring, what attributes employment seekers desire, what compensation levels are typical, and what skills, experience and/or attributes are common or uncommon among employment seekers on the current market.

Near Space Searching in Employment Systems

In an alternate embodiment, when a search is performed in an employment system, one or more near space searches are automatically performed as well. The employment system may be a match-based employment system or another type of employment system. FIGS. 4-6 show the performance and results display of a near space search in a match-based employment system. To perform a near space search, the system introduces an error into the original search specification. For example, if an employment seeker specified that he or she wants a position that is within 25 miles of his or her home, the near space search may expand that limiting condition to be within 50 miles. Preferably, only one search condition is varied per near space search. As a result, the number of searches to be performed grows linearly with the number of search conditions. However, more than one search condition can be varied, in which case the number of searches could grow exponentially with the number of search conditions.

Figure 17:
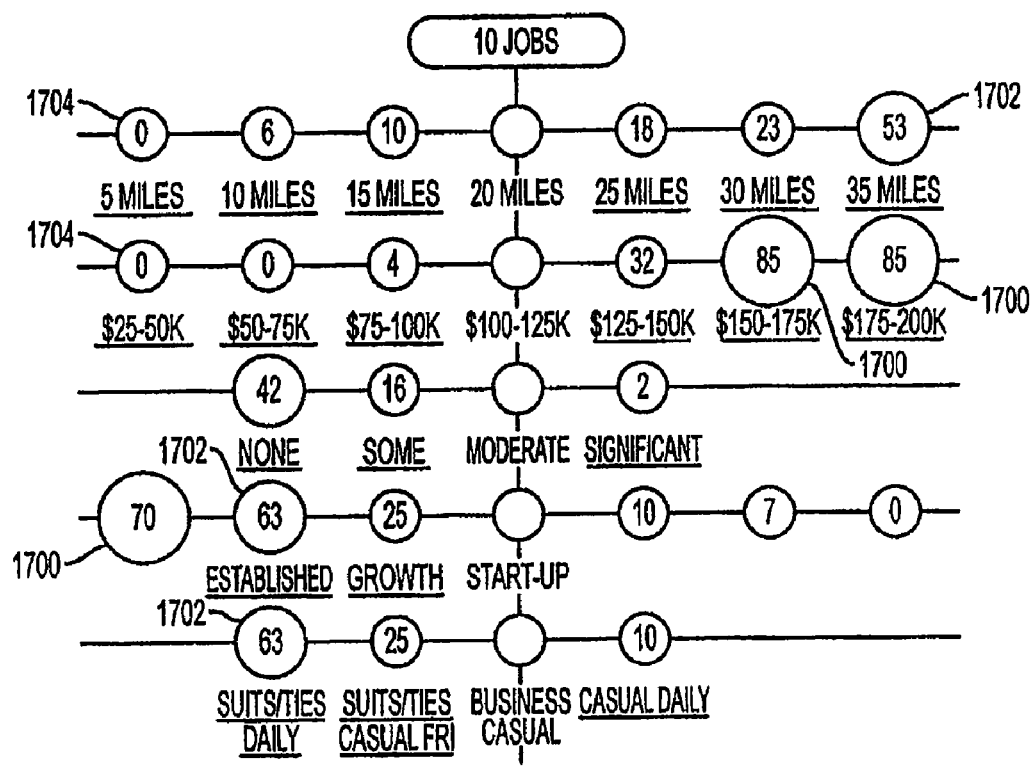
FIG. 17 is a diagram of different search results, such as the results generated by the process of FIG. 4, displayed in parallel lines with larger values corresponding to larger circles in accordance with one embodiment.

After the original search and one or more near space searches are performed, information about the results (e.g., size/number of results for each search) is displayed. Preferably, one or more near space searches that are each based upon introducing error into the same search criterion are displayed colinearly; however, the results can be displayed in any suitable manner. If more than one search criterion is varied to produce different colinearly displayed near space results, the results are preferably displayed as parallel lines as shown in FIG. 17; however, the results can be displayed as intersecting lines that intersect at the original search's result information. Preferably, a visual indication other than or in addition to text is provided to distinguish larger results from smaller results; however, employment systems are not required to provide such an indication. As shown in FIG. 17, searches that yield a large number of matches with scores above a threshold (e.g., 90%) are displayed as large circles 1700. Similarly, searches with a medium number of such matches are displayed as medium circles 1702, and searches with a small number of such matches are displayed as small circles 1704.

Recency in Employment Systems

The methods of figuring in recency when searching described above (e.g., in FIG. 3) are not limited to match-based employment systems and substantially similar methods can be used in non-match-based employment systems. Adjusting both desired experience and actual experience for recency and then comparing is the preferred strategy; however, as described above, recency can be figured into the search using any suitable strategy.

For example, in an alternative embodiment, an employment system enables an employment seeker and/or an employee seeker to associate a recency requirement with a search criterion. The employment system can be a match-based employment system or another type of employment system. When searching/matching, the system only counts attributes (or portions of attributes) that satisfy the recency requirement. Thus, an employer may specify that a desired candidate will have four years of musical theater experience within the past seven years. System users associate a time period with attributes/skills/experience contained in their profile, and that time period and the current date are used by the employment system to determine whether (or what portion) of the attribute/skills/experience satisfies the recency requirement.

Audit Trail in Employment Systems

In another alternative embodiment, an employment system records changes made by a user to his or her background information and/or desires. The employment system can be a match-based employment system or another type of employment system. If an employment seeker enters an attribute and later modifies that attribute, the modification is recorded. When an employer views the employment seeker, the employer is able to view the recorded modification. Thus, an employer is made aware of situations in which the employment seeker may be exaggerating/lying about his or her attributes in order to appear more attractive to employers. The change may be innocent, but providing the employer with notice of the change enables the employer to investigate the change further to confirm that the candidate's information is accurate.

Attribute Units in Employment Systems

In still another alternative embodiment, an employment system enables users to enter information about themselves in attribute units. The employment system can be a match-based employment system or another type of employment system. An attribute unit (e.g., a work unit, employment unit, skill unit, employment skill unit, employment exposure skill unit, education background unit, status unit, etc.) is a duration and at least one attribute associated with at least a portion of the duration.

The duration can be entered directly or indirectly (e.g., by specifying a beginning and ending point). If a duration is directly entered, a beginning and/or ending point is preferably still be entered for the duration so that recency calculations can be made; however, employment systems are not required to enable entry of a beginning or ending point. More than one attribute may be associated with an attribute unit. For example, an employment seeker may enter previous job experience by specifying a duration from January of 2001 to November of 2003, and associate a job title of "senior programmer" with 100% of the duration, a responsibility of managing other programmers with 25% of the duration, programming in C++ with 75% of the duration, and UNIX operating system experience with 100% of the duration. However, the preferred method of entering attribute units is illustrated by FIG. 9 in the context of a work unit.

Preferably, a taxonomy of attributes is used to ensure attribute units are correctly and/or precisely entered. For example, if the user is a programmer seeking an employer, the user may be prompted to enter which languages were used in the user's attribute units. Further, sub-categories of attributes may be specified in a hierarchy. For example, a programmer that specifies that he or she programmed in C++ may be prompted to enter the specific platform(s) or compiler(s) used. Also, if a user enters a very specific attribute, the system can also associate related attributes with the duration. For example, if a user enters that he or she programmed in C++ for three years, the employment system may also associate the more general "programming" with the duration. Similarly, in an alternative embodiment, an attribute that shares a common more general ancestor in the hierarchy may be associated with the duration. For example, the duration associated with C++ at 100% may also be associated with C at 95%, C# at 98% and Java at 75%.

Examples of taxonomies for a match-based employment system are found below at Tables A, B and C.

General Purpose Computer

Figure 18:
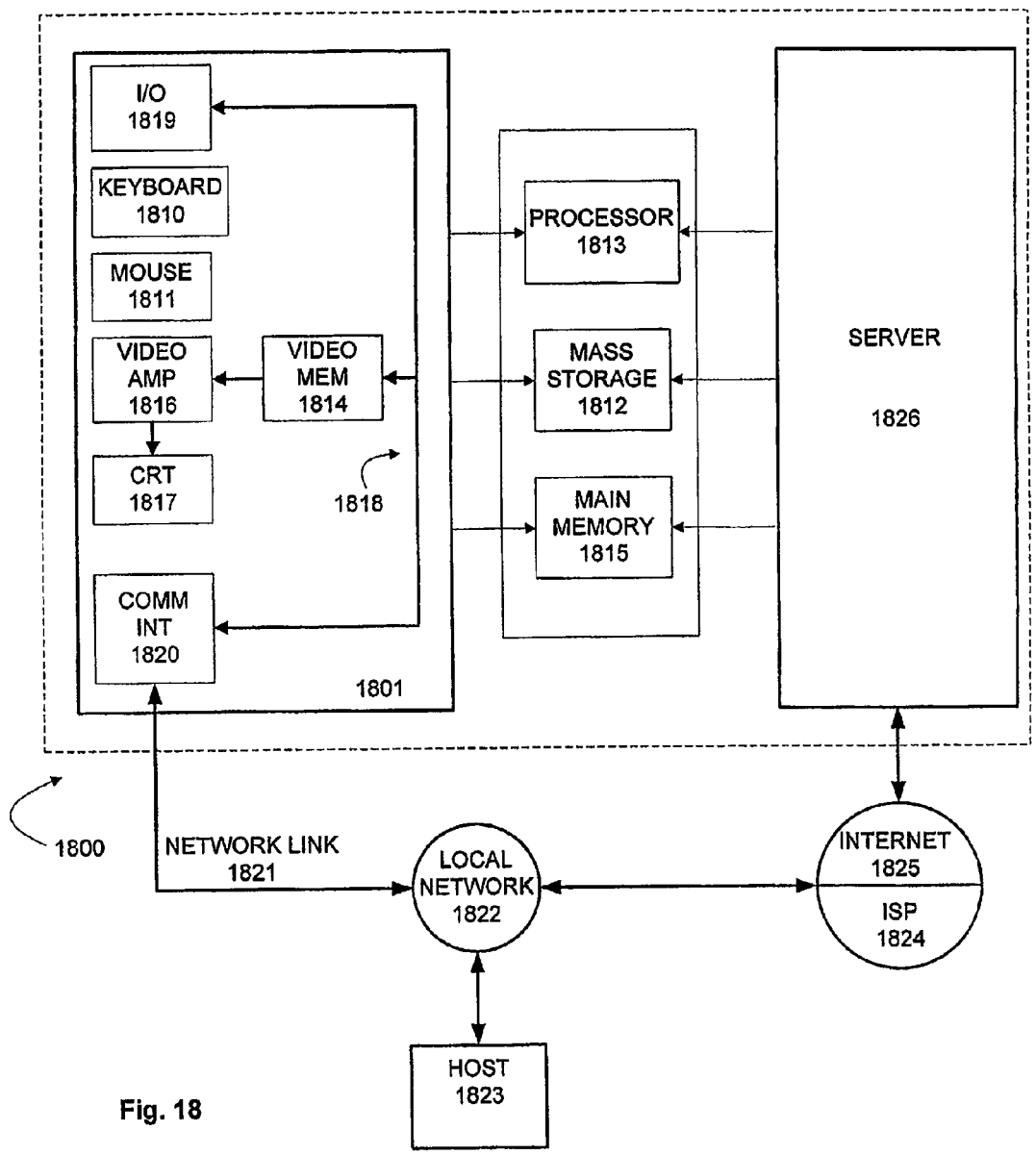
FIG. 18 is a block diagram of a general purpose computer for use in accordance with one embodiment.

Embodiments can be implemented as computer software in the form of computer readable program code executed in a general purpose computing environment such as environment 1800 illustrated in FIG. 18. A keyboard 1810 and mouse 1811 are coupled to a system bus 1818. The keyboard and mouse are for introducing user input to the computer system and communicating that user input to central processing unit (CPU) 1813. Other suitable input devices may be used in addition to, or in place of, the mouse 1811 and keyboard 1810. I/O (input/output) unit 1819 coupled to bi-directional system bus 1818 represents such I/O elements as a printer, A/V (audio/video) I/O, etc.

Computer 1801 may include a communication interface 1820 coupled to bus 1818. Communication interface 1820 provides a two-way data communication coupling via a network link 1821 to a local network 1822. For example, if communication interface 1820 is an integrated services digital network (ISDN) card or a modem, communication interface 1820 provides a data communication connection to the corresponding type of telephone line, which comprises part of network link 1821. If communication interface 1820 is a local area network (LAN) card, communication interface 1820 provides a data communication connection via network link 1821 to a compatible LAN. Wireless links are also possible. In any such implementation, communication interface 1820 sends and receives electrical, electromagnetic or optical signals which carry digital data streams representing various types of information.

Network link 1821 typically provides data communication through one or more networks to other data devices. For example, network link 1821 may provide a connection through local network 1822 to local server computer 1823 or to data equipment operated by ISP 1824. ISP 1824 in turn provides data communication services through the world wide packet data communication network now commonly referred to as the "Internet" 1825. Local network 1822 and Internet 1825 both use electrical, electromagnetic or optical signals which carry digital data streams. The signals through the various networks and the signals on network link 1821 and through communication interface 1820, which carry the digital data to and from computer 1801, are exemplary forms of carrier waves transporting the information.

Processor 1813 may reside wholly on client computer 1801 or wholly on server 1826 or processor 1813 may have its computational power distributed between computer 1801 and server 1826. Server 1826 symbolically is represented in FIG. 18 as one unit, but server 1826 can also be distributed between multiple "tiers". In one embodiment, server 1826 comprises a middle and back tier where application logic executes in the middle tier and persistent data is obtained in the back tier. In the case where processor 1813 resides wholly on server 1826, the results of the computations performed by processor 1813 are transmitted to computer 1801 via Internet 1825, Internet Service Provider (ISP) 1824, local network 1822 and communication interface 1820. In this way, computer 1801 is able to display the results of the computation to a user in the form of output.

Computer 1801 includes a video memory 1814, main memory 1815 and mass storage 1812, all coupled to bi-directional system bus 1818 along with keyboard 1810, mouse 1811 and processor 1813. As with processor 1813, in various computing environments, main memory 1815 and mass storage 1812, can reside wholly on server 1826 or computer 1801, or they may be distributed between the two.

The mass storage 1812 may include both fixed and removable media, such as magnetic, optical or magnetic optical storage systems or any other available mass storage technology. Bus 1818 may contain, for example, thirty-two address lines for addressing video memory 1814 or main memory 1815. The system bus 1818 also includes, for example, a 32-bit data bus for transferring data between and among the components, such as processor 1813, main memory 1815, video memory 1814 and mass storage 1812. Alternatively, multiplex data/address lines may be used instead of separate data and address lines.

In one embodiment, the microprocessor is manufactured by Intel, such as the 80×86 or Pentium-type processor. However, any other suitable microprocessor or microcomputer may be utilized. Main memory 1815 is comprised of dynamic random access memory (DRAM). Video memory 1814 is a dual-ported video random access memory. One port of the video memory 1814 is coupled to video amplifier 1816. The video amplifier 1816 is used to drive the cathode ray tube (CRT) raster monitor 1817. Video amplifier 1816 is well known in the art and may be implemented by any suitable apparatus. This circuitry converts pixel data stored in video memory 1814 to a raster signal suitable for use by monitor 1817. Monitor 1817 is a type of monitor suitable for displaying graphic images.

Computer 1801 can send messages and receive data, including program code, through the network(s), network link 1821, and communication interface 1820. In the Internet example, remote server computer 1826 might transmit a requested code for an application program through Internet 1825, ISP 1824, local network 1822 and communication interface 1820. The received code may be executed by processor 1813 as it is received, and/or stored in mass storage 1812, or other non-volatile storage for later execution. In this manner, computer 1801 may obtain application code in the form of a carrier wave. Alternatively, remote server computer 1826 may execute applications using processor 1813, and utilize mass storage 1812, and/or video memory 1815. The results of the execution at server 1826 are then transmitted through Internet 1825, ISP 1824, local network 1822 and communication interface 1820. In this example, computer 1801 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. Embodiments can be implemented in any type of computer system or programming or processing environment.

Database Protection

In one embodiment, a seeker (employee seeker and/or employment seeker) can access information corresponding other seekers for which the match results and/or score obtained in any suitable manner, including but not limited to those described above, are at or above a threshold value. For example, an employee seeker could access information about all job seekers who match a position with a match score of 60% or better. In one embodiment, a seeker can adjust the threshold to any suitable value to increase or decrease the number of other seekers whose scores meet the threshold and therefore can be accessed. For example, a seeker may have what it views as a sufficient number of matches scoring 90% or better. That seeker could then set the threshold to 90% to prevent any matches which do not meet that threshold from being displayed to the seeker. Alternatively, the seeker may wish to access more potential matches, so the threshold could be lowered from a default of 80% to a value of 60%.

However, in another embodiment, a seeker cannot adjust the threshold beyond a minimum threshold value (e.g., 40%, 50%, 60%, 75%, 80% or any other suitable value). Preferably, the minimum threshold value is the same throughout the employment system; however the minimum threshold value can vary depending on any suitable factor, including the percentage of all possible match results that could be viewed by the seeker. For example, the minimum threshold value could be set such for a seeker such that the seeker could not access more than 30% (or any other suitable percentage) of the possible matches. As a result, the seeker is prevented from accessing the entire set of corresponding seekers. By setting a minimum threshold value for the system, the system prevents an unauthorized user (e.g., a competing employment system) from easily accessing the entire pool of employment seekers, positions or employee seekers, which it could otherwise do by adjusting the threshold match score to 0%.

Figure 19:
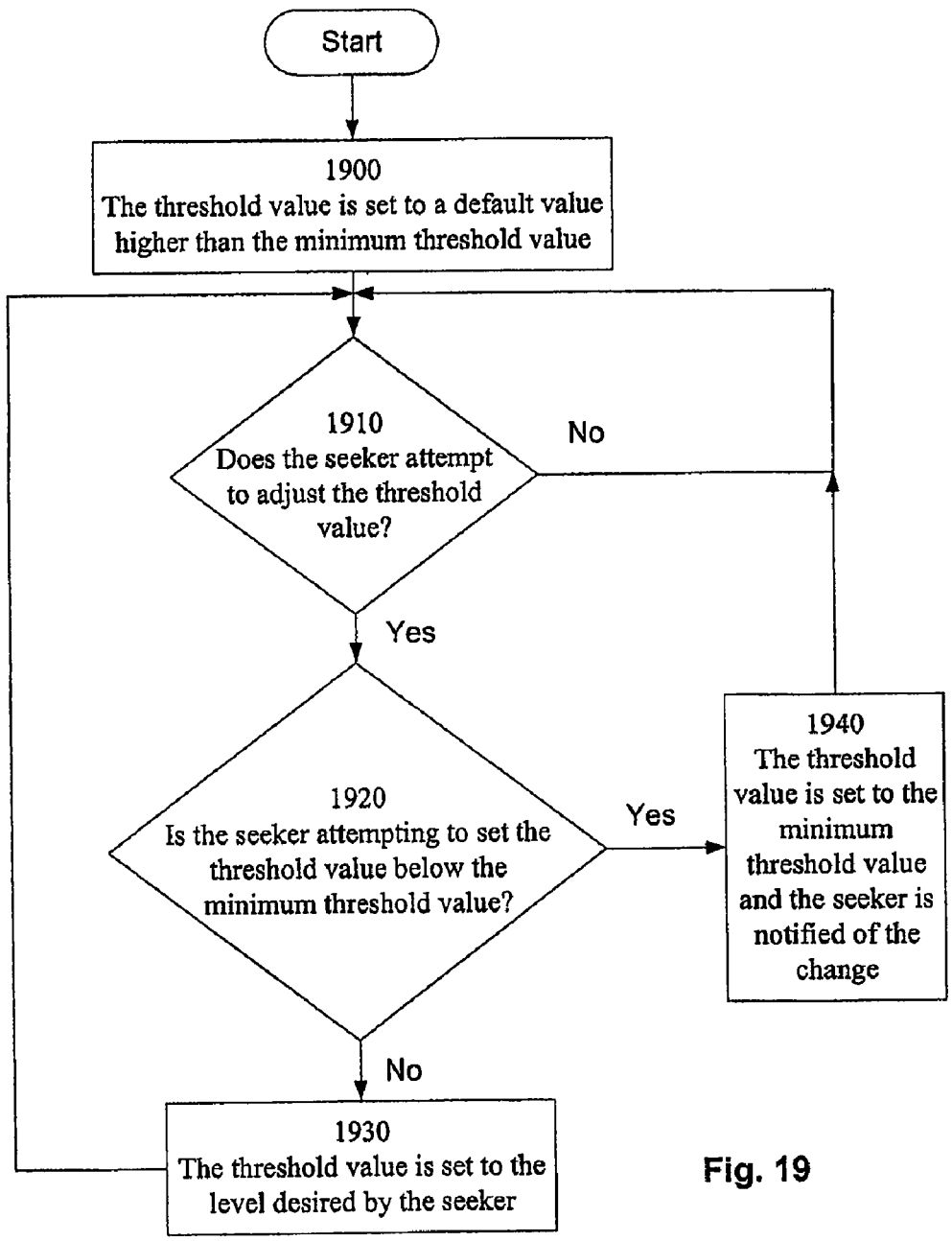
FIG. 19 is a flow diagram of the process of a seeker adjusting a threshold value while being prevented from adjusting the value beyond a minimum threshold value in accordance with one embodiment.

As shown in FIG. 19, a seeker can adjust a threshold value while being prevented from adjusting the value beyond a minimum threshold value. At step 1900, the threshold value is preferably set to a default value higher than the minimum threshold value; however, the default value can be the minimum threshold value. Preferably, the threshold value is associated with a seeker, however a threshold value can be associated with a position or any other suitable item, thus allowing an employee seeker to set different threshold values for different positions. Consequently, the seeker can access information about other seekers and/or positions whose matching score with the seeker satisfies the threshold value.

At step 1910, it is determined whether the seeker attempts to adjust the threshold value. If the seeker does not attempt to adjust the threshold value, the process repeats at step 1910. If the seeker attempts to adjust the threshold value, at step 1920 it is determined whether the seeker is attempting to set the threshold value below the minimum threshold value. If the seeker is not attempting to set the threshold value below the minimum threshold value, at step 1930, the threshold value is set to the level desired by the seeker and the process repeats at step 1910. Consequently, the seeker can access information about other seekers and/or positions whose matching score with the seeker satisfies the new threshold value.

If the seeker is attempting to set the threshold value below the minimum threshold value, preferably, at step 1940, the threshold value is set to the minimum threshold value, the seeker is notified of the change and the process repeats at step 1910. Consequently, the seeker can access information about other seekers and/or positions whose matching score with the seeker satisfies the minimum threshold value. However, alternatively, the system could not change the threshold value and notify the seeker of the error or take any other suitable action.

Distance Factors

Preferably, a seeker can specify as one of his or her match criteria that a match have some distance relationship with one or more locations. The location can be known or unknown to the seeker. For example, the seeker could specify the desire that a matching job be within some distance of another job on the system. In this way, after a seeker is matched to a first job, the seeker could change his or her matching preferences to see if any better jobs are near the first job which perhaps originally didn't score high enough due to some other matching criteria (e.g., a desire to be within 15 miles of the seeker's home).

Further, a job seeker could specify the desire that a matching job be less than 0.25 miles from a public transportation stop. Preferably, the job seeker can specify the particular type and/or name of the public transportation system or indicate that any public transportation will suffice. For example, the seeker could specify a desire to work within 0.25 miles of one of a particular train system's stop. Similarly, the seeker could specify a desire to work within some suitable distance of a location of a particular restaurant chain, retail store chain, daycare provider, gym, public or private school, any other type of product or service provider, any dentist's office, any public park, hospital, fire department, police department or any other type of government service building, any venue for concerts or performances of some audience size range, an interstate highway or an interstate highway on/off-ramp, a publicly accessible lake, pond, river or other body of water, a veterinarian or any other suitable classification of object, resource, service and/or business associated with one or more locations which the seeker would like to work near.

Preferably, the seeker can also specify the desire for a match to be further than some distance from some location. For example, a seeker may specify the desire that a matching job be more than some suitable distance from a military base, a federal building, a school, a fossil-fuel based power plant, a nuclear power plant, anything on a suspected terrorist target list, any location with a general or specific crime rate above a threshold level, any location on a high congestion traffic list, locations having a liquor license, any location on a high pollution count list, any hospital or any other suitable classification of object, resource, service and/or business associated with one or more locations which the seeker would not like to work near.

Preferably, the items with which a seeker can set a distance relationship as a criteria are set by a system administrator and are presented as options to the seekers; however, the items can be set in any suitable manner. Further, the locations of the items are preferably stored in a database which is quickly accessible by the system; however, the locations of the items can be stored in any suitable location.

Alternatively, a user can specify a new category of item for which the system has not previously performed any matching. For example, a seeker may specify the seeker's favorite restaurant chain, ABC Restaurant out of a desire to be able to conveniently walk there for lunch or dinner from the job site. Preferably, the seeker provides a link to the ABC Restaurant webpage which lists restaurant locations; however, the seeker could provide a link to an ABC Restaurant webpage which prompts the user for an address and produces one or more close restaurant locations. The seeker could alternatively provide any other suitable information to help the system determine locations of ABC Restaurant location or no information at all. If the user provides no information, the system can perform an Internet search to locate the above pages on its own, and confirm with the user that it has the correct chain, or the system can search an online directory of business addresses such as an online phonebook.

As the system matches the seeker's desires with the posted positions, the system compares the location of the position, preferably using a geographical mapping system or database and the position location's physical mailing address, but any suitable method of location determination and comparison can be used, with the location of one or more of the discovered restaurant locations. Preferably, to reduce the number of comparisons necessary, the system only considers locations which are in the same postal zip code; however, the closest location to the position's location can be determined in any suitable manner. Once the closest restaurant location is determined, the system can determine how well the position matches this criteria of the searcher in any suitable manner, including but not limited to those described above.

Figure 20:
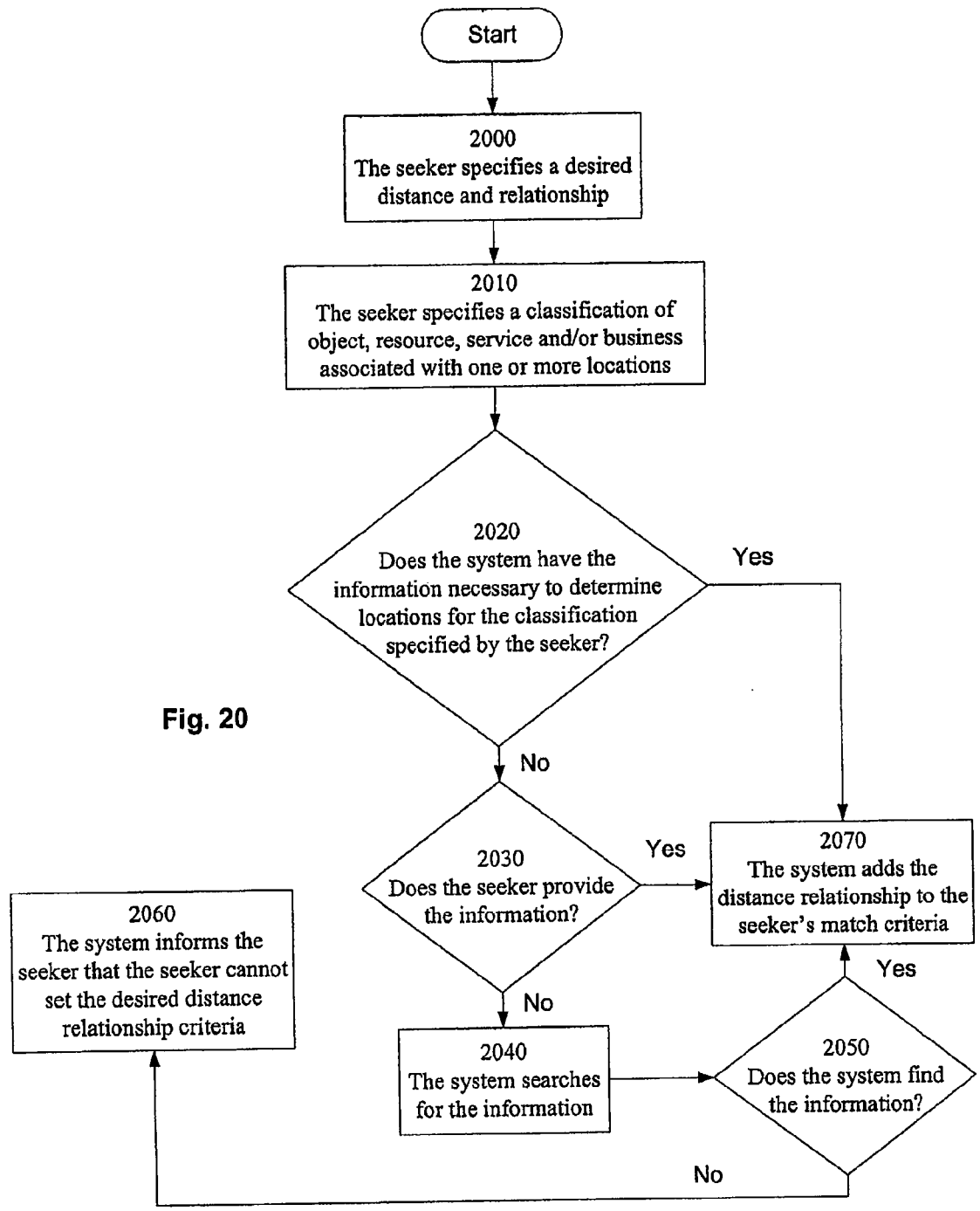
FIG. 20 is a flow diagram of the process of a seeker specifying a desired distance relationship between a potential position and a classification of object, resource, service and/or business associated with one or more locations in accordance with one embodiment.

As shown in FIG. 20, a seeker can specify a desired distance relationship between a potential position and a classification of object, resource, service and/or business associated with one or more locations. At step 2000, the seeker specifies a desired distance and relationship (e.g., greater than, less than, etc.). At step 2010, the seeker specifies a classification of object, resource, service and/or business associated with one or more locations. At step 2020, it is determined whether the system has the information necessary to determine locations for the classification specified by the seeker. If the system does not have the information, at step 2030, it is determined whether the seeker provides the information. If the seeker does not provide the information, at step 2040, the system searches for the information. At step 2050, it is determined whether the system finds the information (e.g., by confirming the results of the search with the seeker). If the system cannot find the information, at step 2060, the system informs the seeker that the seeker cannot set the desired distance relationship criteria. If the system finds the information, the seeker provides the information or the system already has the information, at step 2070, the system adds the distance relationship to the seeker's match criteria.

Notification and Standardized Resume

Preferably, the employment system sends candidate matches which are of a threshold quality to a seeker (e.g., via e-mail, text message, fax or any other suitable communications device and/or method) as the matches are made; however, the employment system can send candidate matches at any suitable time and in any suitable manner or not at all. Preferably, candidate matches sent to a seeker include and/or are sent with a link to the employment system so that the user can easily access his or her account; however, the candidate matches are not required to include or be sent with such a link.

Preferably, a formatted document representing a job seeker's resume is automatically sent to employee seekers; however, job seeker information can be delivered to an employee seeker in any suitable format and/or manner. Preferably, the formatted document includes contact information, education, and work experiences, in addition to analytical data generated by the employment system; however the formatted document can include any suitable information.

Preferably, when a match score meeting a threshold value (e.g., 7.0 or 8.0 or any other suitable value) is determined by the system, a formatted document for the employment seeker is sent to the employee seeker that posted the position. Preferably, a formatted document is not sent if the employee seeker has already viewed the employment seeker or has already viewed the employment seeker for the position at issue, or if a formatted document was previously sent to the employee seeker for the employment seeker for this and/or another position; however, the formatted document can be sent or not sent in accordance with any suitable algorithm.

For example, the system can send a formatted document for a seeker who has been viewed in a summary view, but not viewed in a detailed view. Further, the system can send a formatted document for a seeker when it otherwise would not because the seeker was previously viewed in detail, if the seeker's information has changed since the detailed viewing. Preferably, the seeker's information must change sufficiently to cause the match score to change some threshold amount; however, any change can trigger the formatted document being resent or any suitable measurement of change and threshold value can be used to determine whether to resend the formatted document.

Preferably, the formatted document includes and/or is sent with a link to adjust the settings for delivering formatted documents for the position. For example, the link could enable the employee seeker to change the match score threshold necessary for a formatted document to be sent, the format of the document (e.g., pdf, rich text, pdf from which text cannot be copied, etc.), the name/id number of the position, the frequency of the emails (e.g., from 1 day to 7 days), the time the match list is sent (e.g., 8:00 AM, between 8 AM and 9 AM, from 8 AM to 9 AM and from 2 PM to 3 PM, etc.), the seeker's preference for receiving a list for each job listed on the system or a batch summary, which preferably lists a tabular summary of all of the seeker's posted positions, or any other suitable setting. Preferably, the batch summary includes a table that shows each position, the top 3 (or any other suitable number) candidate matches for each position, the job name/number, the number of matches above a threshold value, and the number of new matches the seeker hasn't seen. A hot link can be included for each job to enable the customer to log-in and see the new matches for a particular job. However, a batch summary can include any suitable information.

Preferably the above settings can also be set by a seeker after logging into the employment system without using the link included in and/or sent with the formatted document. Further, preferably, the seeker can specify a second threshold match value. If a match is found meeting the second threshold match value, a special message is sent to the seeker. For example, a seeker can enter an SMS address (e.g., a cell phone number) used to send them an urgent message when a match score of 9.0 (or any other suitable level) is received. The message can include the match score, the position ID and that a formatted document for the job seeker is waiting for the employee seeker on the employment system or has already been sent (e.g., via e-mail) to the employee seeker.

Preferably, the formatted document includes and/or is sent with a link to log-in to the employment system, which will take the employee seeker to a detailed view of the job seeker. The link can take the employee seeker directly to the detailed view if an automatic login (e.g., "remember me on this computer") feature is used, or the employee seeker can be prompted for a password before progressing to viewing the job seeker.

Preferably, when a position is posted, the employment system will not automatically send any formatted documents for job seekers for a time period (e.g., the first 4 hours, until 10 matches above a threshold are determined, etc.); however, the system can send formatted documents at any suitable time. Preferably, the system will send no more than a specific number (e.g., 25) of formatted documents in a period of time (e.g., the 24 hours after the position is posted); however, the system can send any suitable number of formatted documents in any period of time. Further, the formatted documents are preferably spaced by some time period (e.g., a minimum of 10 minutes) between each document. Thus, an employee seeker is prevented from receiving an instant stream of hundreds of emails. Preferably, if there are more than some number (e.g., 25) of seekers whose matching score meets a threshold value, the employment system sends only that number (e.g., 25) of formatted documents, starting with the one for the best match. Preferably, during a period of time (e.g., the second 24 hour period and thereafter) the employment system sends formatted documents for job seekers per the match value setting.

Figure 21:
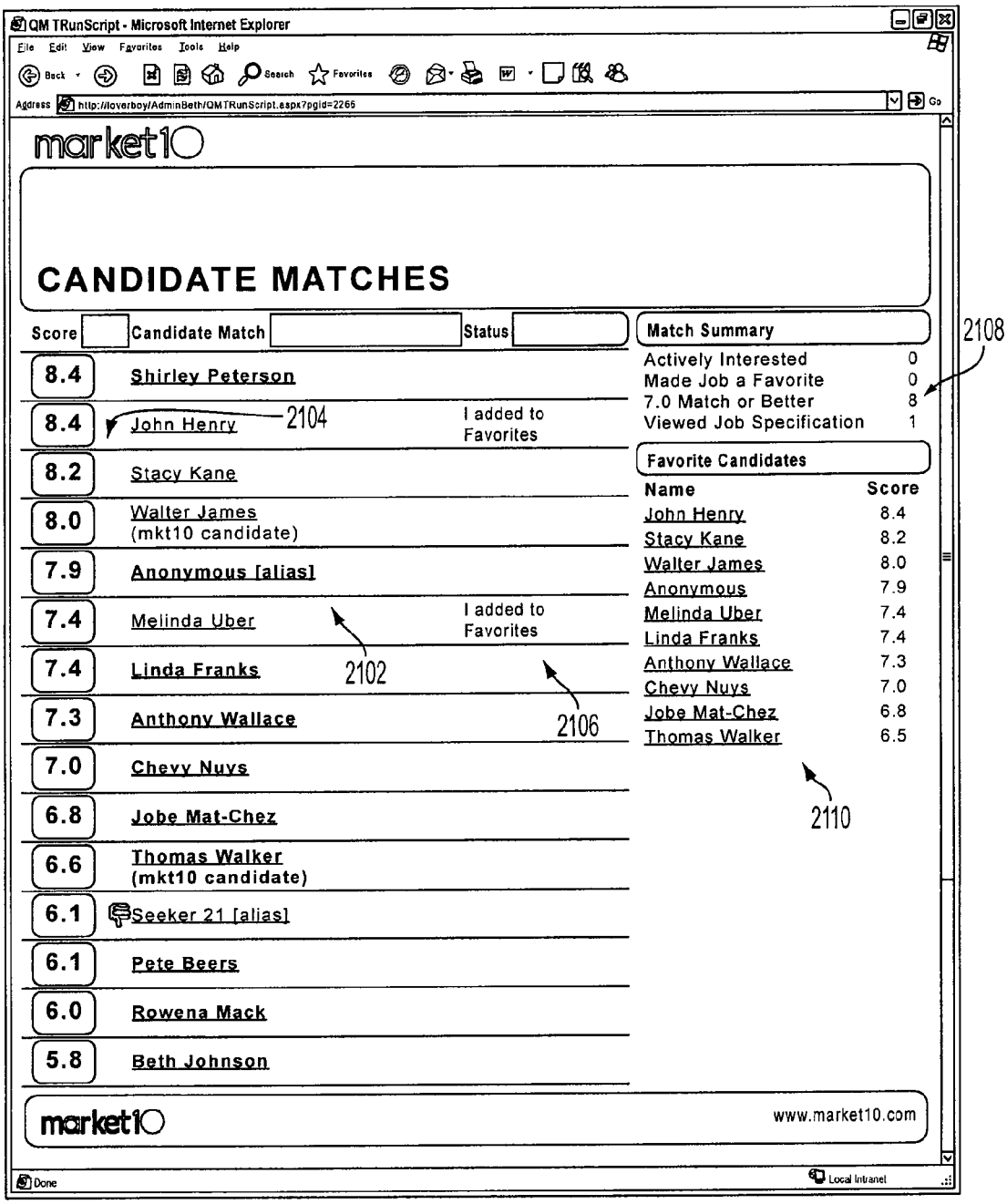
FIG. 21 is a diagram of a daily match list in accordance with one embodiment.

Preferably, the employment system sends a daily match list to the employee seeker for each position. An example of such a daily match list is presented in FIG. 21. Job seekers' IDs 2102 are listed along with their match scores 2104 and their status 2106. A match summary 2108 and favorite candidates list 2110 are also preferably included.

Preferably, the match list is a facsimile of the first page match list within the employee seeker is presented with when logged into the employment system and viewing the matches for the position. An example of such a first page match list is presented in FIG. 22. Similar to the daily match list of FIG. 21, Job seekers' IDs 2202 are listed along with their match scores 2204 and their status 2206. A match summary 2208 and favorite candidates list 2210 are also preferably included. Further, check boxes 2212 or any other suitable device are included to enable the seeker to specify matches to be compared.

Preferably, the match list highlights the job seekers that have not yet been viewed by displaying their IDs in bold; however the job seekers could be marked "New" or indicated as not having been viewed in any other suitable manner.

Figure 23:
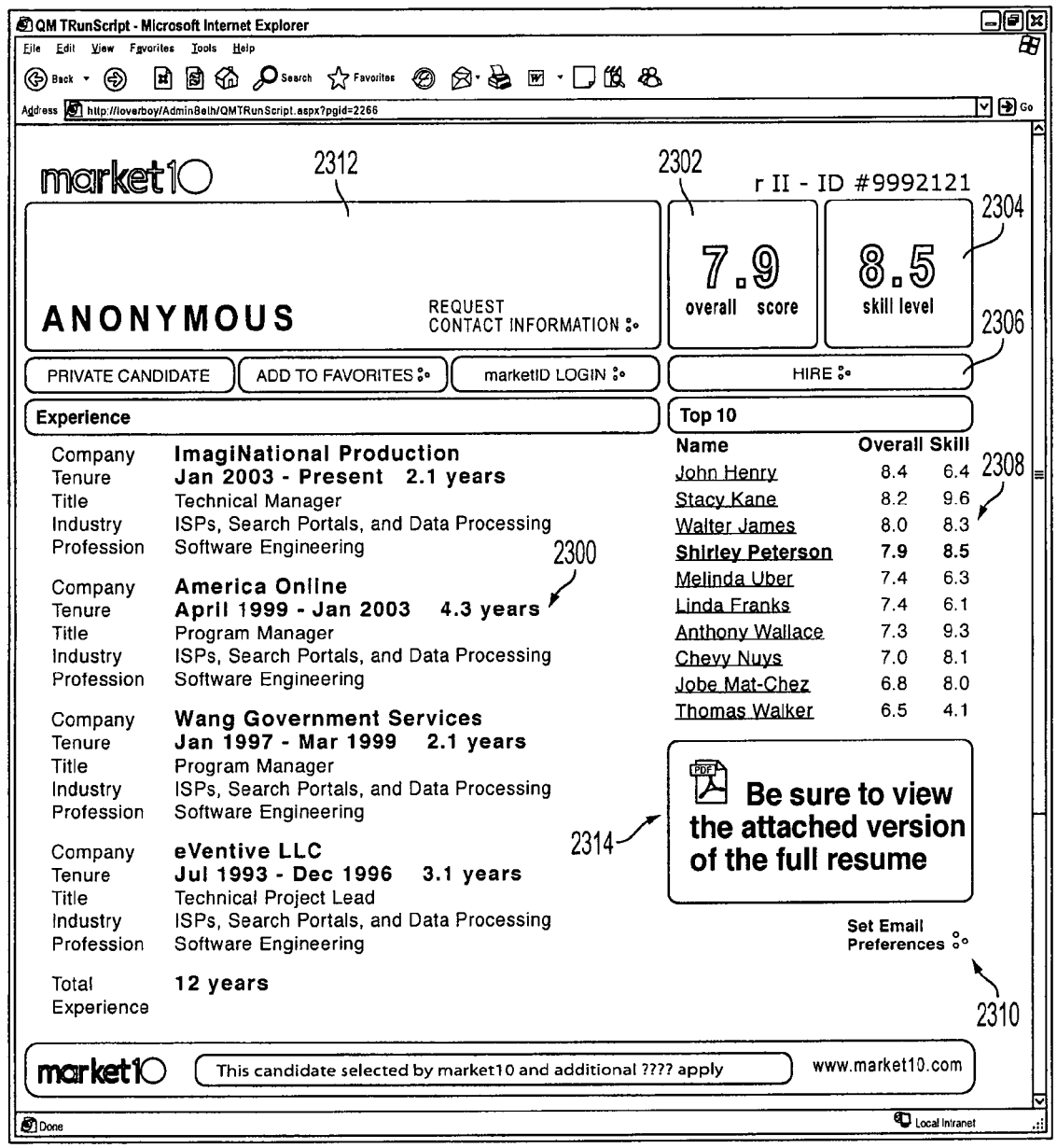
FIG. 23 is a diagram of a summary view of information presented in an e-mail message in accordance with one embodiment.
Figure 25:
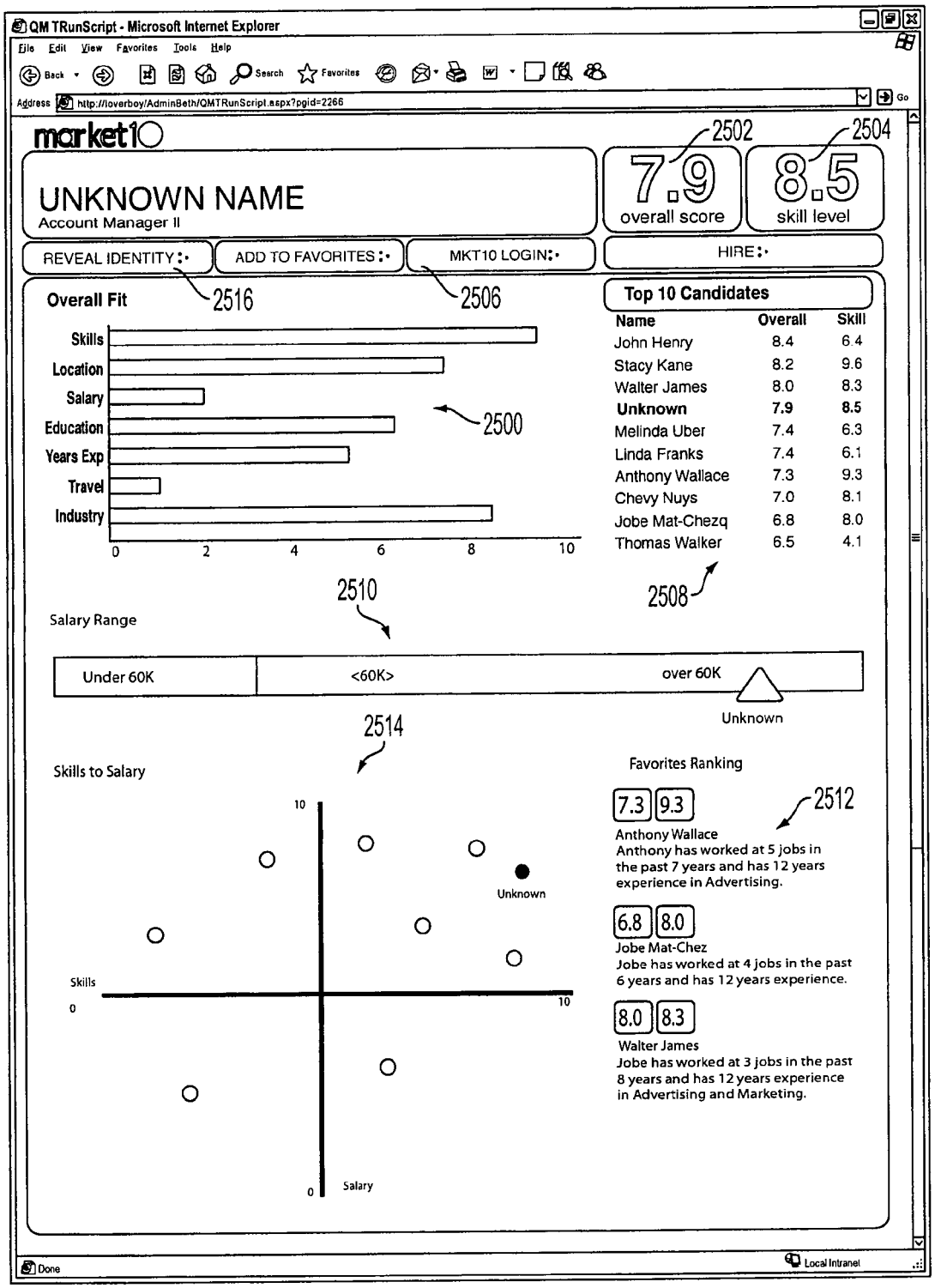
FIG. 25 a diagram of additional detailed information about a candidate in accordance with one embodiment.

FIGS. 23-25 show examples of a formatted document as described above for an employment seeker. FIG. 23 shows an exemplary summary view of the information presented in an e-mail message. It should be noted that an e-mail message can contain any suitable information and/or arrange or present information in any suitable manner. The message includes summary experience information 2300, an overall match score 2302, a score representing how well the candidate's skills (or other suitable matching category) match the desired skills 2304, links to add the candidate to a favorites list, to log into the employment system or to hire the candidate 2306, a list of the top ten candidates for the position 2308, a link to set the employee seeker's notification preferences 2310, a link to request the anonymous candidate's contact information 2312 and a link 2314 to a pdf (or other suitable file format) of the candidate's more detailed information.

FIG. 24 shows a file containing the candidate's more detailed information. It should be noted that the file can contain any suitable information and/or arrange or present information in any suitable manner. Preferably, the file is interactive and/or contains hyperlinks which enable to employee seeker to quickly perform actions related to the employment system; however, the file is not required to be interactive or contain hyperlinks. The file includes more detailed experience information 2400, an overall match score 2402, a score representing how well the candidate's skills (or other suitable matching category) match the desired skills 2404, links to add the candidate to a favorites list, to log into the employment system or to hire the candidate 2406, additional information about the candidate's education, location, desires, authorization, certificates, languages and any other suitable data 2408, and a link to request the anonymous candidate's contact information 2410.

FIG. 25 shows additional detailed information about a candidate. It should be noted that the additional detailed information can contain any suitable information and/or arrange or present information in any suitable manner. Preferably, the additional information is included as part of the file of FIG. 24; however, the additional information can be in a separate file linked to by the file of FIG. 24 or can be organized in any other suitable manner. Preferably, the additional information is interactive and/or contains hyperlinks which enable to employee seeker to quickly perform actions related to the employment system; however, the information is not required to be interactive or contain hyperlinks. The information includes a visual display of how much various matching categories contributed to the match score 2500, an overall match score 2502, a score representing how well the candidate's skills (or other suitable matching category) match the desired skills 2504, links to add the candidate to a favorites list, to log into the employment system or to hire the candidate 2506, a list of the top ten (or other suitable number) candidates 2508, an indicator of the candidates salary desire (or other suitable match criteria) 2510, a ranked summary of the favorites list 2512, a comparison of the top ten candidates on a chart of skills compared with salary desires (or any other suitable comparison of match criteria) 2514 and a link to request the anonymous candidate's contact information 2516. The visual display of how much various matching categories contributed to the match score 2500 is depicted as a bar graph; however, the visual display 2500 can be a radar graph or any other suitable visual display. Further, preferably, the comparison 2514 is displayed such that at least the candidate is identifiable (e.g., by making the candidate a different color or pattern from the other candidates, by labeling the candidate's indicator or any other suitable method); however, the candidates can be displayed in any suitable manner.

Preferably, a seeker is not allowed to turn off notifications of matches via the above described formatted documents without contacting an employment system administrator. Thus, a seeker is prevented from turning off notifications and forgetting that he or she has done so. Preferably, the seeker must contact an employment system administrator via e-mail, telephone or any other suitable communications device and/or method. Then, preferably, the employment system administrator turns the notifications off. Alternatively, the employment system administrator can enable the seeker to turn the notifications off. However, notification can be turned off in any suitable manner.

Question and Answer Series for Attribute Information Gathering

Preferably, information about a seeker (e.g., matching elements) is collected through a series of questions; however, the information can be collected in any suitable manner. Preferably, the questions are designed to collect the information (e.g., matching elements, skill/attributes and their weighting, etc.) which are likely to be most significant to a seeker's match scores. For example, in an employment system that uses matching algorithm that automatically discounts the impact of older jobs within the profile (e.g., accounts for recency), work experiences older than a certain age may not have a significant impact on a seeker's match scores. Thus, at least initially, the employment system does not present a series of questions to collect information about work experiences older than that age. However, an employment system can collect any information in any suitable manner.

Preferably, after a seeker enters an initial set of information, matches can be made. Further, if the seeker so desires, he or she can enhance their profile with additional information which can be entered via answering one or more questions or in any other manner, including but not limited to those described above.

Preferably, seekers (e.g., job seekers) enter their profile information in a two phase process; however, seekers can enter their information in any suitable manner. In the first phase, an initial set of information, deemed most likely to be relevant to making quality matches, is obtained. For example, in the first phase, the seeker can enter the seeker's contact information and the matching elements that are deemed likely to have the most impact on the overall match score; however, any suitable information can be collected in the first phase. Preferably, it takes up to approximately 5 to 10 minutes to complete entry of information in the first phase.

In the second phase, seekers have the opportunity to add information to their profile which will aid the employer during the candidate selection process. For example, a seeker can provide context of how and where their skills were demonstrated. Examples of this type of information includes the information often contained within a paragraph on an job seeker's resume that describes a particular work experience; however, the information can be any suitable information.

To gather matching elements from a seeker in the first phase, the employment system preferably presents the seeker with a series of some number of questions (e.g., 6 to 12 questions). Preferably, the questions are unique for each position defined within a particular profession group; however, the questions can be the same for two positions if desired. For example, Software Programmer are preferably asked different questions from a Database Administrator, although both can reside within the Information Technology profession group.

Preferably, the questions prompt the entry of key differentiating information from the seeker. Preferably, the questions are similar to questions a recruiter might ask at a job fair to determine which job would be the best fit for a particular candidate; however, the questions can be any suitable questions. Preferably, a seeker is only asked questions concerning positions that he/she has held within some period of time deemed to be recent (e.g., the last 6 years); however, the seeker can be asked any suitable questions about any suitable position or experience, regardless of time period or recency. Preferably, if the seeker has had only one work experience within the time period, then only one set of questions will be posed. If the seeker has had more than one work experience in the past seven years, the seeker is preferably shown a first set of questions corresponding to the most recent work experience, then a second series of questions corresponding to the second most recent work experience. Preferably, the system presents clear messaging stating the reason for the second series of questions. Preferably, the system also provides an indication of how much information is left to be collected in the first phase; however, the system can present any suitable messages or information.

Preferably, a seeker is not shown more than some number (e.g., three) of series of questions, regardless of the number of work experiences in the applicable time period during the first phase; however, the seeker can be shown any suitable number of questions or series of questions. Preferably, positions are associated with a series of questions designed to ask candidates to rank certain skills or attributes. The skills/attributes are weighted accordingly in any suitable manner for matching purposes.

For example, three questions asked of a seeker who indicates that he or she is a software programmer can be "What programming language is your strongest?", "What's your second strongest language?" and "What is your third strongest language?" Preferably, the series of questions can branch, resulting in different questions being asked depending upon the answers given to one or more previous questions. For example, FIG. 26 shows a portion of a question tree which branches twice; however question trees can have any suitable number of branches and can have any suitable limitation on branching as desired. Preferably, the questions and skills are determined/correlated by experts; however, the questions and skills can be determined/correlated by seeker suggestions, artificial intelligence applications or any other suitable mechanism.

Another example of a question tree follows. Depending on the answer to a question (QID 164—Which title best describes this position?), the system may present either question QID 165, QID 172, QID 183, QID 189, QID 222, QID 226 or QID 230. Subsequent to QID 165 (Which type of environment best describes this position?), the system can present the series of questions including QID 166 (Are you involved with medical management in this position?), QID 167 (What are the top 3 management skills required for this position?), QID 168 (Are you involved with regulatory compliance issues in this position?), QID 171 (What are the top 3 administrative skills required in this position?) and QID 170 (Does this position require records management skills?).

Subsequent to QID 172 (Which type of environment best describes this position?), the system can present the series of questions including QID 173 (What is your target patient population in this position?), QID 174 (Do/did you practice telephonic care in this position?), QID 175 (What types of telephonic care have you handled?), QID 177 (What are the top 3 administrative tasks you handled in this position?), QID 178 (Do you make patient assessments in your position?), QID 179 (What types of care do you coordinate in your position?), QID 180 (Are you responsible for monitoring patient outcomes in this position?), QID 181 (Have you conducted interventions in this position?) and QID 182 (What types of interventions are/were you involved in?).

Subsequent to QID 183 (Which type of environment best describes this position?), the system can present the series of questions including QID 187 (What is your primary medical specialty?).

Subsequent to QID 189 (What type of environment best describes this position?), the system can present the series of questions including QID 215 (What is your target patient population in this position?), QID 216 (What are the top 3 medical techniques used in this position?), QID 217 (Have you led a nursing team in this position?), QID 218 (Do you have scheduling responsibilities in this position?), QID 219 (Do you have budget and expense responsibilities in this position?), QID 220 (What are the top 3 administrative tasks associated with this position?) and QID 221 (Do you have teaching experience in this position?).

Subsequent to QID 222 (Which type of environment best describes this position?), the system can present the series of questions including QID 223 (What are the top 3 administrative tasks associated with this position?), QID 224 (What are the top 3 pharmacy functions you manage in the position?) and QID 225 (Do you have teaching experience in this position?).

Subsequent to QID 226 (Which type of environment best describes this position?), the system can present the series of questions including QID 227 (What is your target patient population in this position?), QID 228 (What are the 3 top medical techniques used in this position?) and QID 229 (What are the top 3 administrative tasks associated with this position?).

Subsequent to QID 230 (Which type of environment best describes this position?), the system can present the series of questions including QID 231 (What is your target patient population in this position?), QID 232 (Have you conducted interventions in this position?), QID 233 (What types of interventions have you been involved with in this position?), QID 234 (Do/did you practice telephonic care in this position?), QID 235 (What types of telephonic care have you handled in this position?), QID 236 (What are the top 3 administrative tasks associated with this position?), QID 237 (Do you make patient assessments in this position?), QID 238 (What types of care do you coordinate in your position?), QID 239 (Are you responsible for monitoring patient outcomes in this position?) and QID 240 (Do you have budget and expense responsibilities in this position?).

Preferably, with the exception of a first question asked, subsequent questions are selected based on answers or information previously provided; however, questions can be selected in any suitable manner.

FIGS. 27A and 27B show portions of one design of a webpage used to enter seeker information using questions and answers as described above. The webpage includes an area 2700 for entering identification and contact information as well as indicating whether the seeker is publicly accessible or private. The page also includes an area 2702 for the seeker to enter information including company name, dates of employment, title and area of expertise (preferably selected from a provided set of answers) about one of their work experiences. After the information in area 2702 is entered, a first question 2704 which is preferably based on the area of expertise information entered in area 2702 is presented to the seeker. The seeker selects an answer to the question, preferably from a provided set of possible answers, and a second question, preferably based on a previous question's answer, is provided. As the seeker responds to the questions being presented, subsequent questions 2706, preferably selected based on answers to previous questions, are revealed. The page also includes another area 2708 through which the seeker is queried about the seeker's salary desires, highest level of education, desired working area, citizenship status, willingness to travel and years of work experience; however, any suitable information can be collected.

FIG. 28 shows a similar series of questions to those in FIG. 27. Preferably, the questions are revealed only after previous answers are provided; however, questions can be revealed in any suitable manner. Further, the skills selected in response to question Q167 are preferably weighted equally for matching purposes; however, skills can be weighted in any suitable manner. Similarly, the skills selected in response to question Q171 are preferably weighted equally for matching purposes.

Figure 29:
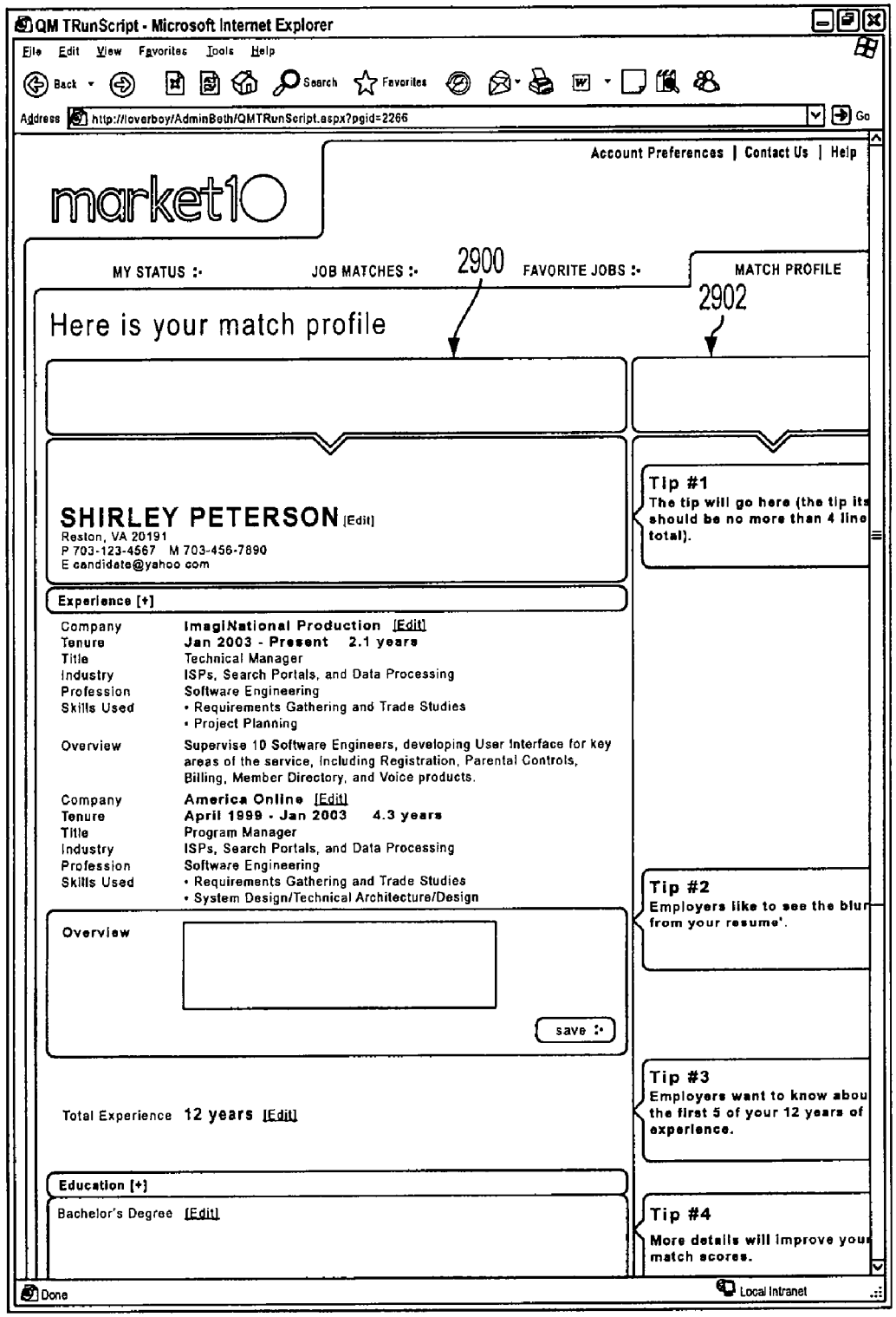
FIG. 29 is a diagram of a view of a formatted document similar to one which will be presented to an employee seeker in accordance with one embodiment.
Figure 30:
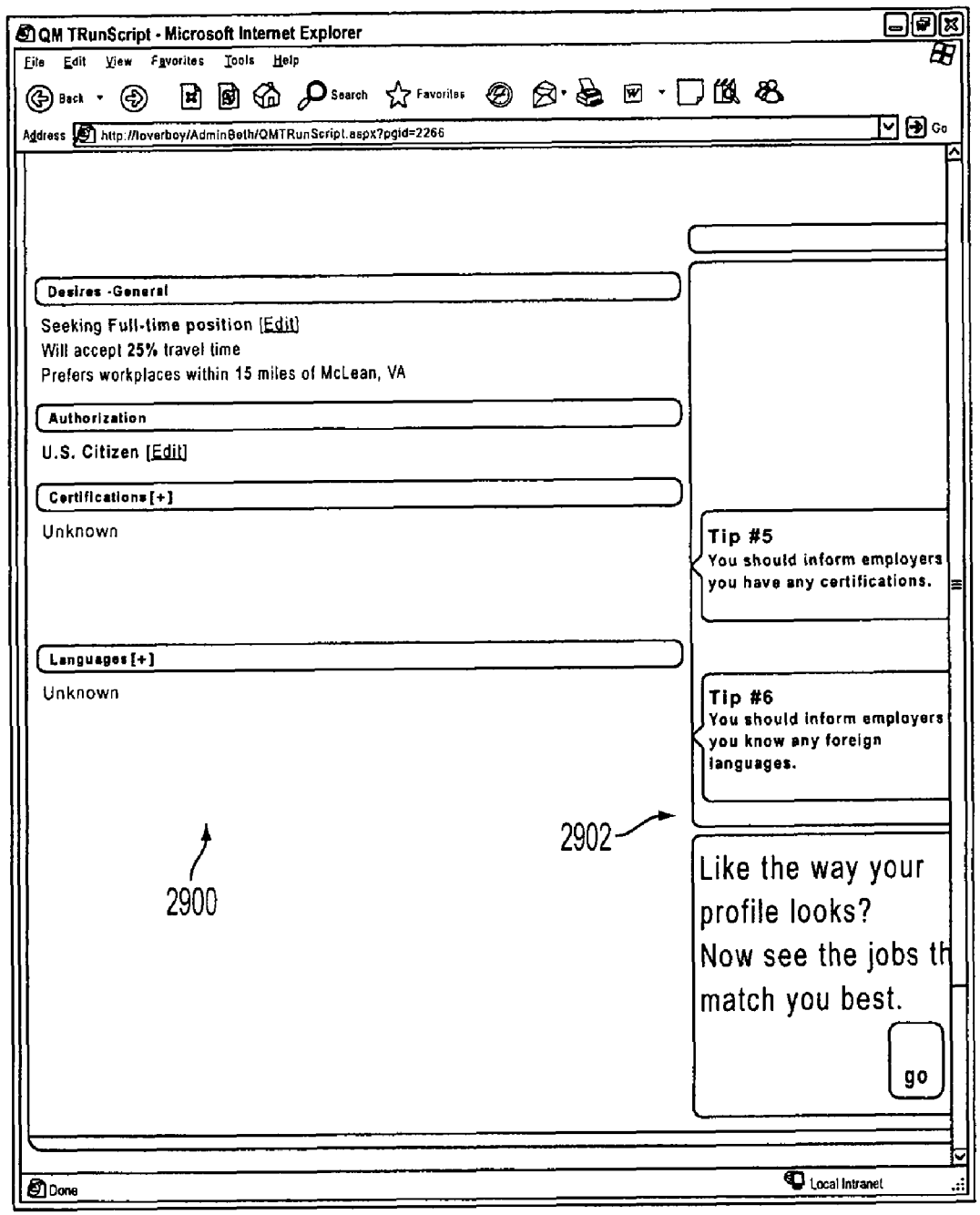
FIG. 30 is a diagram of a view of a formatted document similar to one which will be presented to an employee seeker in accordance with one embodiment.
Figure 31:
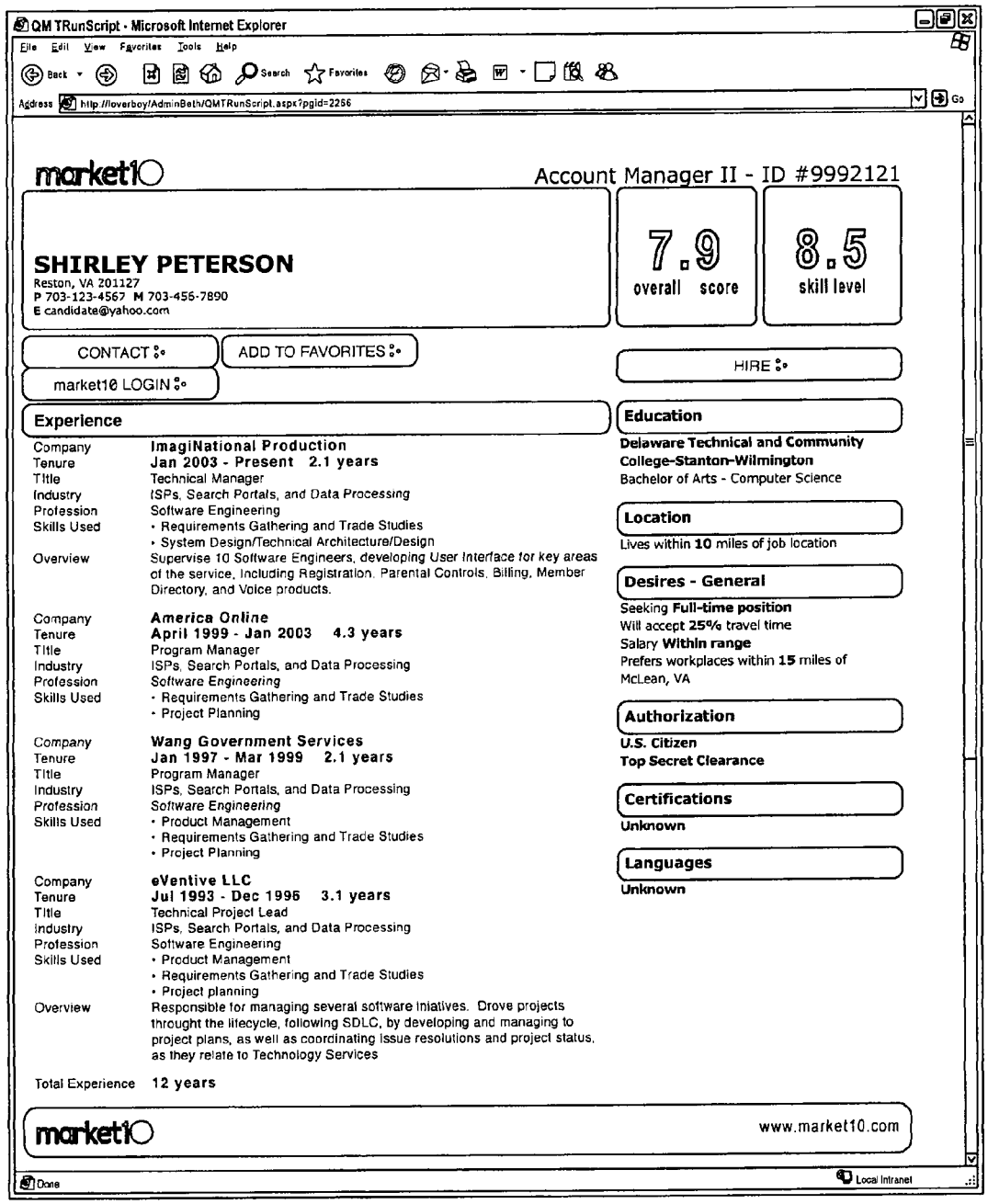
FIG. 31 is a diagram of the information shown in FIGS. 29-30 as it can be displayed to an employee seeker in accordance with one embodiment.

Preferably, after the information is entered in the first stage, the seeker is presented with a view of a formatted document similar to one which will be presented to an employee seeker. As shown in FIGS. 29-30, the displayed document includes an area 2900 which displays the information already entered by the seeker. Additionally, the document includes an area 2902 which displays tips for improving the seeker's displayed information. Preferably, the seeker can have the profile matched with openings as it is after the first phase, or the seeker can select to add, remove or otherwise alter information (e.g., contextual information about work experiences, previous work experiences that are older than the above time period, work experiences within the time period that are not already included, etc.). Preferably, if the seeker has not entered, altered or removed any information in the second phase, a reminder of that fact is provided to the seeker upon each subsequent login to the employment system. Preferably, the seeker can instruct the employment system to not provide such a reminder. FIG. 31 shows an example of how the information shown in FIGS. 29-30 can be displayed to an employee seeker.

It should be understood that various aspects of the present invention may be implemented in non-employment systems, whether matching or non-matching, including but not limited to dating systems, real estate systems, knowledge bases, financial systems and search engines.

Distributed Hiring

In one embodiment, an employment system is operable to associate a plurality of representatives of an employee seeker with a single position. For example, a human resources recruiter (HR recruiter) and a hiring manager, each distinguishably identifiable by the employment system, can collaborate on the employment system for a single position. Instead of or in addition to the HR recruiter interacting with the hiring manager offline to define the job description, requirements and desires, the HR recruiter and hiring manager can team up to collaboratively perform these tasks in the employment system. Such online collaboration can be particularly efficient if the employment system is a match-based employment system such as any of the match-based employment systems described above because the online collaboration enables the hiring manager, who typically has more expertise with the job opening's requirements and desired skills, to directly manipulate the employment system's interface for entering such information rather than going through the intermediary of the HR recruiter.

Figure 32:
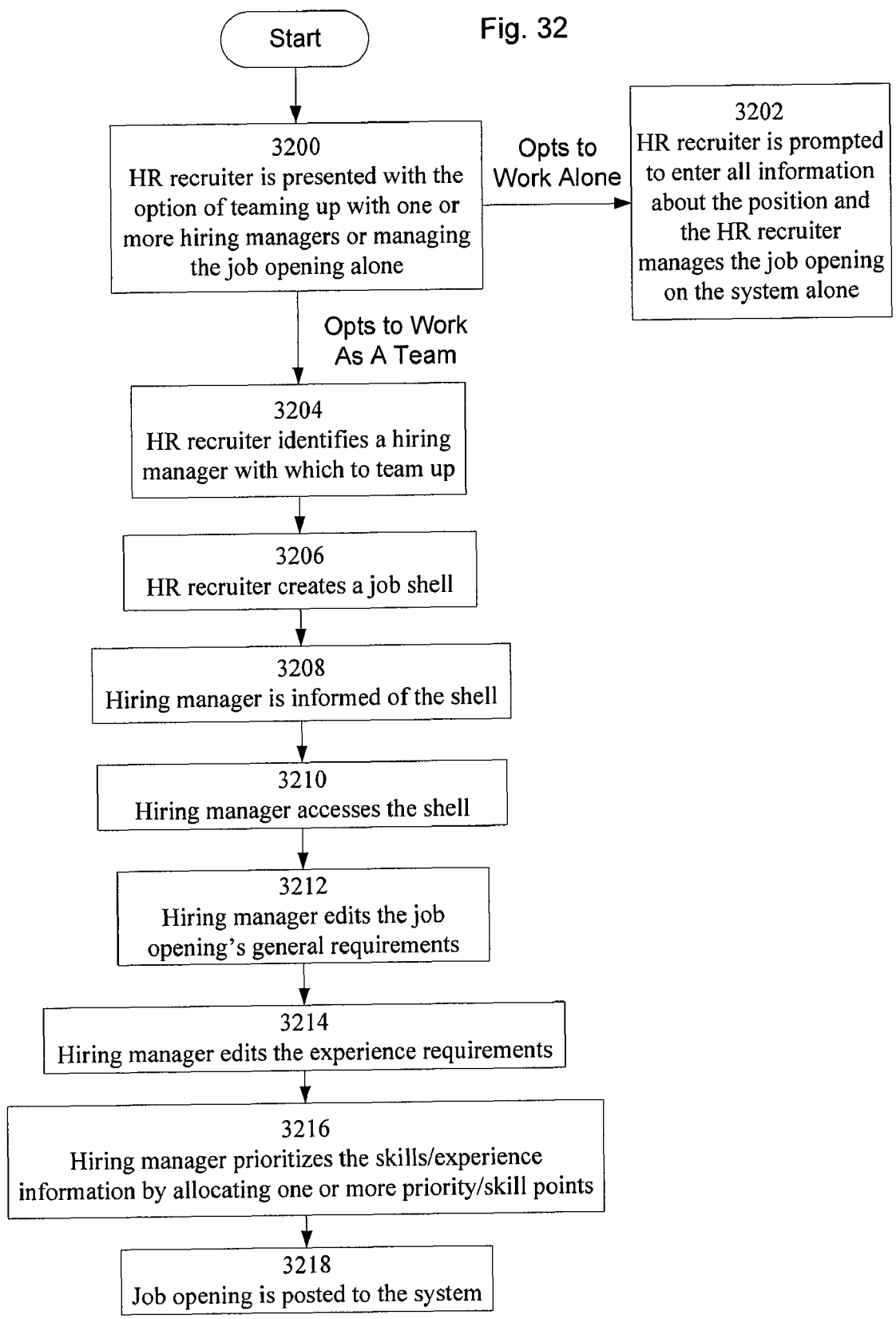
FIG. 32 is a flow diagram of the process of posting an opening in accordance with one embodiment.

FIG. 32 illustrates the process of posting an opening in accordance with one embodiment. At step 3200, an HR recruiter is presented with the option of teaming up with one or more hiring managers or managing the job opening alone. If the HR recruiter opts to manage the job opening alone, at step 3202, the HR recruiter is prompted to enter all information about the position and the HR recruiter manages the job opening on the system alone.

If the recruiter opts to team up with one or more hiring managers, at step 3204, the HR recruiter identifies a hiring manager with which to team up. Preferably, the hiring manager is identified by an e-mail address and a first and last name; however, the hiring manager can be identified in any suitable manner, including but not limited to an employment system ID, an employee ID, an e-mail address, an electronic messaging identifier/ID/screen name, a name, a social security number, or any other suitable identifier or combination of identifiers. Further, the hiring manager can be identified by entering identification information, by selecting the hiring manager from a list of hiring managers presented to the HR recruiter or by any other suitable manner.

At step 3206, the HR recruiter creates a job shell. Preferably, the shell includes enough information about the position that the hiring manager will be able to add to or alter the shell to finalize the job opening information; however, the shell can include any suitable information. For example, the shell can include one or more of a job title, a textual or other job description, a requested education level, a job type (e.g., full-time, part-time, etc.), a travel requirement, a work authorization level (e.g., U.S. citizen, work visa, etc.), a security clearance level, a job location, a desired candidate location (e.g., within 25 miles of the job location), languages spoken, preferred prior employers, job-specific benefits, availability of relocation funds, or any other suitable information associated with the opening.

At step 3208, the hiring manager is informed of the shell. Preferably, the employment system facilitates sending an e-mail from the HR recruiter to the hiring manage; however the hiring manager can be informed of the shell in any suitable manner. Further, the e-mail preferably includes a link the hiring manager can follow to edit and/or add to the specifications for the job opening. In various embodiments, a reminder is automatically sent to the hiring manager (e.g., three days after the initial notification a reminder e-mail appearing to come from the HR recruiter is sent to the hiring manager or any other suitable reminder is sent at any suitable time in any suitable manner appearing to come from any suitable source). In one embodiment, the HR recruiter is not notified of the reminder being sent; however, in various other embodiments, the HR recruiter is notified in any suitable manner.

At step 3210, the hiring manager accesses the shell. Preferably, the hiring manager is able to view and edit all information included in the shell; however, such capability is not required. At step 3212, the hiring manager edits the job opening's general requirements. The general requirements can be edited in any suitable manner, and the general requirements can one or more of a salary range, a minimum experience level, a maximum experience level or any other suitable information.

At step 3214, the hiring manager edits the experience requirements. Preferably, the hiring manager edits the experience requirements by answering one or more questions about a hypothetical ideal candidate's experience as the hypothetical ideal candidate would; however, the hiring manager can edit the experience requirements in any suitable manner. Preferably, the experience requirements include one or more desired skills or experiences which are to be matched against those entered by potential candidates; however, the experience requirements can include any suitable information.

At step 3216, the hiring manager prioritizes the skills/experience information by allocating one or more priority/skill points as described above; however, the hiring manager can prioritize the skills/experience information in any suitable manner.

At step 3218, the job opening is posted to the system. Preferably, the position is matched with candidates on the system and one or more ranked matches is provided to the HR recruiter and the hiring manager; however, the position is not required to be matched with candidates. Further, the job position is preferably editable by both the hiring manager and the HR recruiter after being posted; however, the position can be uneditable or can be editable by only the hiring manager or the HR recruiter if desired.

It should be noted that online collaboration between the HR recruiter and the hiring manager can continue during the candidate reviewing, selection, and interviewing process or any other portion of the hiring process performed subsequent to, during or prior to the position definition formation. In one embodiment, both the HR recruiter and the hiring manager are able to indicate their assessments, thoughts, preferences, notes or comments about individual candidates such that the other is able to access the information through the employment system. Preferably, the comment information is associated with the commenter; however, such an association is not required. For example, the favorites list for a position may also show which of the hiring manager and the HR recruiter added the candidate. Further, the employment system can enable collaboration of scheduling interviews or other aspects of the hiring process performed subsequent to position definition.

In one embodiment, the HR recruiter can deactivate a job opening. If the hiring manager attempts to view a job opening deactivated by the HR recruiter, the hiring manager is notified of the deactivation and/or provided with contact information for the HR recruiter. In one embodiment, job seekers submitting a resume or following a link for a deactivated job are not notified of the deactivation; however, in other embodiments, the seekers can be notified.

Co-Operative Pooling

In one embodiment, employers and candidates are provided with the option of participating in a co-operative employment system. An employer participating in the co-operative employment system allows candidates (also participating in the co-operative employment system) who would otherwise only be viewable by that employer (e.g., candidates coming to the system through the employer's employer-specific employment system such as a link to a job or the employer on another employment system, an e-mail to an address for a job or the employer, a website specific to the employer or any other suitable employer-specific system) to be viewed by other employers participating in the co-operative employment system. Similarly, the employer is able to view candidates that would otherwise be viewable only by the other employers participating in the co-operative employment system.

In one embodiment, an employment system includes a public component, one or more employer-specific components and one or more co-operative components. Candidates that join the system through the public component are viewable by all employers, including employers with associated employer-specific components.

A candidate that joins the system through an employer-specific component associated with an employer are viewable by that employer. If that employer does not participate in a co-operative component, the candidate is viewable only by that employer, unless the candidate also joins the system through the public component or another employer-specific component. For example, if the candidate also joins the system through another employer-specific component, the candidate would be viewable by that other employer as well. Similarly, if the candidate also joins the system through the public component, the candidate will be viewable by all employers.

If that employer does participate in a co-operative component, the candidate is provided with the option of participating in the co-operative component. In one embodiment, the option is presented to the candidate when the candidate first accesses the system; however, the option can be provided at any suitable time. Preferably, the benefits of participation are explained to the candidate, including but not limited to presenting the candidate with a full or partial list of the employers participating in the co-operative; however, benefit explanation is not required. If the candidate declines participation in the co-operative, the candidate is viewable only by that employer, unless the candidate also joins the system through the public component or another employer-specific component. If the candidate participates in the co-operative, the candidate is viewable by all employers participating in the co-operative, but not by employers that do not participate.

Preferably, an employment system includes only one co-operative; however, employments systems can include a plurality of co-operatives with distinct or overlapping membership of employers and/or candidates. In one embodiment, an employer may post a job opening on one or more separate employment systems while providing contact information that directs candidates from those systems to a preferred employment system. For example, an employer may post a job at several employment sites and provide a link for contact information which redirects candidates from those sites to the preferred employment system. In another example, the employer provides an e-mail address for resume submission on the other employment sites which causes candidates to send their resumes to the preferred employment system. In a further example building upon the previous two, the link and/or e-mail address are specific to the job opening and/or the employer. As a result, the employer can post a job to multiple employment sites while managing all candidates at a single site. It should be noted that it is not necessary for an employment system to enable both a co-operative component and the ability to post a job opening on one or more separate employment systems while providing contact information that directs candidates from those systems to a preferred employment system. In one embodiment, resume only submissions are displayed separate from match-based candidates; however, resume only submissions can be displayed with match-based candidates, if desired. As with other features of various embodiments described herein, these features can appear together in various embodiments or either one can be present without the other in other various embodiments.

In one embodiment, candidates who are redirected to the preferred site are invited to enter a candidate profile in accordance with the preferred site (e.g., in any suitable manner, including but not limited to those described above for match-based employment systems). If the candidate enters such a profile, the candidate is processed relative to job openings in accordance with determinations of the employer's and the candidate's participation in any co-operatives. In one embodiment, the preferred employment system is a match-based employment system that allows resume-only candidates (candidates who submit a resume rather than filling out an employment seeker profile) to be viewed by employers.

Figure 33:
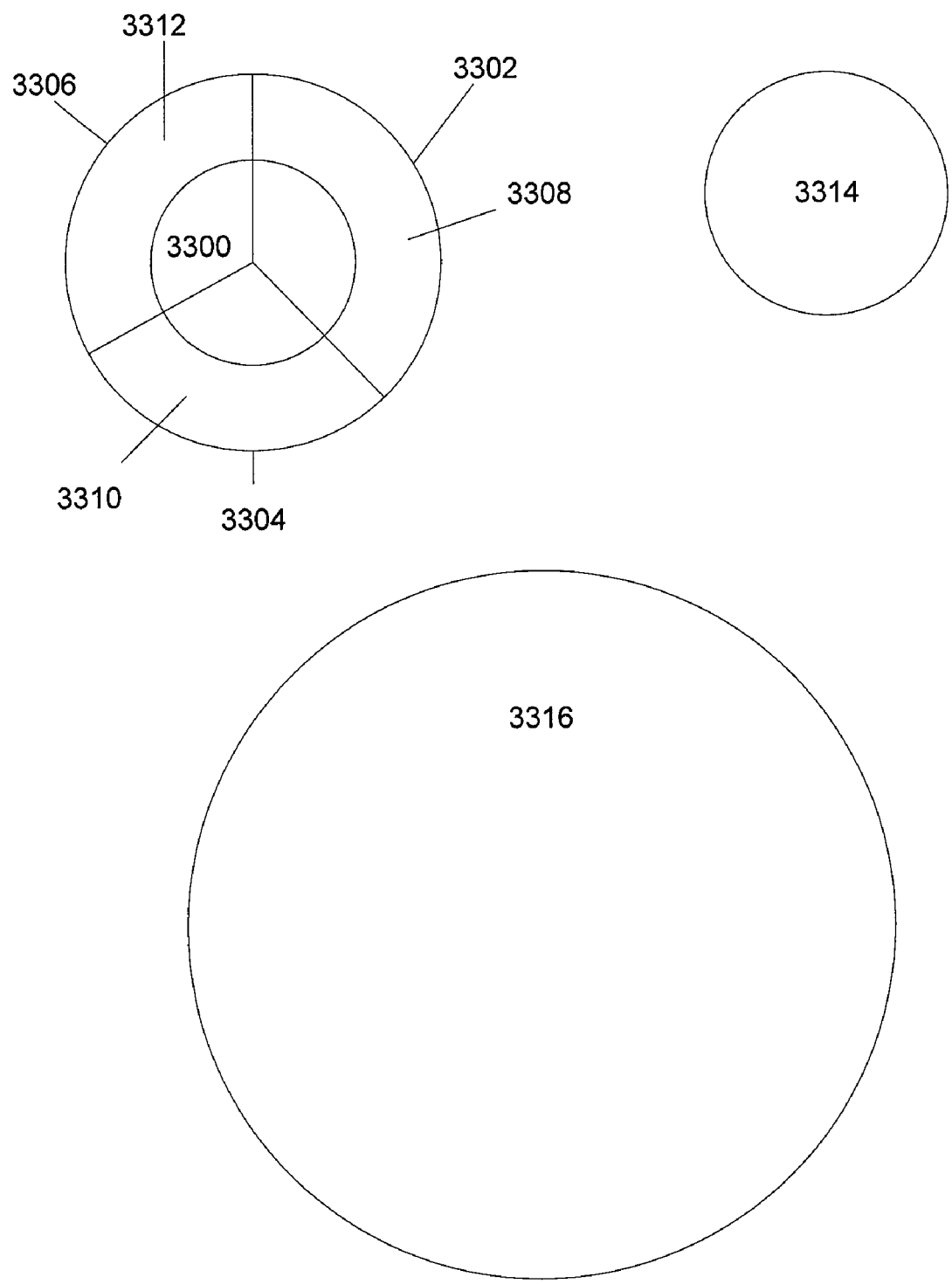
FIG. 33 is a diagram of different pools of candidates in accordance with one embodiment.

FIG. 33 illustrates different pools of candidates in accordance with one embodiment. Employers A, B, C and D are each associated with a pool of candidates that came to the system through the employer's employer-specific system. Employer A is associated with candidates represented by wedge 3302, Employer B is associated with candidates represented by wedge 3304 and Employer C is associated with candidates represented by wedge 3306. Employers A, B and C have also agreed to participate in a co-operative employment system. Candidates who participate in the co-operative employment system are represented by circle 3300. Thus, candidates in circle 3300 are viewable by Employers A, B and C. However, candidates who choose to remain employer-specific are only viewable by their associated employer. Thus, candidates in area 3308 are viewable only by Employer A, candidates in area 3310 are viewable only by Employer B co-operative candidate pool and candidates in area 3312 are viewable only by Employer C.

Employer D does not participate in the co-operative. As a result, the candidates 3314 that come to the system through Employer D's employer-specific system are only viewable by Employer D. However, if any of the candidates elect to be public (e.g., the candidate fills out a match profile after coming to the system through a non-employer-specific system or after coming through an employer-specific system and requesting to be publicly viewable, assuming such a request is allowed for the candidate, or takes any other suitable action to become publicly viewable), the candidate joins pool 3316, each of which are viewable by Employers A, B, C and D as well as any other employers using the system.

It should be understood that in various embodiments, the employment system can fully or partially create a match profile from information parsed from a resume. In other embodiments, employee seeker and/or candidates can be allowed to use the system free of charge, can be required to pay for a period of time of use, can be required to undergo a vetting process, and/or can be charged for each posting of an opening or a profile. Further, in various other embodiments, one or more keywords can be highlighted or otherwise made noticeable when they appear on an employer or candidate match list.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of operating an employment system comprising:
    receiving a request at a computer from at least two employee seekers from among a plurality of employee seekers to create a co-operative pooling agreement to share resumes;
    causing the computer to categorize a first set of one or more employment seekers as public;
    causing the computer to categorize a second set of one or more employment seekers as participants in the co-operative pooling agreement, wherein categorizing the second set includes
        identifying a first employment seeker, the first employment seeker interacting with the employment system through a component, the component associated with a first employee seeker; and
        if the first employee seeker is associated with the co-operative pooling agreement, enabling the first employment seeker to associate with the co-operative pooling agreement;
    causing the computer to provide all employee seekers with access to information about the employment seekers of the first public set; and
    causing the computer to restrict access to information about the employment seekers in the second co-operative pooling agreement set to the at least two employee seekers that requested the co-operative pooling agreement.

2. The method of claim 1, further comprising:
    categorizing a third set of one or more employment seekers as associated with one of the at least two employee seekers; and
    causing the computer to provide the first employee seeker with access to information about employment seekers of the third set.

3. The method of claim 1, wherein the employment system bi-directionally matches employment seekers and posted positions.

4. The method of claim 1, wherein the employment seeker submits a resume to the component.

5. The method of claim 4, wherein enabling the first employment seeker to associate with the co-operative includes creating a match profile for the first employment seeker.

6. An employment system comprising:
    an access unit configured to receive a request at a computer from at least two employee seekers from among a plurality of employee seekers to create a co-operative pooling agreement to share resumes;
    a first categorization unit configured to categorize a first set of one or more employment seekers as public;
    a second categorization unit configured to categorize a second set of one or more employment seekers as participants in the co-operative pooling agreement, and is further configured to:
        identify a first employment seeker, the first employment seeker interacting with the employment system through a component, the component associated with a first employee seeker; and
        if the first employee seeker is associated with the co-operative pooling agreement, enable the first employment seeker to associate with the co-operative pooling agreement;
    the access unit providing all employee seekers with access to information about the employee seekers of the first public set, and
    the access unit restricting access to information about the employment seekers in the second co-operative pooling agreement set to the at least two employee seekers that requested the co-operative pooling agreement.

7. The employment system of claim 6, further comprising:
    a third categorization unit configured to categorize a third set of one or more employment seekers as associated with one of the at least two employee seekers,
    the access unit providing the first employee seeker with access to information about employment seekers of the third set.

8. The employment system of claim 6, further comprising a bi-directional matching unit configured to bi-directionally match employment seekers and posted positions.

9. The employment system of claim 6, wherein the component accepts a resume from the employment seeker.

10. The employment system of claim 9, wherein the second categorization unit is further configured to create a match profile for the first employment seeker, if the employment seeker associates with the co-operative.

* * * * *